(12) United States Patent
Kasegawa et al.

(10) Patent No.: US 12,352,985 B2
(45) Date of Patent: Jul. 8, 2025

(54) IMAGE DISPLAY APPARATUS

(71) Applicant: SONY GROUP CORPORATION, Tokyo (JP)

(72) Inventors: Ryo Kasegawa, Tokyo (JP); Kazue Shimizu, Tokyo (JP)

(73) Assignee: Sony Group Corporation, Tokyo (JP)

( * ) Notice: Subject to any disclaimer, the term of this patent is extended or adjusted under 35 U.S.C. 154(b) by 471 days.

(21) Appl. No.: 17/792,796

(22) PCT Filed: Jan. 8, 2021

(86) PCT No.: PCT/JP2021/000467
§ 371 (c)(1),
(2) Date: Jul. 14, 2022

(87) PCT Pub. No.: WO2021/149511
PCT Pub. Date: Jul. 29, 2021

(65) Prior Publication Data
US 2023/0039906 A1 Feb. 9, 2023

(30) Foreign Application Priority Data

Jan. 22, 2020 (JP) ................................. 2020-008396
Mar. 31, 2020 (JP) ................................. 2020-064999

(51) Int. Cl.
*G02B 30/52* (2020.01)
*G02B 27/09* (2006.01)
*G02B 27/42* (2006.01)

(52) U.S. Cl.
CPC ......... *G02B 30/52* (2020.01); *G02B 27/0944* (2013.01); *G02B 27/4205* (2013.01)

(58) Field of Classification Search
CPC ........................... G02B 30/52; G02B 27/0944; G02B 27/4205; G02B 27/102; G02B 5/32; G02B 5/18; H04N 5/64; H04N 5/74
See application file for complete search history.

(56) References Cited

U.S. PATENT DOCUMENTS 4,309,070 A    1/1982  St. Leger Searle
11,333,895 B1 *  5/2022  Ginzburg ........... G02B 27/0172
(Continued)

FOREIGN PATENT DOCUMENTS

JP    2010-032615    2/2010
JP    2017-009720    1/2017
KR    10-2018-0032317    3/2018

OTHER PUBLICATIONS

International Search Report and Written Opinion prepared by the Japan Patent Office on Feb. 26, 2021, for International Application No. PCT/JP2021/000467, 2 pgs.

*Primary Examiner* — Mariam Qureshi
(74) *Attorney, Agent, or Firm* — SHERIDAN ROSS P.C.

(57) ABSTRACT

An image display apparatus according to an embodiment of the present technology includes a plurality of display units. Each of the display units includes a screen on which an object image is formed; and a diffractive optical element that includes a first surface and a second surface that is situated opposite to the first surface, the diffractive optical element diffracting image light of the object image that enters the first surface, and causing the image light to exit the first surface, the diffractive optical element displaying a virtual image of the object image on a side of the second surface such that the virtual image is superimposed on a background. The diffractive optical elements of a plurality of the diffractive optical elements included in the display units are each arranged to at least partially surround a specified axis in a state in which the second surface faces the specified axis.

25 Claims, 19 Drawing Sheets

(56) References Cited

U.S. PATENT DOCUMENTS

2019/0124301 A1* 4/2019 Yoshii .................... G09G 5/36
2019/0130801 A1* 5/2019 Kim .................... H10K 59/874
2021/0318658 A1* 10/2021 Shirakura ............... G09F 13/16

* cited by examiner

A

B

C

IMAGE DISPLAY APPARATUS

CROSS REFERENCE TO RELATED APPLICATIONS

This application is a national stage application under 35 U.S.C. 371 and claims the benefit of PCT Application No. PCT/JP2021/000467, having an international filing date of 8 Jan. 2021, which designated the United States, which PCT application claimed the benefit of Japanese Patent Application Nos. 2020-008396, filed 22 Jan. 2020, and 2020-064999, filed 31 Mar. 2020, the entire disclosures of each of which are incorporated herein by reference.

TECHNICAL FIELD

The present technology relates to an image display apparatus that displays an image using a virtual image.

BACKGROUND ART

Patent Literature 1 discloses a head-mounted display that displays a virtual image. In the head-mounted display, partial display images are projected onto a single screen by a plurality of projection units, and a combining display image is formed. Image-display light that makes up the combining display image is guided by a combiner that is a virtual-image optical system to a pupil of an observer who is wearing the head-mounted display. This enables the observer to visually recognize a real object in front of the observer together with a virtual image of the combining display image (for example, paragraphs [0002], [0011], [0017], and [0022], and FIG. 1 in Patent Literature 1).

CITATION LIST

Patent Literature

Patent Literature 1: Japanese Patent Application Laid-open No. 2010-32615

DISCLOSURE OF INVENTION

Technical Problem

There is a need for a technology that makes it possible to provide various viewing experiences by displaying a virtual image in a state of being superimposed on a background, as described above, and to perform display of a virtual image with a sense of reality.

In view of the circumstances described above, it is an object of the present technology to provide an image display apparatus that makes it possible to perform display of a virtual image with a sense of reality.

Solution to Problem

In order to achieve the object described above, an image display apparatus according to an embodiment of the present technology includes a plurality of display units.

Each of the plurality of display units includes a screen on which an object image is formed; and a diffractive optical element that includes a first surface and a second surface that is situated opposite to the first surface, the diffractive optical element diffracting image light of the object image that enters the first surface, and causing the image light to exit the first surface, the diffractive optical element displaying a virtual image of the object image on a side of the second surface such that the virtual image is superimposed on a background.

The diffractive optical elements of a plurality of the diffractive optical elements included in the plurality of display units are each arranged to at least partially surround a specified axis in a state in which the second surface faces the specified axis.

The image display apparatus includes a plurality of display units each including the screen and the diffractive optical element, and the diffractive optical element is arranged to at least partially surround the specified axis. The image light of the object image formed on the screen is diffracted by the diffractive optical element to exit the first surface situated opposite to the specified axis, and, on the side of the second surface facing the specified axis, the virtual image of the object image is displayed in a state of being superimposed on a background. This makes it possible to display the virtual image onto a region around the specified axis, and thus to perform display of a virtual image with a sense of reality.

MODE(S) FOR CARRYING OUT THE INVENTION

Embodiments of the present technology will now be described below with reference to the drawings.

First Embodiment

[Configuration of Image Display Apparatus]

Figure 1:
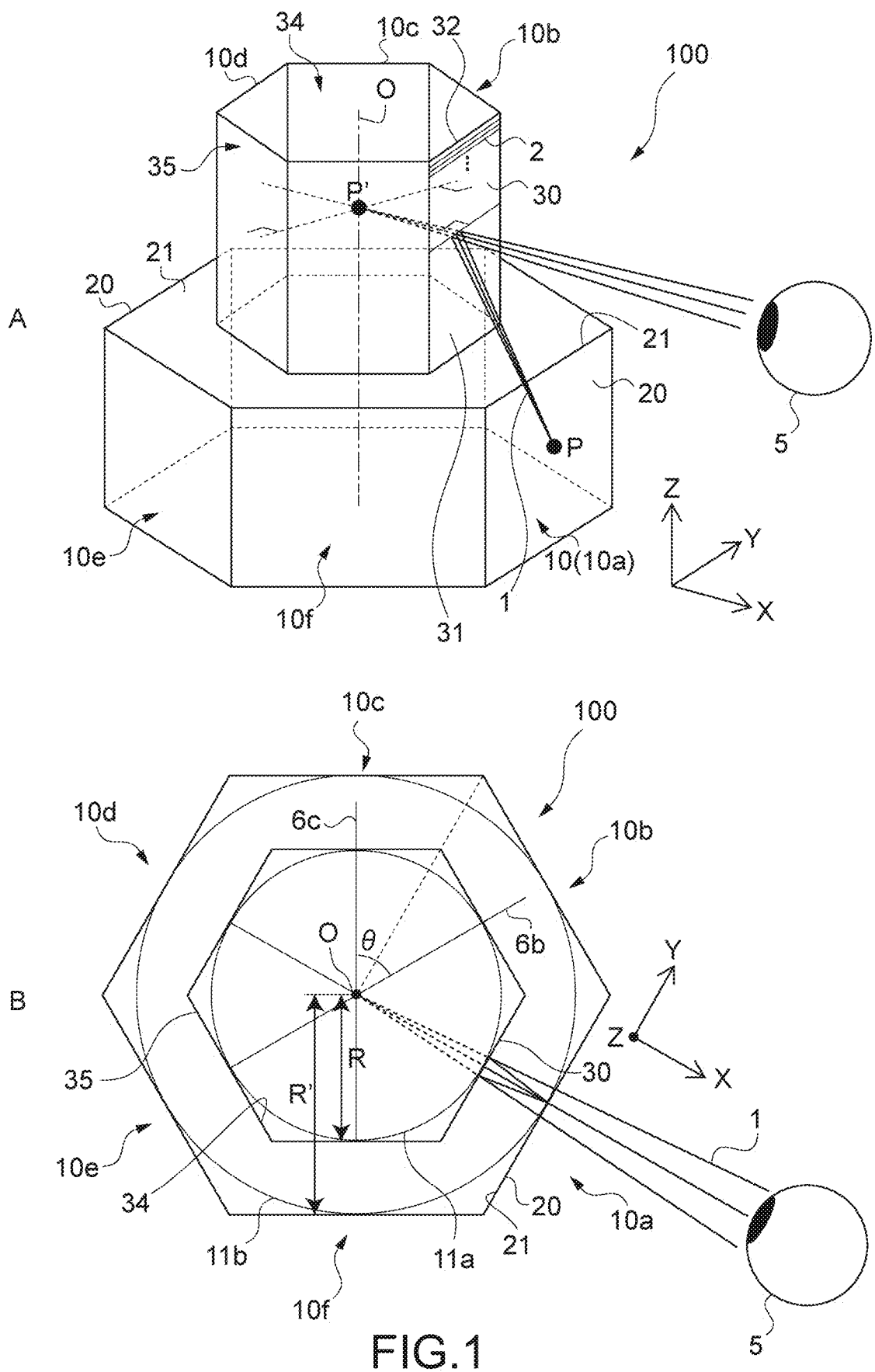
FIG. 1 schematically illustrates an example of a configuration of an image display apparatus according to a first embodiment of the present technology.

FIG. 1 schematically illustrates an example of a configuration of an image display apparatus according to a first embodiment of the present technology. A of FIG. 1 is a perspective view illustrating an appearance of an image display apparatus 100. B of FIG. 1 is a top view of the image display apparatus 100 as viewed from above. In the following description, a direction of a plane (an XY plane) in which the image display apparatus 100 is arranged is referred to as a horizontal direction, and a direction (a Z direction) that is orthogonal to the horizontal direction is referred to as a vertical direction.

The image display apparatus 100 includes a plurality of display units 10. The display unit 10 is a unit used to display a virtual image of a display-target image (a target image). The image display apparatus 100 is formed by the plurality of display units 10 being arranged circumferentially about a reference axis O that is parallel to the vertical direction. Thus, the image display apparatus 100 is an apparatus that displays a virtual image of a target image onto a region around the reference axis O using the plurality of display units 10. In the present embodiment, the reference axis O corresponds to a specified axis.

Each of the plurality of display units 10 includes a screen 20 and a reflective hologram 30. In other words, one display unit 10 includes a set of the screen 20 and the reflective hologram 30. Thus, the same number of screens 20 and the same number of reflective holograms 30 as the number of display units 10 are arranged around the reference axis O. Note that, in A and B of FIG. 1, thicknesses of the screen 20 and the reflective hologram 30 are not illustrated.

The screen 20 includes a flat object-image surface 21 to form an object image. Here, the object image is an image of a target image that is a display target, and is typically a video. The object-image surface 21 is a surface on which an object image is formed. In the present embodiment, the screen 20 is arranged such that the object-image surface 21 faces the reference axis O and the object-image surface 21 is parallel to the reference axis O. In other words, the object-image surface 21 faces an inner side of the image display apparatus 100 (the reference axis O). In the following description, a direction orthogonal to the screen 20 of a display unit 10a is referred to as an X direction, and a plane parallel to the screen 20 (the object-image surface 21) of the display unit 10a is referred to as a YZ plane.

The screen 20 is arranged at a location (a lower portion in the figure) offset from a location facing a first surface 31 in parallel with the reference axis O, in order to avoid a path of light with which a virtual image formed by the reflective hologram 30 is displayed. Further, the screen 20 is arranged at a location (on the side of an outer periphery of the first surface 31) further away from the reference axis O than an external surface (the first surface 31) of the reflective hologram 30.

Pieces of image light 1 with which pixels, of a target image, that correspond to respective points of the object-image surface 21 are displayed, exit from the respective points to be diffused at a specified angle of diffusion. In other words, the image light 1 of the object image diffusely exits the screen 20. A direction in which the image light 1 exits is oriented toward the first surface 31 of the reflective hologram 30. FIG. 1 schematically illustrates an example of a path of the image light 1 exiting from a point P on the object-image surface 21 (the screen 20) of the display unit 10a to be headed for the first surface 31. As described above, the screen 20 is arranged on the side of the first surface 31 in order to not block a virtual image 4 from being displayed, and the image light 1 exits the screen 20 to be headed for the first surface 31. The angle of diffusion and the like when the image light 1 exits the screen 20 will be described in detail later.

A specific configuration of the screen 20 is not limited. For example, a transmissive or reflective diffusion screen or the like that displays an image by diffusing light projected from a projection display apparatus such as a projector (not illustrated) is used as the screen 20 (refer to FIG. 2). In this case, a surface that diffuses the projected light so that the projected light exits the surface, is the object-image surface 21. Further, for example, a self-luminous display such as a liquid crystal display, an organic EL display, or a plasma display may also be used as the screen 20. In this case, a display surface of each display is the object-image surface 21. Moreover, any screen 20 that can form an object image of, for example, a target image may be used.

The reflective hologram 30 includes the first surface 31 and a second surface 32 that is situated opposite to the first surface 31. The first surface 31 is a surface that faces the side opposite to the side of the reference axis O, and the second surface 32 is a surface that faces the reference axis O. Thus, the first surface 31 is an external surface and the second surface 32 is an internal surface in the image display apparatus 100. In the present embodiment, the reflective hologram 30 is in the form of a flat plate. Thus, the first surface 31 and the second surface 32 are both flat.

The reflective hologram 30 is a reflective holographic optical element (HOE). The HOE is an optical element using a hologram technology, and a traveling direction of light (a light path) is controlled by the light being diffracted by an interference fringe 2 recorded in advance. The reflective HOE can control a direction of diffractive reflection that is diffractively reflecting light. In the present embodiment, the reflective hologram 30 corresponds to a diffractive optical element.

The reflective hologram 30 is configured such that light incident at an angle in a specific angular range is diffractively reflected off the reflective hologram 30, and such that light incident at an angle in an angular range other than the specific angular range is transmitted through the reflective hologram 30. For example, the light incident on the first surface 31 at an angle in the specific angular range exits the first surface 31 at an exit angle that corresponds to the angle of incidence. Further, the light incident at an angle in the angular range other than the specific angular range is transmitted through the reflective hologram 30 almost without being diffracted by the interference fringe 2.

An HOE that is exposed to light to generate the interference fringes 2 having a period in a single direction is used as the reflective hologram 30. Specifically, a plurality of strip-shaped interference fringes 2 parallel to each other is formed along the first surface 31 (the second surface 32). For example, a direction orthogonal to the respective interference fringes 2 formed parallel to each other is a direction in which the interference fringes 2 have the period (a period direction). The interference fringes 2 serve as a one-dimensional diffraction grating. In other words, the reflective hologram 30 includes a one-dimensional diffraction grating. A of FIG. 1 schematically illustrates the interference fringes 2 formed in the reflective hologram 30 of the display unit 10*a* in a stripe pattern. The pattern of the interference fringes 2 having a period in a single direction (a one-dimensional diffraction grating) can be formed using, for example, scanning exposure that includes scanning laser light and generating interference fringes.

The method for configuring the reflective hologram 30 is not limited. For example, when color display or the like is performed, three types of reflective holograms 30 exposed to respective pieces of light of R, G, and B are used by being arranged in a layered formation. Further, for example, a photopolymer or the like on which multiple exposure can be performed may be used. In this case, the reflective hologram 30 includes the interference fringes 2 generated by performing exposure to pieces of light of wavelengths different from each other.

The reflective hologram 30 is arranged such that a one-dimensional diffraction grating (the interference fringe 2) is orthogonal to a plane that includes the reference axis O. Specifically, the reflective hologram 30 is arranged such that the interference fringe 2 (the one-dimensional diffraction grating) extends horizontally and such that the first surface 31 (the second surface 32) and the plane including the reference axis O are orthogonal to each other. For example, the reflective hologram 30 of the display unit 10*a* is arranged such that the interference fringes 2 have a period in a direction orthogonal to a Y direction (the Z direction in FIG. 1). Thus, in the reflective hologram 30 of the display unit 10*a*, the interference fringe 2 extends in the Y direction, and is orthogonal to an XZ plane including the reference axis O. In the other display units 10, the reflective hologram 30 is also arranged such that the interference fringe 2 extends horizontally. This makes it possible to prevent, for example, the adjacent reflective hologram 30 from exhibiting a different diffraction efficiency. This will be described in detail later.

The reflective hologram 30 diffracts the image light 1 of an object image, which enters the first surface 31, and causes the image light 1 to exit the first surface 31, the reflective hologram 30 displaying a virtual image of the object image on the side of the second surface 32 such that the virtual image is superimposed on a background. In other words, the reflective hologram 30 is exposed to light to generate the interference fringes 2, such that image light of the object image formed on the screen 20 is diffractively reflected and light of a background is transmitted.

For example, as illustrated in FIG. 1, the image light 1 (diffused light) exiting from the point P on the screen 20 (the object-image surface 21) and entering the first surface 31, is diffractively reflected off the interference fringe 2, and exits the first surface 31 to travel along a light path that connects an incident position on the first surface 31 and a point P' that is situated on the side of the second surface 32 (a virtual-image focal point). Consequently, upon observation, it looks like the image light 1 entering a pupil 5 of an observer that is oriented toward a direction of the first surface 31 exits from the point P' situated on the side of the second surface 32. Further, the light of the background, which enters from the side of the second surface 32, enters the pupil 5 with no change. This makes it possible to display a video such as a target image in a state of being superimposed on the background. As described above, the display unit 10 is a display apparatus that performs diffraction with respect to a video on the screen 20 and delivers the video to the pupil 5, using the reflective hologram 30 used to display a video superimposed on the background.

A method is known that is performed using a transmissive mirror such as a half mirror as an optical system (a combiner) used to display a virtual image 1 in a state of being superimposed on a background. Here, a percentage of light of a background, which is transmitted through the reflective hologram 30 (transmittance), is described in comparison to when a transmissive mirror is used. Note that, in the case of the transmissive mirror, light is specularly reflected to be folded back (Fresnel reflection). Thus, the transmissive mirror is arranged to be inclined with respect to an observation direction (refer to FIG. 9). Conversely, this configuration using the reflective hologram 30 makes it possible to arrange the reflective hologram 30 vertically, as illustrated in FIG. 1.

For example, when the virtual image 1 is displayed to be visible from all directions, background light perceived by a user is light that passes through virtual-image screens (the reflective holograms 30 or the transmissive screens) that are respectively arranged in front and in back as viewed from the user. In this case, the brightness of the background light perceived together with the virtual image 1 is represented by the square of the transmittance of the virtual-image screen as viewed from a position of a pupil.

Here, it is assumed that the reflective hologram 30 and the transmissive mirror can display the virtual image 1 with the same brightness. This is the case in which, for example, a diffraction efficiency of the reflective hologram 30 by which light from the object-image surface 21 is diffracted to be headed for a pupil, and a reflectance of the transmissive mirror arranged such that the light from the object-image surface 21 is reflected off the transmissive mirror to be headed for the same position of the pupil are the same. In such a case, the thickness of the reflective hologram 20 is set such that the square of a white-light transmittance of the reflective hologram 30 is greater than or equal to the square of a white-light transmittance of the transmissive mirror. Here, the white-light transmittance is, for example, transmittance regarding visible light included in background light.

As described above, the thickness of the reflective hologram 30 is set such that more background light is transmitted through the reflective hologram 30, compared with a Fresnel reflecting surface (a transmissive mirror) that can display the virtual image 1 with the same brightness. This results in background light appearing brighter when the virtual image 1 is viewed through the reflective hologram 30 than when the virtual image is viewed through the transmissive mirror.

This makes it possible to display the virtual image 1 in a state of being superimposed on a background with a brightness closer to an actual brightness, and thus to perform display with a great sense of reality to provide the feeling that a character or the like actually exists there.

In the image display apparatus 100, the reflective holograms 30 of a plurality of reflective holograms 30 included in a plurality of display units 10 are each arranged to at least partially surround the reference axis O in a state in which the second surface 32 faces the reference axis O. Thus, an inner peripheral surface 34 that includes the second surfaces 32 of the plurality of reflective holograms 30 is arranged around the reference axis O. Further, an observer can observe the virtual image 4 displayed on the side of the reference axis O from various directions through an outer peripheral surface 35 that includes the first surfaces 31 of the plurality of reflective holograms 30.

In the present embodiment, three or more reflective holograms 30 that are adjacently arranged to surround the reference axis O, are used. Specifically, three or more display units 10 are circumferentially arranged such that the respective reflective holograms 30 are adjacently arranged to form the closed outer peripheral surface 35 surrounding the reference axis O. This makes it possible to observe a virtual image in a state of being superimposed on a background from all directions, which covers the complete 360 degrees circumference. In the example illustrated in FIG. 1, six display units 10a to 10f are used to form the image display apparatus 100.

Note that the number of display units 10 is not limited, and can be set as appropriate according to, for example, designing of the image display apparatus 100. Further, the configuration is not limited to the case in which the outer peripheral surface 35 is configured to completely surround the reference axis O, and, for example, two or more reflective holograms 30 (display units 10) may be arranged such that the outer peripheral surface 35 partially surrounds the reference axis O. The image display apparatus 100 displaying a virtual image in different directions can also be formed in such cases.

Further, in the present embodiment, the respective reflective holograms 30 are each arranged such that the first surface 31 and the reference axis O are parallel to each other, and the respective reflective holograms 30 form a prismatic structure that surrounds the reference axis O. In the image display apparatus 100, six reflective holograms 30 form the outer peripheral surface 35 (the inner peripheral surface 34) having a structure of a hexagonal prism that is formed circumferentially about the reference axis O, as illustrated in A of FIG. 1. This makes it possible to observe, from the front, the first surface 31 off which light is diffractively reflected, and thus to greatly improve the light-transmissive properties with respect to a background. Further, the first surface 31 off which the image light 1 is diffractively reflected is rectangular. Thus, for example, a certain display range for displaying a virtual image can be secured regardless of upper and lower positions.

Further, in the present embodiment, the respective reflective holograms 30 are configured to have horizontal widths that exhibit the same value as each other, as illustrated in B of FIG. 1. Thus, the outer peripheral surface 35 has a structure of a regular hexagonal prism in which an inscribed circle 11a of a radius R is inscribed, with the reference axis O passing through the center of the inscribed circle 11a. Further, six screens 20 form a structure of a regular hexagonal prism in which an inscribed circle 11b of a radius R' is inscribed, the radius R' being larger than the radius R of the inscribed circle 11a.

Note that each reflective hologram 30 may be arranged to be inclined with respect to the reference axis O. For example, each reflective hologram 30 is arranged to be inclined such that the first surface 31 is oriented toward a direction of a lower portion of the apparatus, and the outer peripheral surface 35 (the inner peripheral surface 34) has a pyramid structure. One-dimensional interference fringes 2 can also be horizontally arranged in such a case. Further, each screen 20 may be arranged to be inclined with respect to the reference axis O. Inclination angles of the reflective hologram 30 and the screen 20 are not limited, and, for example, the inclination angles may be respectively set in a range in which an observer can properly observe a virtual image.

Here, an angle that is formed by a path of the image light 1 and an orthogonal plane orthogonal to the reference axis O is defined as an elevation angle $\alpha$, and an angle that indicates a direction of the path of the image light projected onto the orthogonal plane is defined as an azimuth angle $\beta$. For example, an XY plane (a horizontal plane) in FIG. 1 is an orthogonal plane that is orthogonal to the reference axis O. In other words, the elevation angle $\alpha$ is an angle that represents an angle of inclination with respect to the horizontal plane in the image display apparatus 100. Further, the azimuth angle $\beta$ is an angle that represents a direction in the horizontal plane (a horizontal direction) in the image display apparatus 100.

The elevation angle $\alpha$ and the azimuth angle $\beta$ are hereinafter represented using the first surface 31 of the reflective hologram 30 as a reference. In other words, in the first surface 31, a vertical component of angle with respect to a perpendicular to the first surface 31 is the elevation angle $\alpha$, and a horizontal component of angle with respect to the reference axis O is the azimuth angle $\beta$. Further, the elevation angle $\alpha$ and the azimuth angle $\beta$ representing the perpendicular to the first surface 31 are both 0 degrees.

When the reflective holograms 30 of a plurality of reflective holograms 30 are continuously arranged circumferentially about the reference axis O to form a polygonal prism, as illustrated in FIG. 1, an angle formed by the first surfaces 31 being adjacent to each other is set according to diffraction properties of the reflective hologram 30 in an elevation direction and in an azimuth direction.

For example, the reflective hologram 30 diffracts light with a diffraction efficiency depending on the elevation angle $\alpha$ and the azimuth angle $\beta$ of an exit direction (or an incident direction) of light. As described above, each reflective hologram 30 includes a one-dimensional diffraction grating that extends horizontally. In this case, in a range in a certain elevation direction, the diffraction efficiency of the reflective hologram 30 in the azimuth direction exhibits a distribution symmetric about the azimuth angle $\beta=0$ (for example, refer to FIG. 7). The angle formed by the first surfaces 31 being adjacent to each other is set according to the above-described distribution of the diffraction efficiency in the azimuth direction.

In the image display apparatus 100, an angle θ formed by perpendiculars to the first surfaces 31 being adjacent to each other is set to an angle less than or equal to an angle $\beta_0$ that is represented by an angular range of the azimuth angle $\beta$ such that the diffraction efficiency in the azimuth direction exhibits a value greater than or equal to a specified value at an elevation angle (an assumption pupil elevation angle $\alpha_0$) obtained by assuming a location of the pupil 5 of an observer. In the present embodiment, the assumption pupil elevation angle $\alpha_0$ corresponds to a specified elevation angle, and the specified value corresponds to a first value.

In the present embodiment, the specified value is set to a value equal to half the peak value of the diffraction efficiency. Thus, the angle $\beta_0$ is an angle that represents a full width at half maximum in the distribution of the diffraction efficiency in the azimuth direction. In other words, the angle $\theta$ formed by perpendiculars to the first surfaces 31 being adjacent to each other is set to an angle less than or equal to a full width at half maximum $\beta_0$ of the diffraction efficiency in the azimuth direction at the assumption pupil elevation angle $\alpha_0$ ($\theta \leq \beta_0$). Consequently, the efficiency in diffracting the image light 1 exiting at the assumption pupil elevation angle $\alpha_0$ to be headed for the pupil 5 oriented toward a direction of the reference axis O exhibits a value greater than or equal to half the peak value. As described above, a plurality of reflective holograms 30 is arranged such that the efficiency in diffracting the image light 1 exiting the first surface 31 at the assumption pupil elevation angle $\alpha_0$ along a plane that includes the reference axis O exhibits a value greater than or equal to half the peak value.

B of FIG. 1 illustrates perpendiculars 6b and 6c of the first surfaces 31 of display units 10b and 10c that are adjacent to each other. When the regular polygonal prism is formed as illustrated in B of FIG. 1, it can also be said that the angle $\theta$ formed by the perpendiculars 6b and 6c is an angle formed when the centers of the reflective holograms 30 being adjacent to each other are viewed from the reference axis O (intersections of the reflective holograms 30 with the inscribed circle 11a). Note that the angle $\theta$ formed by perpendiculars is equal to an exterior angle (a complementary angle) lateral to an angle formed by the first surfaces 31 being adjacent to each other.

Further, in the image display apparatus 100, a distance between the first surface 31 and the object-image surface 21 is set such that the radius R of the inscribed circle 11a is inscribed in the prismatic structure formed of the respective reflective holograms 30, and a distance to the first surface 31 from a virtual-image focal point in the horizontal direction, as viewed from the pupil 5, are the same as each other. In other words, a plurality of reflective holograms 30 is arranged such that the first surfaces 31 are inscribed in the inscribed circle 11a having the radius R equal to a distance from the first surface 31 to a virtual-image focal point in the horizontal direction orthogonal to the reference axis O, with the reference axis O passing through the center of the inscribed circle 11a. Here, the distance between the first surface 31 and the object-image surface 21 includes a distance in the horizontal and vertical directions. This results in a virtual image of an object image always being displayed circumferentially about the reference axis O when the pupil 5 is circumferentially moved at the assumption pupil elevation angle $\alpha_0$.

A focal length in a state of convergence upon viewing from the left and right pupils 5 of an observer is the same as a focal length of a monocular focal point in the horizontal direction. Thus, a location at which a virtual image is recognized due to an angle of convergence (an angular difference between the left and right pupils 5) is also a location at which the reference axis O passes through the center of the location. This results in being able to continuously display a virtual image even if the pupil 5 is circumferentially moved. Further, the location at which the virtual image is displayed remains unchanged, with the reference axis O passing through the center of the location. This makes it possible to perform display while providing a sense of realism and a stereoscopic effect when a virtual image of, for example, a character is displayed.

An image height of the displayed virtual image 4 is determined according to, for example, a location of the screen 20 arranged so as not to block the image light 1 (a virtual image ray) that causes a virtual image to be displayed. Actually, there may be a slight change in a focal length of a virtual image due to image height (a location of a virtual image in the vertical direction). Thus, for example, a focal length depending on a range of an image height is set such that a virtual image of a desired height is displayed. Typically, a location of the screen 20 is set as appropriate such that the reference axis O passes through a virtual-image focal point in the horizontal direction that corresponds to the center of a virtual image (the center of an object image).

[Configurations of Reflective Hologram and Screen]

Figure 2:
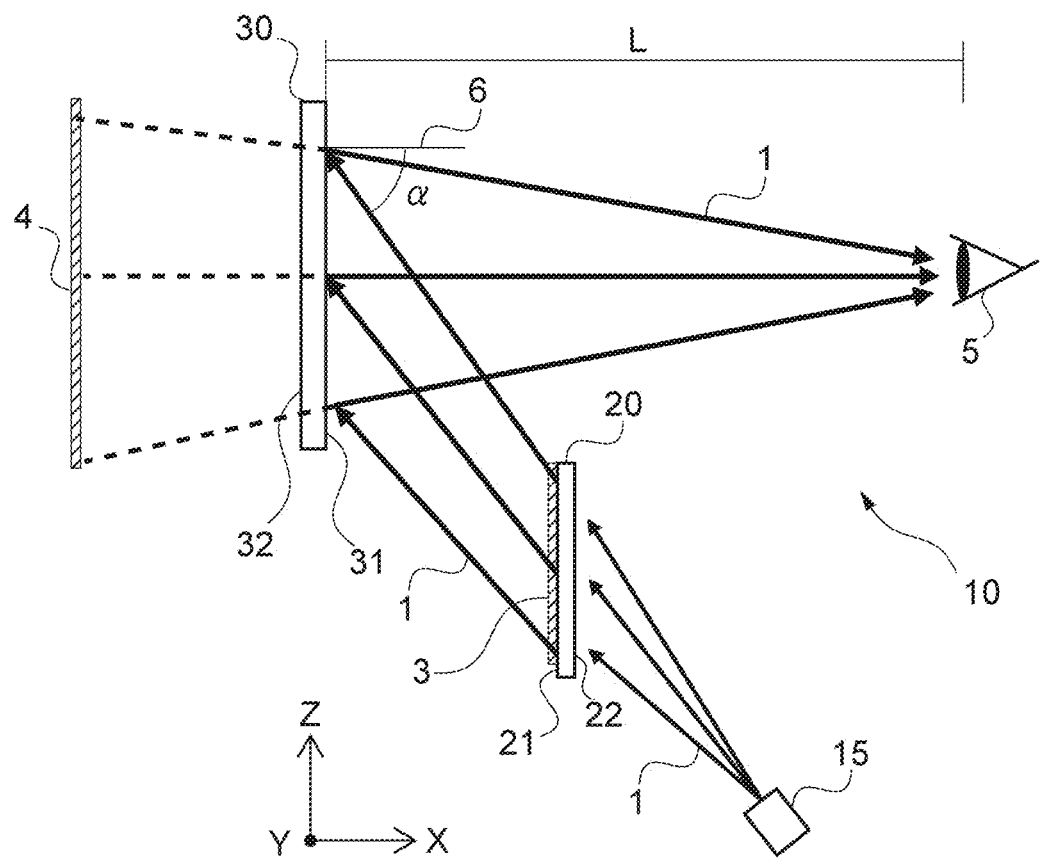
FIG. 2 schematically illustrates an example of a configuration of a display unit.

FIG. 2 schematically illustrates an example of a configuration of the display unit 10. FIG. 2 schematically illustrates a cross section obtained by cutting the display unit 10a illustrated in FIG. 1 along the XZ plane. The display unit 10 includes a projector 15 that projects an object image 3 onto the screen 20. In the present embodiment, the projector 15 corresponds to a projection section.

At a specified angle of radiation (angle of view), the projector 15 emits the image light 1 making up a target image that corresponds to the object image 3. As illustrated in FIG. 2, the projector 15 is arranged outside of the screen 20 to project the image light 1 at a specified angle of projection (launch angle). This angle of projection is a center angle of an angle of radiation. The above-described oblique projection of the image light 1 makes it possible to improve the brightness of the image light 1 exiting the screen 20.

A laser projector or the like using a laser source is used as the projector 15. In the present embodiment, a scanning laser projector that scans pieces of laser light of R, G, and B and projects an image is used. Note that a projection laser projector using, for example, a liquid crystal light bulb may be used.

The use of a laser source makes it possible to project a target image using pieces of narrowband light of R, G, and B, and thus to narrow a band of the image light 1. This makes it possible to provide a great diffraction performance. Note that the projector 15 using, for example, an LED light source or a lamp light source may be used as a light source. In this case, the narrowband image light 1 can be projected by using, for example, a narrowband filter used to narrow a band of light in combination.

The screen 20 is a transmissive diffusion screen, and includes an entrance surface 22 that is situated opposite to the object-image surface 21. The entrance surface 22 is a surface that the image light 1 emitted from the projector 15 enters. The image light 1 entering the entrance surface 22 is transmitted through the screen 20 to diffusely exit the object-image surface 21. Accordingly, the object image 3 corresponding to a target image and being made up of the image light 1 emitted from the projector 15, is formed. In FIG. 2, the object image 3 formed on the object-image surface 21 of the screen 20, and the virtual image 4 formed on the side of the second surface 32 of the reflective hologram 30 are schematically indicated by hatched regions.

Note that a reflective diffusion screen may be used as the screen 20. In this case, an internal surface of the screen 20 (a surface that faces the reflective hologram 30) is an entrance surface that the image light 1 enters, and is also an exit surface that the image light 1 exits. This makes it possible to obtain, for example, a configuration in which the projector 15 is arranged further inward in the apparatus than the screen 20, and thus to make the apparatus smaller in size.

A configuration of the reflective hologram 30 used to deliver the object image 3 to the pupil 5 is described below. Here, a configuration in which a virtual image can be observed through the first surface 31 is assumed, where the assumption pupil elevation angle $\alpha_0$ is 0 degrees and L represents a distance between the first surface 31 and the pupil 5. Note that the distance L is set to a value in a range of, for example, from 100 mm to 1000 mm. Of course, the distance L is not limited thereto. Note that, in FIG. 2, the elevation angle $\alpha$ is an angle with respect to a perpendicular 6 of the first surface 31.

As illustrated in FIG. 2, the image light 1 (incident light) exiting the object-image surface 21 of the screen 20 arranged in the lower portion of the apparatus enters the first surface 31 of the reflective hologram 30 at various angles of incidence. Further, the image light 1 (diffracted light) diffracted by the interference fringe 2 exits the first surface 31 to be headed for the pupil 5. Here, a direction in which the diffracted light exits is a direction in parallel with a line that connects a virtual-image focal point and an incident position. This enables an observer to observe the virtual image 4 formed on the side of the second surface 32 of the reflective hologram 30.

Considering that the image light 1 of the object image 3 entering from the object-image surface 21 at a certain angle is delivered to a pupil, as described above, it is desirable that specularly reflected light of light that enters the first surface 31 not enter the pupil 5. Here, the specularly reflected light is, for example, light reflected due to Fresnel reflection (interfacial reflection) onto the first surface 31, and is reflected at the same reflection angle as an angle of incidence.

Figure 3:
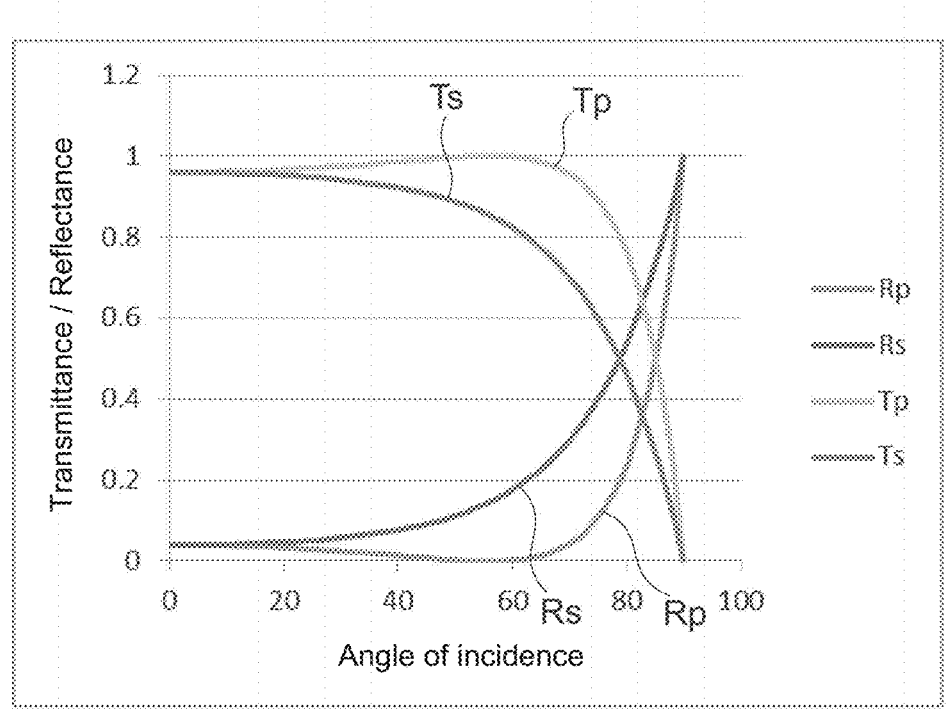
FIG. 3 is a graph illustrating a reflectance and a transmittance of light upon the Fresnel reflection performed when the light enters an interface.

FIG. 3 is a graph illustrating a reflectance and a transmittance of light upon the Fresnel reflection performed when the light enters an interface. In the graph, a vertical axis represents the transmittance and the reflectance, and a horizontal axis represents an angle of incidence of light on an interface. FIG. 3 illustrates reflectances of s-polarized light and p-polarized light (Rs and Rp), and transmittances of s-polarized light and p-polarized light (Ts and Tp). For example, a portion of incident light that enters an interface (such as the first surface 31) is reflected off the interface, and another portion of the incident light is transmitted through the interface to enter the reflective hologram 30. Here, the reflectances and the transmittances exhibit values according to an angle of incidence of the incident light and according to respective percentages of the s-polarized light and the p-polarized light included in the incident light.

It is desirable that the image light 1 enter the first surface 31 at as large an angle as possible (an angle of incidence be increased), in order to prevent specularly reflected light from entering the pupil 5. On the other hand, a reflectance of light upon the Fresnel reflection is increased as an angle of incidence becomes larger, as illustrated in the graph of FIG. 3. Thus, it is conceivable that, when the angle of incidence is made larger, there could be a reduction in an amount of light that enters the first surface 31, and thus there could be a reduction in the brightness of the virtual image 4.

In the present embodiment, an angle of incidence at the center of the angle of view is set on the basis of a tolerable range of a reduction in a level of light-source intensity (the brightness of a virtual image) that is caused due to Fresnel reflection, and on the basis of an assumption range of an elevation angle corresponding to the pupil 5. Here, the angle of incidence at the center of the angle of view is a center angle of an angle of radiation (an angle of projection) of the image light 1 projected from the projector 15. Further, the assumption range of an elevation angle corresponding to the pupil 5 is a range obtained by assuming an elevation angle at which a virtual image can be seen when the pupil 5 is moved. For example, the angle of incidence at the center of the angle of view is set such that specularly reflected light is reflected in a direction out of the assumption range of an elevation angle corresponding to the pupil 5, and such that a reflectance of light upon the Fresnel reflection is decreased as much as possible.

For example, the assumption range of an elevation angle corresponding to the pupil 5 is set to 0+/−10 degrees. This results in ensuring a region for viewing a virtual image even if an elevation angle is moved from the assumption pupil elevation angle $\alpha_0$ in a range of +/−10 degrees. Further, a maximum value of an amount of a reduction in light-source intensity that is caused due to Fresnel reflection is set to 30%. As can be seen from the graph illustrated in FIG. 3, a maximum angle of incidence is set to about 70 degrees. Further, the angle of incidence at the center of the angle of view is set such that an angle of incidence of the image light 1 on the first surface 31 is less than or equal to the maximum angle of incidence. Note that the assumption range of an elevation angle corresponding to the pupil 5 and the maximum value of an amount of a reduction in light-source intensity are not limited to the examples described above.

Figure 4:
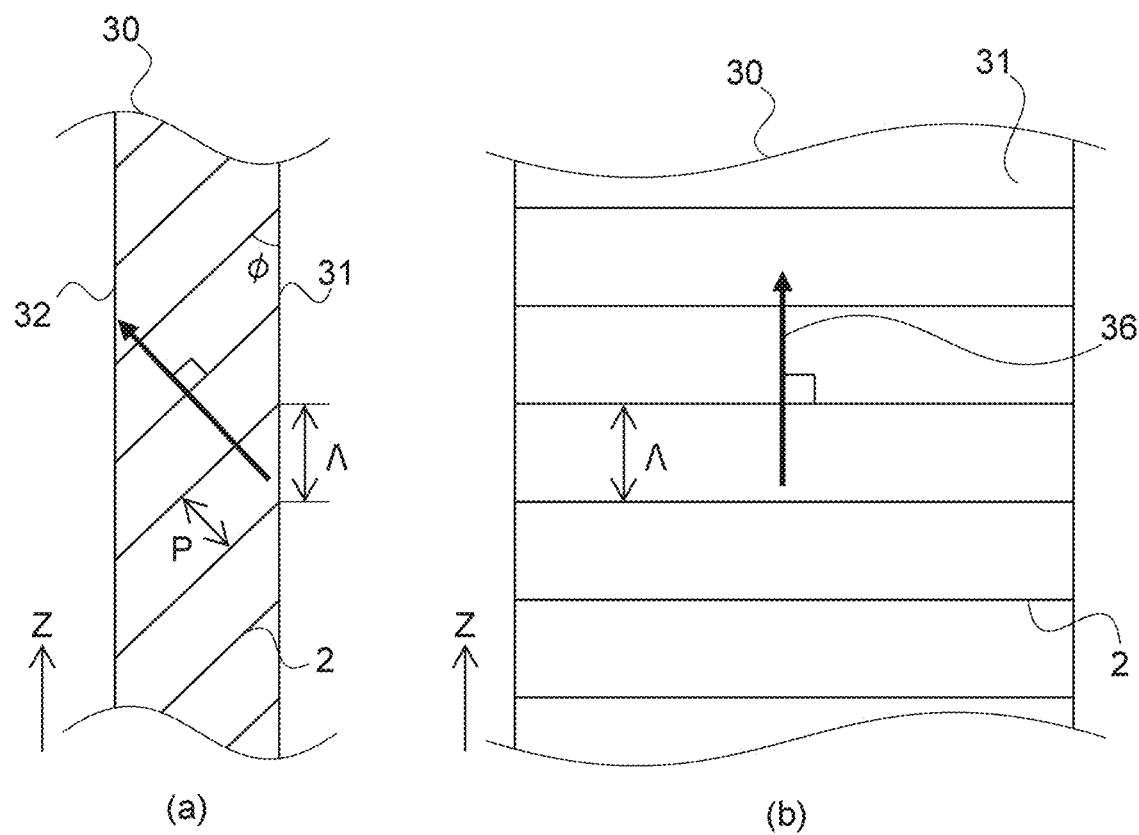
FIG. 4 schematically illustrates an example of a configuration of a reflective hologram.

FIG. 4 schematically illustrates an example of a configuration of the reflective hologram 30. (a) of FIG. 4 schematically illustrates a cross section in a thickness direction of the reflective hologram 30. (b) of FIG. 4 schematically illustrates the first surface 31 of the reflective hologram 30.

As illustrated in (a) of FIG. 4, the interference fringes 2 each having a slant angle $\varphi$ are formed at regular intervals in the reflective hologram 30. Here, the slant angle $\varphi$ is an angle formed by the interference fringe 2 and a surface of the reflective hologram 30 (the first surface 31 and the second surface 32). For example, light that enters the reflective hologram 30 is reflected at an angle corresponding to the angle of incidence and the slant angle cp. The slant angle $\varphi$ can be set to be a desired angle by adjusting a direction of incidence of laser light upon performing exposure to the laser light to generate the interference fringes 2.

As described above, the interference fringes 2 form a one-dimensional diffraction grating in the reflective hologram 30. (a) of FIG. 4 schematically illustrates a grating vector 36 of the interference fringes 2 using a thick-line arrow. The grating vector is a vector orthogonal to the respective interference fringes 2. In the present embodiment, exposure to light is performed to generate the interference fringes 2 having a grating vector (the slant angle $\varphi$) for performing diffraction with respect to the object image 3 at the assumption pupil elevation angle $\alpha_0$.

Note that a direction in which the interference fringe 2 extends is a horizontal direction orthogonal to the reference axis O. Thus, the grating vector is a vector that only includes a vertical component on the surface (the first surface 31 or the second surface 32) of the reflective hologram 30, as illustrated in (b) of FIG. 4.

The period of the interference fringes 2 in the reflective hologram 30 is hereinafter referred to as a grating pitch P, and the period of the interference fringes 2 on the surface of the reflective hologram 30 is hereinafter referred to as a boundary pitch A. The grating pitch P is a pitch determined by a wavelength and an exposure angle of laser light upon performing exposure to the laser light to generate the interference fringes 2. For example, the reflective holograms 30 of different grating pitches P are exposed to pieces of light for the respective wavelengths of pieces of light of R, G, and B. In this case, the reflective holograms 30 respectively corresponding to the pieces of light of R, G, and B are used by being arranged in a layered formation. Note that a single reflective hologram 30 may be exposed to light to generate the interference fringes 2 corresponding to a plurality of wavelengths when it is possible to perform multiple exposure using pieces of light of the plurality of wavelengths.

A relationship between an angle of incidence on the first surface 31 from the object-image surface 21 and an exit angle at which diffracted light exits the first surface 31 is represented using a formula indicated below.

$$\text{Sin } \theta_{in} + m\lambda/\Lambda = \text{Sin } \theta_{out} \quad (1)$$

Here, $\theta_{in}$ represents the angle of incidence, and $\theta_{out}$ represents the exit angle (an exit angle of diffraction). Further, $\Lambda$ represents a boundary pitch, $\lambda$ represents a primary wavelength of the image light 1 corresponding to a reconstruction light source, and m represents an integer that is greater than or equal to one.

For example, it is desirable that a full width at half maximum of a wavelength of the image light 1 be about 2 nm, as can be seen from Formula (1) described above, in order to display the virtual image 4 at a high resolution of about 100 ppi (pixel per inch). Thus, the use of the projector 15 including a laser source described with reference to FIG. 2 makes it possible to use pieces of narrowband light of R, G, and B as the image light 1, and thus to display a virtual image at a high resolution. In the following description, it is assumed that red light R of a wavelength of 647 nm, green light G of a wavelength of 524 nm, and blue light B of a wavelength of 446 nm are used as the pieces of light R, G, and B emitted from the projector 15.

[Angle of Diffraction with Respect to Reflective Hologram]

Figure 5:
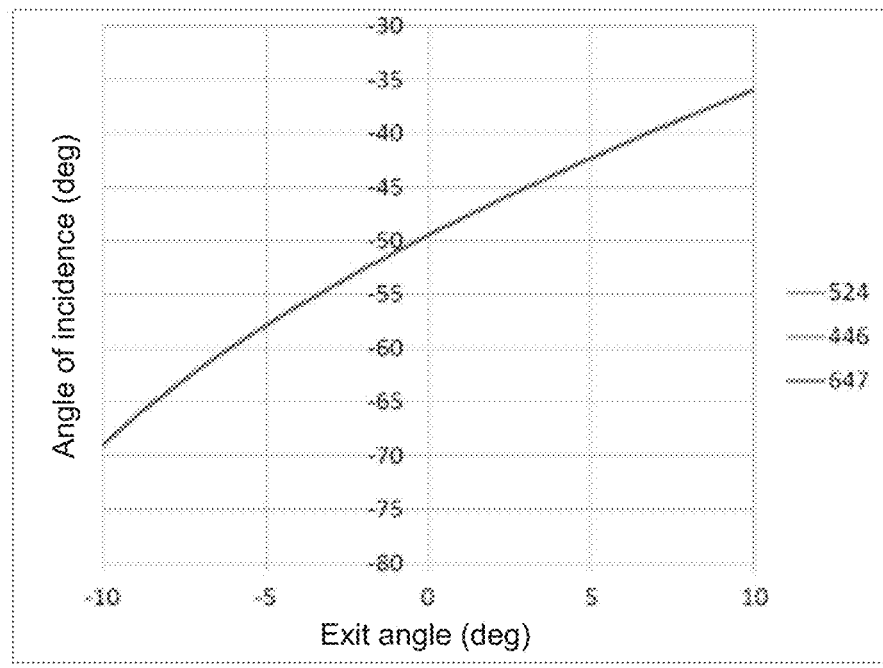
FIG. 5 is a graph illustrating a relationship between an angle of incidence and an exit angle with respect to the reflective hologram.

FIG. 5 is a graph illustrating a relationship between the angle of incidence $\theta_{in}$ and the exit angle $\theta_{out}$ with respect to the reflective hologram 30. A vertical axis of the graph represents the angle of incidence $\theta_{in}$, and a horizontal axis of the graph represents the exit angle $\theta_{out}$. FIG. 5 illustrates a relationship between the angle of incidence $\theta_{in}$ and the exit angle $\theta_{out}$ with respect to the reflective hologram 30 designed such that the exit angle of diffraction is in a range of 0+/−10 degrees relative to the pupil elevation angle, and the angle of incidence is greater than or equal to 70 degrees. Here, the graph is calculated on the assumption that the first surface 31 (or the second surface) corresponding to a grating surface is arranged parallel to the reference axis O. Note that the boundary pitch $\Lambda$ in the vertical direction on the first surface 31 is set for each of R, G, and B, as indicated below. In other words, the boundary pitch $\Lambda$ for the red light R is set to 851.6 nm, the boundary pitch $\Lambda$ for the green light G is set to 689 nm, and the boundary pitch $\Lambda$ for the blue light B is set to 587 nm.

As illustrated in FIG. 5, the red light R, the green light G, and the blue light B exhibit the same relationship between the angle of incidence $\theta_{in}$ and the exit angle $\theta_{out}$. For example, when the angle of incidence $\theta_{in}$ of the image light 1 is −50 degrees, the exit angle $\theta_{out}$ is about 0 degrees. Further, when the angle of incidence $\theta_{in}$ is −35 degrees, the exit angle $\theta_{out}$ is about 10 degrees, and when the angle of incidence $\theta_{in}$ is −70 degrees, the exit angle $\theta_{out}$ is about −10 degrees. Note that an angle of −70 degrees corresponds to the maximum angle of incidence set with reference to FIG. 3. Thus, when the angle of incidence $\theta_{in}$ is set to 50 degrees, the exit angle $\theta_{out}$ of +/−10 degrees is obtained. In other words, with respect to the image light 1 exiting from a point on the object-image surface 21 used to display the virtual image 4, a range of the angle of incidence $\theta_{in}$ that can be viewed when the pupil 5 is moved by +/−10 degrees from the assumption pupil elevation angle $\alpha_0$ is a range of from −35 degrees to −70 degrees.

[Angle of Diffusion Performed on Screen]

A method for setting an angle of diffusion performed on the screen 20 is described below. The angle of diffusion performed on the screen 20 is set on the basis of a relationship between an angle of radiation performed by the projector 15, and the angle of incidence $\theta_{in}$ and the exit angle $\theta_{out}$. In the following description, it is assumed that the angle of diffusion performed on the screen 20 is set in an example in which the reflective hologram 30 having the characteristics shown in the graph illustrated in FIG. 5 is used.

For example, it is assumed that an angle of projection performed by the projector 15 (a launch angle at the center of the angle of view) is set to −50 degrees, and an angle of radiation is set to +/−5 degrees. In this case, a range of the angle of incidence of the image light 1 entering the entrance surface 22 of the screen 20 is −50+/−5 degrees. Thus, it is sufficient if the angle of diffusion performed on the screen 20 is from −30 degrees to −75 degrees, in order to diffuse the image light 1 without reducing, for example, an amount of the image light 1, and to reduce unnecessary diffusion.

In this case, the size of the angle of diffusion is 45 degrees, and the angle of diffusion performed on the screen 20 is set to about +/−23 degrees, with the center angle in a diffusion direction being used as a reference. Note that an angular range of the angle of diffusion is obtained by adding the angle of radiation (+/−5 degrees) performed by the projector 15 to the range of the angle of incidence $\theta_{in}$ (from −35 degrees to −70 degrees) that provides the exit angle $\theta_{out}$ in the assumption range (+/−0 degrees) of an elevation angle corresponding to the pupil 5. This makes it possible to also diffuse, for example, the image light 1 entering the screen 20 at an elevation angle of from −45 degrees to −55 degrees, without reducing an amount of the image light 1. Note that the assumption pupil elevation angle $\alpha_0$ is set to 0 degrees in the description above, but the assumption pupil elevation angle $\alpha_0$ may be set to an angle other than 0 degrees.

A method for correcting for, for example, an angle of diffusion performed on the screen 20 that is set using the method described above is described below.

First, the assumption range of an elevation angle corresponding to the pupil 5 (a range of a movement of a pupil in an elevation direction) is corrected for. For example, a diffraction efficiency with respect to an elevation angle corresponding to an exit direction of diffracted light is calculated, the diffracted light exiting the first surface 31 of the reflective hologram 30 when a pitch (a grating pitch or a boundary pitch) that is set using the method described above is used. In the reflective hologram 30, the diffraction efficiency with respect to the elevation angle corresponding to the exit direction exhibits a distribution having a specified elevation angle as a peak when the azimuth angle is 0 degrees, which will be described later (refer to FIG. 7). A range of elevation angle (an exit elevation range) that is represented by a full width at half maximum of the diffraction efficiency with respect to the elevation angle corresponding to the exit direction is set to be the assumption range of an elevation angle corresponding to the pupil 5 again. This makes it possible to set other parameters (such as an angle of diffusion performed on the screen 20 and an angle of projection performed by the projector 15) on the basis of a range of elevation angle in which a bright virtual image can be observed.

As described with reference to FIG. 5 and Formula (1), the angle of incidence $\theta_{in}$ and the exit angle $\theta_{out}$ with respect to the first surface 31 correspond to each other on a one-to-one basis in the reflective hologram 30. Thus, a diffraction efficiency corresponding to an exit direction of diffracted light can also be said to be a diffraction efficiency corresponding to an incident direction of light incident on the first surface 31. For example, the diffraction efficiency corresponding to the incident direction in which light enters the reflective hologram 30 exhibits a peak at a specified elevation angle (black angle) when the azimuth is 0 degrees. A range of elevation angle (an incident elevation range) that is represented by a full width at half maximum of the peak distribution corresponds to the corrected assumption range of an elevation angle corresponding to the pupil 5 (the exit elevation range).

In the present embodiment, the angle of diffusion performed on the screen 20 in the elevation direction is corrected for an angle in an incident elevation range. In other words, the angle of diffusion performed on the screen 20 in the elevation direction is set to be an angle represented by the incident elevation range corresponding to a range of an elevation angle corresponding to a direction of incidence of the image light 1 on the first surface 31, the range of the elevation angle corresponding to the incident direction being a range in which the diffraction efficiency exhibits a value greater than or equal to half the peak value, with an azimuth component in the incident direction being orthogonal to the first surface 31. In the present embodiment, the incident elevation range corresponds to a third angular range.

Further, an angle of diffusion performed on the screen 20 in the azimuth direction is set on the basis of the diffraction efficiency of the reflective hologram 30. Specifically, the angle of diffusion in the azimuth direction is set in a range of the azimuth angle (an incident azimuth range) represented by a full width at half maximum of the diffraction efficiency with respect to the azimuth angle of in the incident direction. In other words, the angle of diffusion performed on the screen 20 in the azimuth direction is set to an angle represented by the incident azimuth range corresponding to a range of an azimuth angle corresponding to the incident direction, the range of the azimuth angle corresponding to the incident direction being a range in which the diffraction efficiency exhibits a value greater than or equal to half the peak value in the incident elevation range. In the present embodiment, the incident azimuth range corresponds to a fourth angular range.

As described above, the angle of diffusion performed on the screen 20 is set on the basis of the diffraction efficiency depending on the incident direction. This makes it possible to diffract the image light 1 entering the screen 20 with a diffraction efficiency exhibiting a value greater than or equal to half the peak value, and thus to brightly display a virtual image.

Note that the angle of diffusion performed on screen 20 may be set on the basis of the angle of radiation performed by the projector 15. For example, an elevation component of the angle of radiation is added to the angle of diffusion in the elevation direction, which is set in an incident elevation range. Further, an azimuth component of the angle of radiation is added to the angle of diffusion in the azimuth direction, which is set in an incident azimuth range. Thus, the image light 1 diffusely exits the screen 20 at an angle in an angular range obtained by adding the angle of radiation performed by the projector 15 to the incident elevation range and the incident azimuth range.

This enables the image light 1 to enter the reflective hologram 30 at an angle in an angular range with a high degree of efficiency in diffraction without diffusing the image light 1 in an undesired direction, and thus to greatly improve the brightness in virtual-image display. Note that the example of correcting for an angle of diffusion has been described above. However, an angle of diffusion that is calculated at each stage can also be used as an actual design value.

Further, the angle of projection performed by the projector 15 may also be corrected. For example, when, for example, an elevation angle in which the diffraction efficiency exhibits a peak is shifted in the reflective hologram 30, an angle of a peak of the diffraction efficiency can be shifted from the Bragg angle by changing a slant angle, with a pitch of the interference fringe 2 remaining fixed. In this case, it is desirable that the angle of projection performed by the projector 15 be changed according to an angle of a peak with the changed slant angle. This makes it possible to maintain the brightness in virtual-image display even when the angle of the peak is shifted.

Note that the screen 20 having a perfect diffusion property may be used. The perfect diffusion property is the property of uniformly diffusing incident light. In this case, the image light 1 entering the screen 20 in a range of angle of radiation is uniformly diffused from the side of the object-image surface 21. Consequently, for example, the assumption range of an elevation angle corresponding to the pupil 5 can be easily made larger.

For example, a diffusion sheet is used as the screen 20. The diffusion sheet is used by being bonded to a transparent member such as glass or an acrylic plate using, for example, a light-transmissive optical adhesive (an optical clear adhesive, OCA). This results in obtaining a transmissive diffusion screen. Further, a reflective diffusion sheet may be formed by attaching a diffusion sheet to the surface of a mirror. Furthermore, a diffusion plate formed by sanding, for example, a glass plate may be used as the screen 20.

Further, for example, a volume scattering diffusion plate, or a diffusive hologram having an angle of diffusion may be used as the screen 20. The diffusive hologram is a hologram that is exposed to light to generate interference fringes using diffused light as object light, and includes an angle-selective diffusion function. The diffusive hologram is created by, for example, two-beam exposure using object light (diffused light) that exits a diffusion sheet having an angle of diffusion of +/−23 degrees, and a reference light of an angle of 50 degrees. In this case, it is desirable that light of the same wavelength as the image light 1 from the projector 15 be used as the object light and the diffused light. This makes it possible to obtain the screen 20 diffusing the image light 1 with a high degree of accuracy. Moreover, for example, a projection laser projector, or a liquid crystal panel using a laser source as a backlight may be used as a light source for the object image 3.

[Arrangement of Reflective Hologram and Screen]

Figure 6:
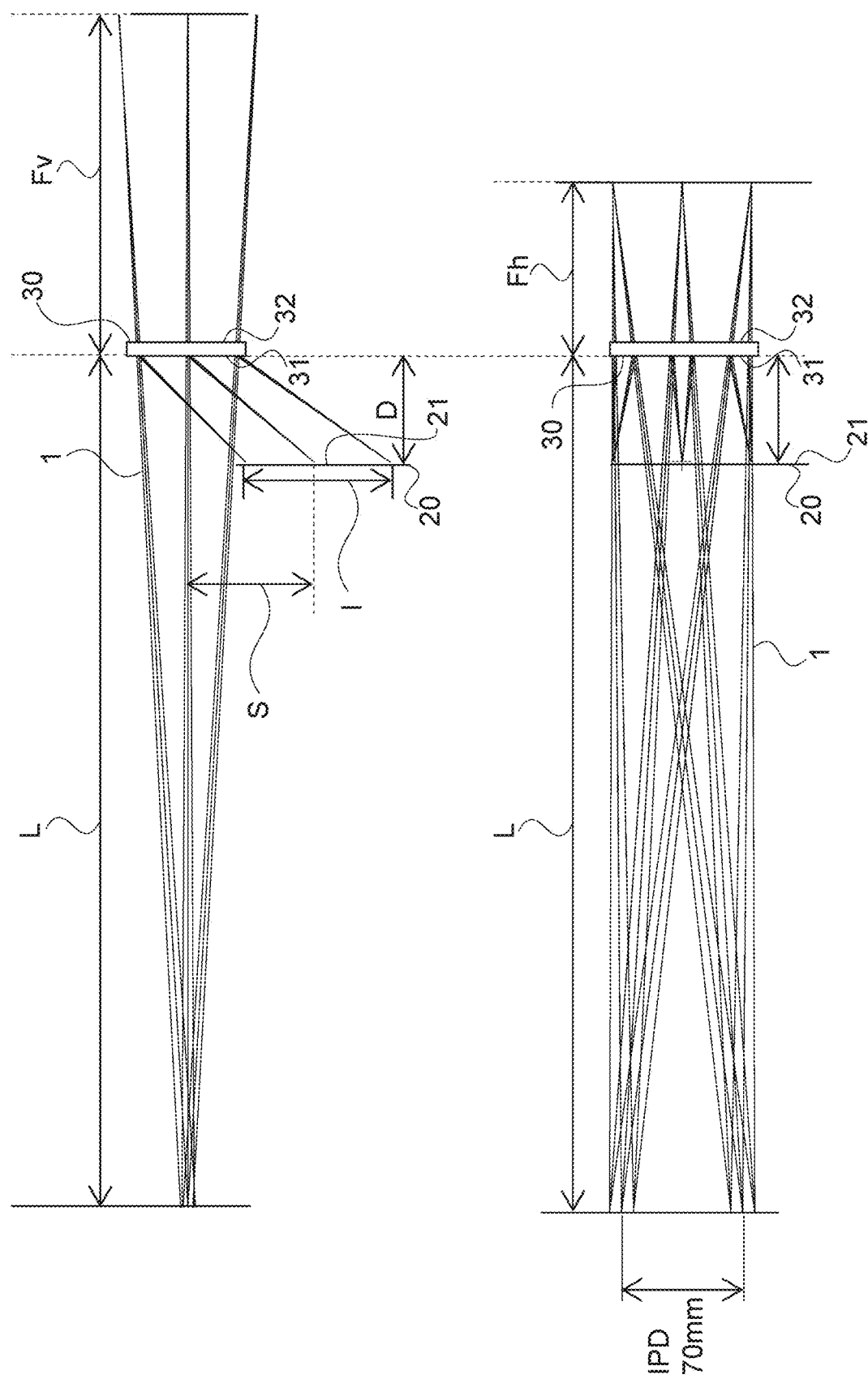
FIG. 6 is a set of light-path diagrams illustrating examples of a path of image light that causes a virtual image to be displayed.

FIG. 6 is a set of light-path diagrams illustrating examples of a path of the image light 1 causing the virtual image 4 to be displayed. A diagram in an upper portion of FIG. 6 is a light-path diagram when the display unit 10 is viewed from the horizontal direction, and a diagram in a lower portion of FIG. 6 is a light-path diagram when the display unit 10 is viewed from the vertical direction.

In the figure, a distance L is a distance from the first surface 31 to a location of the pupil 5. Note that an illustration of the pupil is omitted in FIG. 6. A distance D is a space between the first surface 31 and the object-image surface 21. S is an amount of shift of the center of the object image 3 from the center of the first surface 31 along the reference axis O. I is a size of the object image 3. Further, a length Fv is a virtual-image focal length in a vertical direction of the reflective hologram 30, and a length Fh is a virtual-image focal length in a horizontal direction of the reflective hologram 30.

Further, in FIG. 6, the assumption pupil elevation angle $\alpha_0$ is set to 0 degrees, and the angle of projection performed by the projector 15 is set to 50 degrees. Further, the pupil 5 (not illustrated) is arranged at a location (on the left in the figure) situated away from the first surface 31 by the distance L. Note that it is assumed that the left and right pupils 5 are arranged in the diagram in the lower portion. Spacing of the pupils 5 is represented by an interpupillary distance (IPD). The pupil 5 has an aperture diameter of about 3 mm, and the IPD is about 70 mm. The light path illustrated in FIG. 6 is obtained by tracing a ray of the image light 1 of the object image 3 when an observer who looks at the reflective hologram 30 under the conditions described above visually recognizes a virtual image at a location that corresponds to the virtual-image focal length Fh in the horizontal direction from the first surface 31.

The reflective hologram 30 is configured such that the diffraction efficiency exhibits a peak value when the assumption pupil elevation angle $\alpha_0$ is 0 degrees, and the angle of projection performed by the projector 15 is set to 50 degrees. Further, the screen 20 is arranged such that the object-image surface 21 is situated closer to the pupil 5 by the distance D than the first surface 31 and such that the center of the object-image surface 21 is at a location shifted from the center of the first surface 31 in the vertical direction by the shift amount S. Such an arrangement results in displaying a virtual image at a location that corresponds to the virtual-image focal length Fh in the horizontal direction.

Further, the virtual-image focal length Fv in the vertical direction exhibits about twice the value of Fh due to the aberration of the reflective hologram 30. Thus, the reflective hologram 30 focuses the virtual image 4 on a location situated further away from the pupil 5 than a location corresponding to the virtual-image focal length Fv in the horizontal direction, as viewed from the pupil 5. In this case, for example, a monocular focal position is situated at about a midpoint of a line that connects locations of a virtual image in the vertical direction and in the horizontal direction, and there is a possibility that the monocular focal position will not coincide with a focal position due to angle of convergence. On the other hand, if a focal position and a focal position due to angle of convergence do not coincide with each other, for example, upon three-dimensional display using a parallax-barrier approach using an angle of convergence, a focal point of a three-dimensional object will be recognized as being at the focal position due to angle of convergence. Thus, in the system illustrated in FIG. 6, a virtual image is also recognized as being at a virtual-image focal point in the horizontal direction.

Further, the focal position (the virtual-image focal length) in the horizontal direction slightly differs depending on a virtual-image height in the vertical direction. In this case, it is desirable that the position of the object-image surface 21 (the screen 20) be determined such that the reference axis O passes through the center of the virtual image 4. This makes it possible to display the virtual image 4 circumferentially about the reference axis O, and thus to display the virtual image without bringing an uncomfortable feeling if there is a change in an orientation of the pupil 5.

[Virtual Image Display Performed by Reflective Hologram]

Figure 7:
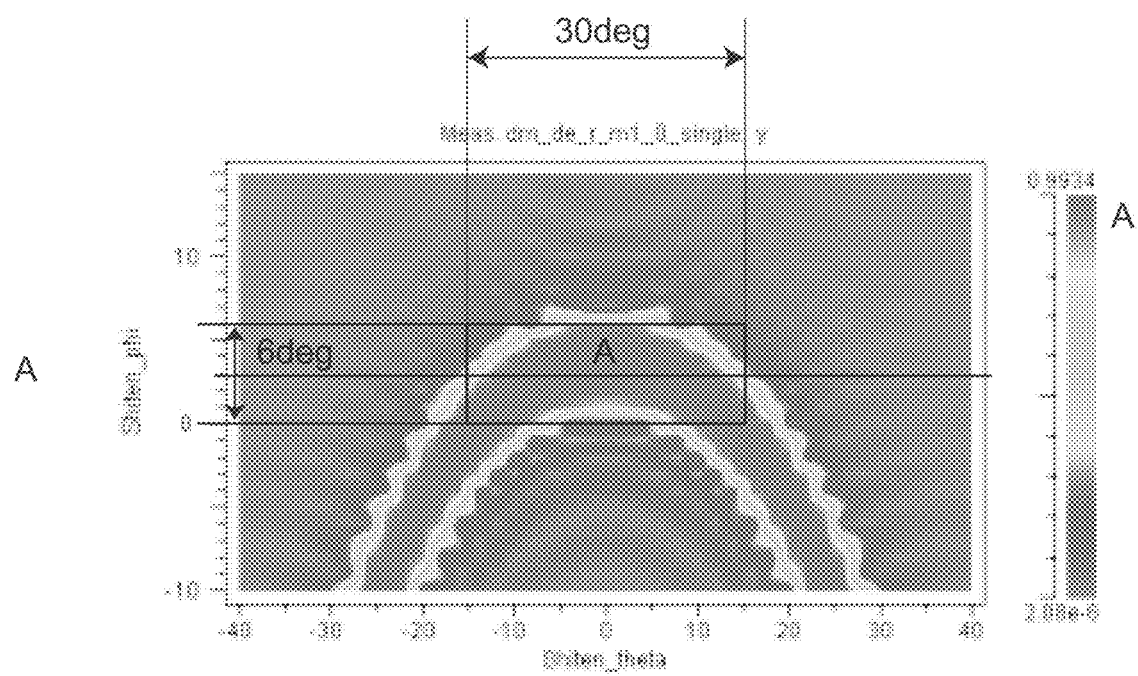
FIG. 7 is a schematic diagram used to describe a virtual image displayed by a single reflective hologram.
Figure 7:
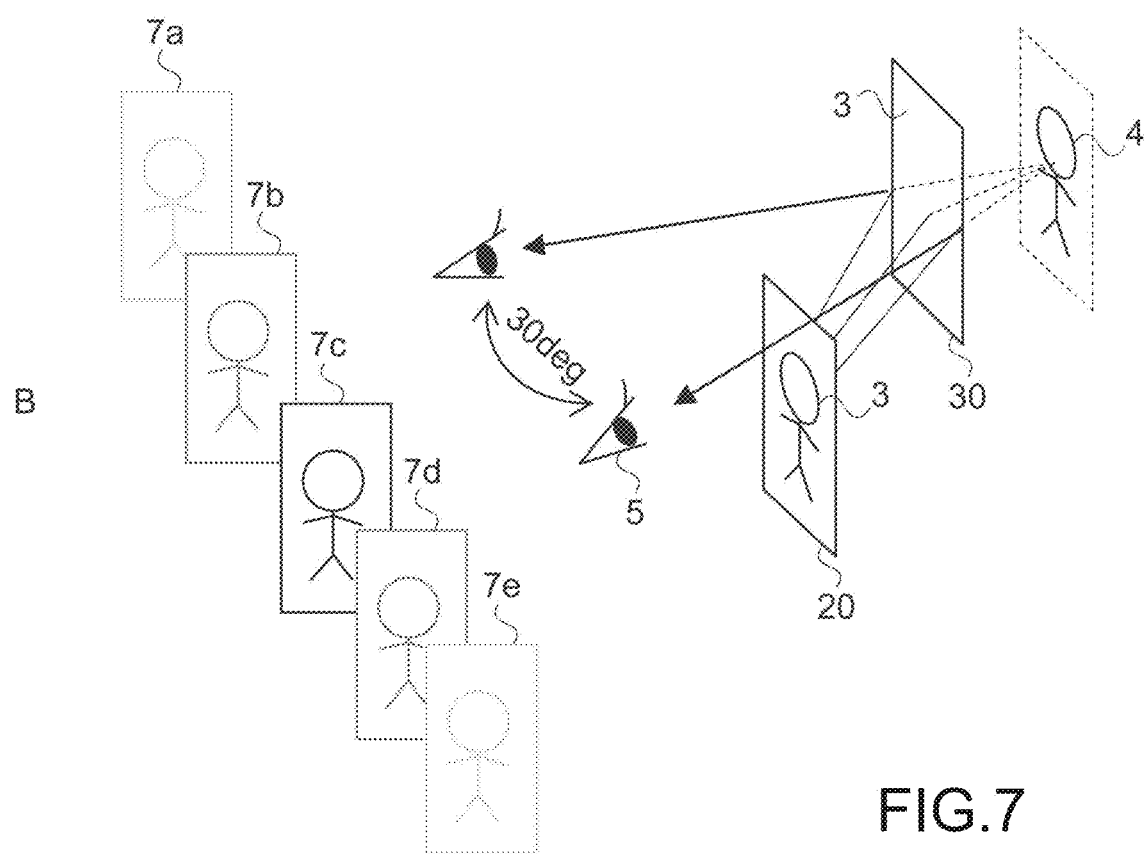

FIG. 7 is a schematic diagram used to describe a virtual image displayed by a single reflective hologram 30. A of FIG. 7 is a map of an example of a distribution of a diffraction efficiency of the reflective hologram 30 depending on an elevation angle and an azimuth angle corresponding to an exit direction. A vertical axis of the map represents an elevation angle corresponding to an exit direction of the image light 1 (diffracted light) exiting the first surface 31, and a horizontal axis of the map represents an azimuth angle corresponding to the exit direction. Further, a color of each point represents the diffraction efficiency depending on the elevation angle and azimuth angle corresponding to the exit direction.

The map illustrated in A of FIG. 7 shows a distribution of the efficiency in diffraction performed by the reflective hologram 30 for green light G. The reflective hologram 30 exhibits a refractive index of 1.51, and a difference in refractive index $\Delta n$ of 0.035. Further, a slant angle is set to about 78 degrees. Note that the thickness of the reflective hologram 30 is set in a range of, for example, several micrometers to several tens of micrometers.

In this distribution of a diffraction efficiency, a strip-shaped region A that is convex upward is a region that exhibits a higher diffraction efficiency than a region other than the region A. Further, the diffraction efficiency in the strip-shaped region A exhibits a distribution symmetric about the azimuth angle $\beta=0$ in the azimuth direction.

A range of elevation angle (the exit elevation range) that is represented by a full width at half maximum of the diffraction efficiency in an elevation direction when the azimuth angle $\beta=0$ degrees, is from about 0 degrees to about 6 degrees. Here, the azimuth angle $\beta=0$ degrees when an azimuth component in the exit direction is orthogonal to the first surface 31. Thus, the exit elevation range is a range of an elevation angle corresponding to an exit direction of the image light 1 exiting the first surface 31, the range of the elevation angle corresponding to the exit direction being a range in which the diffraction efficiency exhibits a value greater than or equal to the first value, with an azimuth component in the exit direction being orthogonal to the first surface 31. In the present embodiment, the exit elevation range corresponds to a first angular range.

In A of FIG. 7, the center angle of the exit elevation range is 3 degrees, and an angle represented by the exit elevation range is about 6 degrees. Thus, the virtual image 4 is reproduced with a diffraction efficiency that exhibits a value greater than or equal to half the peak value. Further, in the example illustrated in A of FIG. 7, a full width at half maximum of the diffraction efficiency in an azimuth direction exhibits a maximum value at the center angle of the exit elevation range (about 3 degrees).

A range of azimuth angle (an exit azimuth range) that is represented by a full width at half maximum of the diffraction efficiency in an azimuth direction at the center angle of the exit elevation range is about −15 degrees to about 15 degrees. Note that the full width at half maximum in the azimuth direction does not always exhibit a maximum value at the center angle of the exit elevation range. In this case, the exit azimuth range may be set as appropriate such that the full width at half maximum of the diffraction efficiency in the azimuth direction exhibits a maximum value in the exit elevation range. As described above, the exit azimuth range is a range of an azimuth angle corresponding to an exit direction, the range of the azimuth angle corresponding to the exit direction being a range in which the diffraction efficiency exhibits a value greater than or equal to half the peak value in the exit elevation range. In the present embodiment, the exit azimuth range corresponds to a second angular range.

In A of FIG. 7, an angle represented by the exit azimuth range is about 30 degrees. Thus, at the center angle (about 3 degrees) of the exit elevation range, the virtual image 4 is reproduced with a diffraction efficiency that exhibits a value greater than or equal to half the peak value in the exit azimuth range when 13=+/−15 degrees. In A of FIG. 7, the exit elevation range and the exit azimuth range are indicated by a rectangular region.

Further, when the assumption pupil elevation angle $\alpha_0$ is changed to 3 degrees and the virtual-image focal length Fh in the horizontal direction is recalculated, the virtual-image focal length at an elevation angle of 3 degrees exhibits a value (Fh') greater than Fh. As described above, in the present embodiment, the assumption pupil elevation and the virtual-image focal length are corrected according to the efficiency in diffraction performed by the reflective hologram 30.

B of FIG. 7 schematically illustrates an example of display of a virtual image that is performed by a single reflective hologram 30. B of FIG. 7 schematically illustrates the display unit 10 including a set of the reflective hologram 30 and the screen 20 (the object-image surface 21). Further, B of FIG. 7 illustrates examples of visually recognized images 7a to 7e (the virtual images 4) that are visually recognized by an observer when a viewing direction is changed by an elevation angle of 3 degrees and the first surface 31 is viewed. Note that a color of the visually recognized image 7 represents the brightness, and a darker gray indicates a brighter image.

The visually recognized image 7c is an image when the virtual image 4 is viewed at an azimuth angle of 0 degrees, and is a bright image caused by the image light 1 to be displayed, the image light 1 being diffracted with a high degree of diffraction efficiency exhibiting a value close to the peak value. The visually recognized images 7b and 7d are images when the virtual image 4 is viewed at an azimuth angle of −15 degrees and at an azimuth angle of +15 degrees. In this case, the diffraction efficiency exhibits a value equal to about half the peak value, and the images are displayed with a brightness that enables visual recognition. The visually recognized images 7b and 7d are images when the virtual image 4 is viewed at an azimuth angle less than or equal to −15 degrees and greater than or equal to +15 degrees, and the images are so dark that visual recognition is difficult.

As described above, when a virtual image is displayed using a single reflective hologram 30, a full width at half maximum of the diffraction efficiency in the azimuth direction (the exit azimuth range) at an elevation angle of 3 degrees exhibits +/−15 degrees. Thus, when the azimuth angle is changed by 15 degrees or more due to an observer moving, the brightness of the virtual image 4 is reduced by half or more.

[Virtual Image Display Performed by Image Display Apparatus]

In the present embodiment, a plurality of reflective holograms 30 is arranged circumferentially about the reference axis O such that the virtual image 4 can be continuously visually recognized even when there is a change in azimuth angle. Specifically, an angle formed by the perpendiculars 6 of the first surfaces 31 being included in the reflective holograms 30 of the plurality of reflective holograms 30 and being adjacent to each other, is set to be an angle that is less than or equal to an angle represented by the incident elevation range corresponding to a range of an azimuth angle corresponding to an exit direction, the range of the azimuth angle corresponding to the exit direction being a range in which the diffraction efficiency exhibits a value greater than or equal to the first value in the exit elevation range.

For example, when the reflective hologram 30 exhibiting the distribution of a diffraction efficiency illustrated in A of FIG. 7 is used, the angle formed by the perpendiculars 6 of the first surfaces 31 of the reflective holograms 30 circumferentially adjacent to each other is set to be an angle (30 degrees) represented by the exit azimuth range. In this case, a polygonal prism is formed that includes twelve surfaces of the reflective holograms 30 (the first surfaces 31) arranged circumferentially about the reference axis O.

Further, the radius of the inscribed circle 11a inscribed in the polygonal prism formed of the first surfaces 31 is set to the virtual-image focal length Fh' in the horizontal direction, the virtual-image focal length Fh' being recalculated in response to the assumption pupil elevation angle $\alpha_0$ being changed. This enables the reference axis O to accurately pass through the center of a location at which the virtual image 4 is displayed. This results in preventing a virtual image displayed inside of adjacent hologram surfaces from becoming invisible when the pupil 5 is moved 360 degrees in the azimuth direction at an elevation angle of 3 degrees. This makes it possible to display, in all directions of 360 degrees, the virtual image 4 of the object image 3 formed circumferentially about the reference axis O.

Note that, in response to a change in Δn or a change in a thickness of the reflective hologram 30 (a photopolymer), there is a change in a full width at half maximum in the azimuth direction (the exit azimuth range) with respect to an angle of a peak of the diffraction efficiency in the elevation direction at an azimuth angle of 0 degrees. Thus, an angle formed by the perpendiculars may be changed as appropriate according to a full width at half maximum of diffraction. Further, the angle formed by the perpendiculars may be set in advance in a range less than or equal to the exit azimuth range. This results in there being no need to change a design even when, for example, there is a reduction in exit azimuth range.

Figure 8:
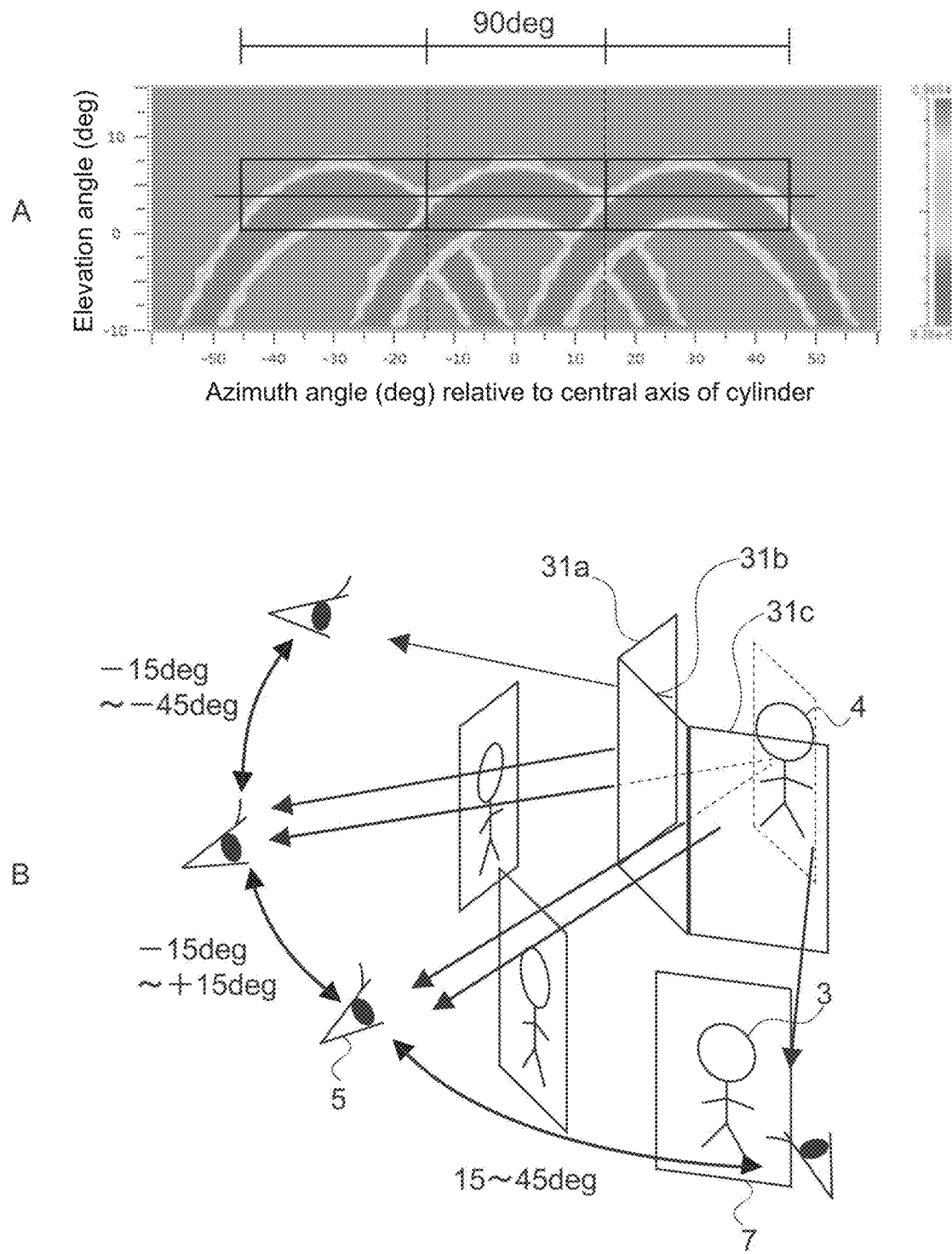
FIG. 8 is a schematic diagram used to describe a virtual image displayed by the image display apparatus.

FIG. 8 is a schematic diagram used to describe a virtual image displayed by the image display apparatus 100. A of FIG. 8 is a map of an example of distributions of diffraction efficiencies of a plurality of reflective holograms 30 arranged in the image display apparatus 100. B of FIG. 8 schematically illustrates an example of display of a virtual image that is performed by the image display apparatus 100. B of FIG. 8 schematically illustrates a portion of the image display apparatus 100 including three adjacently arranged reflective holograms 30a to 30c. The reflective hologram 30a to 30c are arranged such that an angle formed by the perpendiculars to the first surfaces 31 being adjacent to each other is an angle represented by the exit azimuth range (30 degrees).

The map illustrated in A of FIG. 8 shows distributions of the efficiencies in diffractions depending on the exit direction that are performed by the three reflective holograms 30a to 30c illustrated in B of FIG. 8. A vertical axis represents an elevation angle corresponding to an exit direction in which light exits each of the reflective holograms 30, and a horizontal axis represents an azimuth angle formed circumferentially about the reference axis O in the exit direction. In A of FIG. 8, a direction that is orthogonal to the reflective hologram 30b arranged in the center corresponds to an azimuth angle of 0 degrees. Note that the distributions of the efficiencies in diffractions performed by the reflective holograms 30a to 30c are each similar to the distribution of the diffraction efficiency illustrated in A of FIG. 7.

As illustrated in A of FIG. 8, exit azimuth ranges in the reflective holograms 30 are continuously arranged in the image display apparatus 100. Thus, the diffraction efficiency is maintained at a value greater than or equal to half the peak value at the assumption pupil elevation angle $\alpha_0$ (3 degrees) in a range of azimuth angle of +/−45 degrees. Thus, in the range of azimuth angle of +/−45 degrees, the image light 1 can be diffracted with a high degree of diffraction efficiency regardless of azimuth angle.

An azimuth angle (a display azimuth angle) at which the reflective hologram 30b arranged in the center displays the virtual image 4 is in a range of +/−15 degrees. Likewise, as viewed from the pupil 5, a display azimuth angle of display performed by the reflective hologram 30a arranged on the left of the reflective hologram 30b is in a range of from −45 degrees to −15 degrees, and a display azimuth angle of display performed by the reflective hologram 30c arranged on the right of the reflective hologram 30b is in a range of from 15 degrees to 45 degrees.

For example, it is assumed that an observer who looks at the reflective hologram 30b arranged in the center moves to the left. In this case, the virtual image 4 formed by the reflective hologram 30b can be visually recognized at an azimuth angle of up to −15 degrees. Further, the virtual image 4 formed by the reflective holograms 30b and 30a with a diffraction efficiency that exhibits a value equal to half the peak value, is displayed when the azimuth angle $\beta = -15$ degrees. Furthermore, the virtual image 4 displayed by the reflective hologram 30a can be visually recognized at an azimuth angle less than or equal to −15 degrees.

As described above, the reflective holograms 30 (the first surfaces 31) adjacent to each other exhibit the same diffraction efficiency when the pupil 5 is moved in the azimuth direction at an elevation angle of 3 degrees. This makes it possible to continuously display the virtual image 4 of the object image 3, and thus to observe display of a virtual image with a stereoscopic effect from all directions of 360 degrees. Further, there are constraints on the diffraction efficiency of the reflective hologram 30. This results in preventing an image of the screen 20 paired with the reflective hologram 30 from being reflected in display of a virtual image. This makes it possible to provide high-quality display of a virtual image.

As described above, the image display apparatus 100 according to the present embodiment includes a plurality of display units 10 each including the screen 20 and the reflective hologram 30, and the reflective hologram 30 is arranged to at least partially surround the reference axis O. The image light 1 of the object image 3 formed on the screen 20 is diffracted by the reflective hologram 30 to exit the first surface 31 situated opposite to the reference axis O, and, on the side of the second surface 32 facing the reference axis O, the virtual image 4 of the object image 3 is displayed in a state of being superimposed on a background. This makes it possible to display the virtual image 4 onto a region around the reference axis O, and thus to perform display of a virtual image with a sense of reality.

An approach using a phenomenon called Pepper's Ghost is an example of the method for superimposing an image on a background. In this approach, an image on a display is reflected off a half mirror to be head for an observer, and a virtual image of the image is displayed. The following method is conceivable: providing a plurality of pairs of the display and the half mirror; and arranging each of the plurality of pairs in an azimuth direction.

Figure 9:
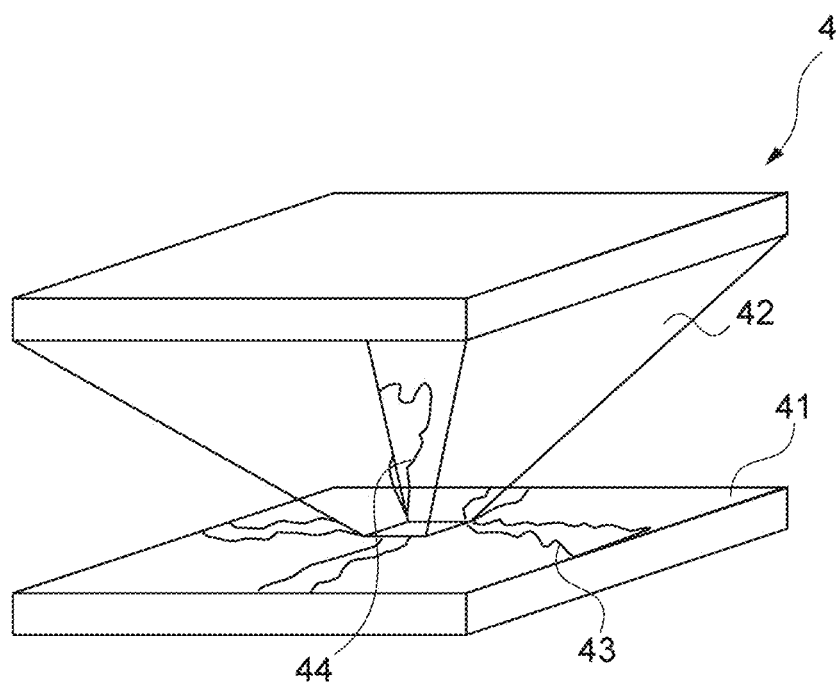
FIG. 9 schematically illustrates a display apparatus of a comparative example.

FIG. 9 schematically illustrates a display apparatus 40 of a comparative example. The display apparatus 40 illustrated in FIG. 9 is an example of an apparatus that displays a virtual image using Pepper's Ghost described above. The display apparatus 40 includes a display 41 and a half mirror 42. The half mirror 42 has a shape of a quadrangular pyramid of which an apex has been cut off, and is arranged such that its cut surface faces the display 41. For example, an image 43 displayed on the display 41 is reflected off the half mirror 42 to be headed for an outer periphery of the apparatus. This results in displaying a virtual image 44 of the image 43 inside of the half mirror 42 having the quadrangular-pyramid shape.

It is desirable that the brightness of an image obtained by superimposing a virtual image on a background be high, in order to secure the visibility in a light field. However, the adoption of the method using the display apparatus 40 results in a trade-off between a transmittance of the half mirror 42 and the brightness in display. This may result in difficulty in securing the brightness in display while maintaining a high brightness of a background.

Figure 10:
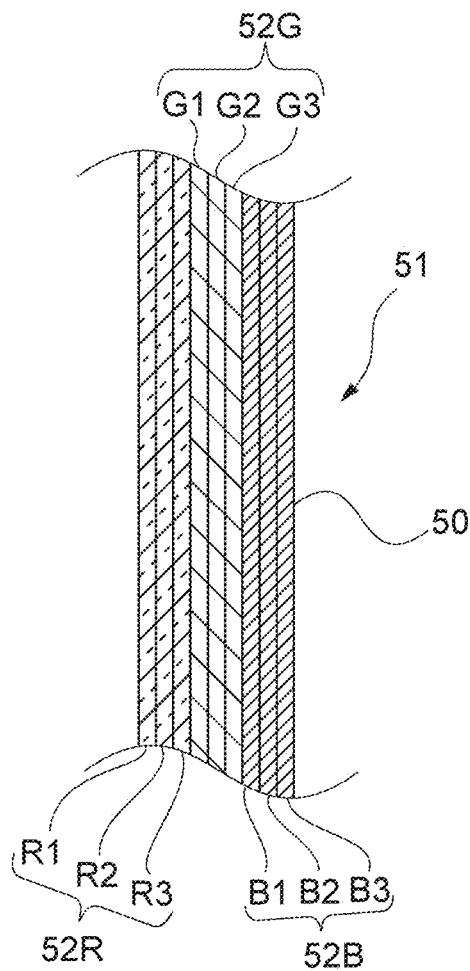
FIG. 10 schematically illustrates an example of a configuration of a reflective hologram according to a second embodiment.

Further, for example, there is a need to set a perpendicular to the half mirror 42 to be oriented toward a direction intermediate between a direction of the perpendicular to the display 41 and a line-of-sight direction toward which a pupil of an observer is oriented, in order to display an image in a state of being superimposed on a background. Thus, when the half mirror 42 is placed to face all directions, in order to circumferentially perform observation, there will be a need to arrange the half mirror 42 in the form of a cone or a pyramid, as illustrated in FIG. 10.

Thus, there is a need to display, in a small size, the virtual image 44 displayed via a portion around the apex of the half mirror. When, for example, the virtual image 44 formed along a direction of an axis of the pyramid is displayed, a width of the portion around the apex of the half mirror 42 will restrict a size of the virtual image 44. Further, when the width near the apex is made larger, a base of the pyramid will be made larger, and the apparatus will be made larger in size. Furthermore, when an angle formed by adjacent surfaces is small, an unintended image may be reflected.

In the present embodiment, the reflective holograms 30 of a plurality of reflective holograms 30 are arranged to surround the reference axis O. Further, the respective reflective holograms 30 are arranged parallel to the reference axis O to form a structure of a polygonal prism. This makes it possible to display a highly transparent virtual image through which light of a background is sufficiently transmitted. Further, the use of the reflective hologram 30 makes it possible to diffract the image light 1 of the object image 3 with a selectively high degree of efficiency. This results in greatly improving the brightness in displaying a background and a virtual image, and thus in being able to provide a high degree of visibility. Further, each reflective hologram 30 is rectangular. Thus, for example, a virtual image that can be displayed has the same size regardless of the vertical position, and this makes it possible to display a highly versatile virtual image.

Further, as described with reference to, for example, FIG. 8, a peak of a diffraction efficiency is set for the assumption pupil elevation angle $\alpha_0$. Furthermore, the first surfaces 31 adjacent to each other are arranged to exhibit the same diffraction efficiency in the azimuth direction. This results in preventing the virtual image 4 from disappearing when the pupil 5 is moved in the azimuth direction. Further, the diffraction efficiency is maintained at a high value, and thus the bright virtual image 4 can be displayed to be visible from all directions.

Further, the radius of the inscribed circle 11a inscribed in the reflective holograms 30 is set to a value corresponding to a virtual-image focal length at an elevation angle at which the diffraction efficiency exhibits a peak value. This makes it possible to reduce a change in the position of a virtual image that is caused due to the pupil 5 being moved. This results in being able to observe, from all directions, the bright virtual image 4 displayed circumferentially about the reference axis O in a state of being superimposed on a background, and thus to greatly improve a sense of reality and a stereoscopic effect that are provided upon displaying a virtual image.

Second Embodiment

An image display apparatus according to a second embodiment of the present technology is described. In the following description, descriptions of a configuration and an operation similar to those of the image display apparatus 100 described in the embodiment above are omitted or simplified.

FIG. 10 schematically illustrates an example of a configuration of a reflective hologram 50 according to the second embodiment. In the present embodiment, the reflective holograms 50 generated under different exposure conditions are arranged in a layered formation in order to continuously keep the diffraction efficiency in one plane in the elevation direction and in the azimuth direction. Specifically, several types of reflective holograms 50 (photopolymers) are used, the several types of reflective holograms 50 being exposed to light under the condition that only the slant angle φ is changed and the boundary pitch Λ remains unchanged.

In the present embodiment, nine types of reflective holograms 50 are arranged in a layered formation to be used, as illustrated in FIG. 10. The nine types of reflective holograms 50 arranged in a layered formation are hereinafter referred to as a hologram portion 51. FIG. 10 schematically illustrates a cross section obtained by cutting the hologram portion 51 in a direction of the arrangement in a layered formation.

The hologram portion 51 includes three types of reflective holograms R1 to R3 that diffract red light, three types of reflective holograms G1 to G3 that diffract green light, and three types of reflective hologram B1 to B3 that diffract blue light. In the example illustrated in FIG. 10, the reflective holograms R1 to R3, the reflective holograms G1 to G3, and the reflective holograms B1 to B3 are arranged in a layered formation in this order from the left in the figure. In the following description, the reflective holograms R1 to R3 arranged in a layered formation are referred to as a red hologram 52R, the reflective holograms G1 to G3 arranged in a layered formation are referred to as a green hologram 52G, and the reflective holograms B1 to B3 arranged in a layered formation are referred to as a blue hologram 52B. The order and the like of arranging the reflective holograms 50 in a layered formation are not limited.

Figure 11:
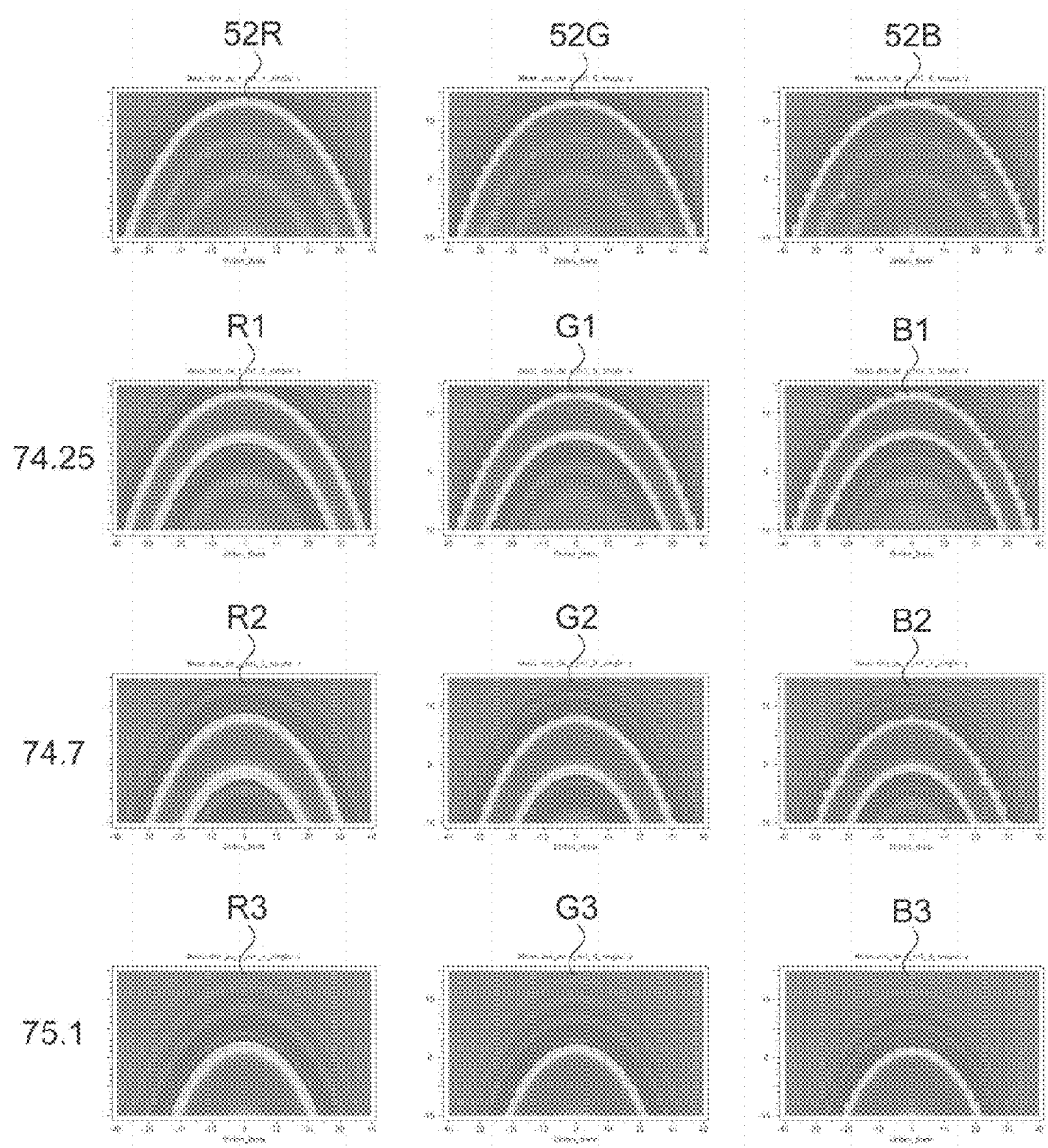
FIG. 11 is a set of maps of an example of a distribution of a diffraction efficiency of a hologram portion.

FIG. 11 is a set of maps of an example of a distribution of a diffraction efficiency of the hologram portion 51. In a column on the left of the figure, distributions of diffraction efficiencies of the red hologram 52R, and of the reflective holograms R1 to R3 diffracting red light are given in this order from the top. Further, in a column in a center portion of the figure, distributions of diffraction efficiencies of the green hologram 52G, and of the reflective holograms G1 to G3 diffracting green light are given in this order. Furthermore, in a column on the right of the figure, distributions of diffraction efficiencies of the blue hologram 52B, and of the reflective holograms B1 to B3 diffracting blue light are given in this order. Exposure wavelengths of red light, green light, and blue light are 647 nm, 524 nm, and 446 nm, respectively.

Further, slant angles are respectively set to 74.25 degrees, 74.7 degrees, and 75.1 degrees in the second, third, and fourth lines from the top in the figure. For example, in the case of the reflective hologram R1 having a smaller slant angle than the reflective hologram R2, a strip-shaped region A that is convex upward is shifted in a positive elevation direction, and expands in a positive azimuth direction and in a negative azimuth direction. Further, in the case of the reflective hologram R1 having a larger slant angle than the reflective hologram R2, the region A is shifted in a negative elevation direction, and is reduced in the positive azimuth direction and in the negative azimuth direction. As described above, the range in which the diffraction efficiency is relatively high is changed according to the slant angle.

The distribution of the diffraction efficiency of the red hologram 52R is a distribution of a diffraction efficiency when the reflective holograms R1 to R3 are arranged in a layered formation. In the case of the red hologram 52R, a region in which the diffraction efficiency is high is increased by the regions A of the reflective holograms R1 to R3 overlapping, the regions A of the reflective holograms R1 to R3 being regions in which the diffraction efficiency is high. As described above, when the reflective holograms 50 exposed to light under the condition that only the slant angle is changed and the boundary pitch Λ remains unchanged are arranged in a layered formation, this makes it possible to increase a full width at half maximum of the diffraction efficiency. Note that, in the case of the reflective holograms 50 corresponding to each of green light and blue light, a full width at half maximum of the diffraction efficiency is also increased by arranging the reflective holograms 50 in a layered formation.

The hologram portion 51 is formed by arranging the red hologram 52R, the green hologram 52G, and the blue hologram 52B in a layered formation. Consequently, the hologram portion 51 is an optical element in which a full width at half maximum of the diffraction efficiency is increased with respect to each of pieces of light of R, G, and B. As described above, in the present embodiment, the reflective hologram 50 has a layered-formation-arrangement structure in which a plurality of holographic optical elements having different slant angles for interference fringes is arranged in a layered formation.

Note that, when an angular range in which diffraction can be performed with a high degree of efficiency is made larger, a non-corresponding object-image surface may be reflected in an adjacent first surface by the diffraction. In such a case, the reflection can be prevented by making an angle of diffusion performed on a screen (a diffusion sheet or diffusive hologram) smaller than a diffraction width in the azimuth direction.

Further, the example in which a plurality of reflective holograms 50 is arranged in a layered formation has been described above. However, the full width at half maximum of the diffraction efficiency can be increased by another method. For example, a photopolymer on which multiple exposure can be performed may be used. An angle of diffraction can be made larger in the elevation direction and in the azimuth direction by exposing different slants to light multiple times in one plane to exhibit the same diffraction efficiency. Further, when a difference in refractive index Δn of the reflective hologram 50 is set high, or when a thickness of the reflective hologram 50 is set small, this also makes it possible to make an angle of diffraction larger in the elevation direction and in the azimuth direction.

Third Embodiment

Figure 12:
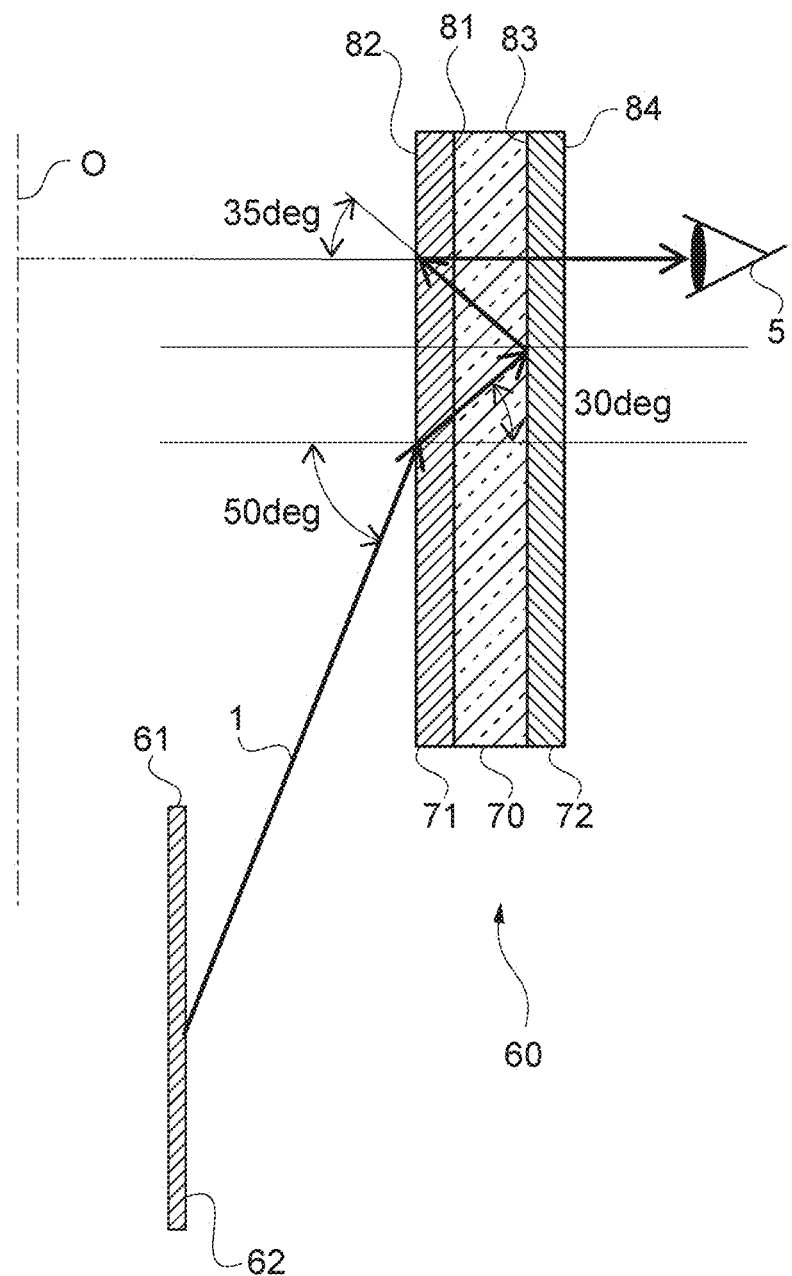
FIG. 12 schematically illustrates an example of a configuration of a display unit according to a third embodiment.

FIG. 12 schematically illustrates an example of a configuration of a display unit 60 according to a third embodiment. The display unit 60 includes a screen 61, a transparent base 70, a first reflective hologram 71, and a second reflective hologram 72. In the present embodiment, the screen 61 is arranged further inward in the apparatus than the first reflective hologram 71.

The screen 61 includes an object-image surface 62 on which an object image is formed. The screen 61 is in the form of a flat plate, and is arranged such that the object-image surface 62 faces the outside of the apparatus and the screen 61 does not overlap a virtual image. The transparent base 70 is a light-transmissive transparent member in the form of a flat plate. For example, a glass base or a base made of plastics such as acryl is used.

The first reflective hologram 71 includes a first surface 81 and a second surface 82 that is situated opposite to the first surface 81, and is bonded to a surface of the transparent base 70 in a state in which the second surface 82 faces the reference axis O, the surface of the transparent base 70 facing the reference axis O. The first reflective hologram 71 diffracts the image light 1 of an object image, and the image light 1 exits the first reflective hologram 71 to be headed for the pupil 5. More specifically, the first reflective hologram 71 diffracts light that enters the first reflective hologram 71 from the first surface 81 at a specified angle through the transparent base 70. Note that the specified angle is an angle of incidence through a transparent medium (a transparent base). In the present embodiment, the first reflective hologram 71 corresponds to a diffractive optical element.

The second reflective hologram 72 includes a third surface 83 and a fourth surface 84 that is situated opposite to the third surface 83. The second reflective hologram 72 is bonded to a surface of the transparent base 70 that is situated opposite to the surface of the transparent base 70 that faces the reference axis O, such that the third surface 83 faces the transparent base 70. As described above, in the present embodiment, the second reflective hologram 72 is arranged to face the first surface 81 of the first reflective hologram 71. Further, interference fringes (a grating vector) are formed in the second reflective hologram 72, the interference fringes reflectively diffracting light with respect to an angular range in which the first reflective hologram 71 performs diffraction, the light entering the second reflective hologram 72 from the third surface 83. In the present embodiment, the second reflective hologram 72 corresponds to another diffractive optical element.

Figure 13:
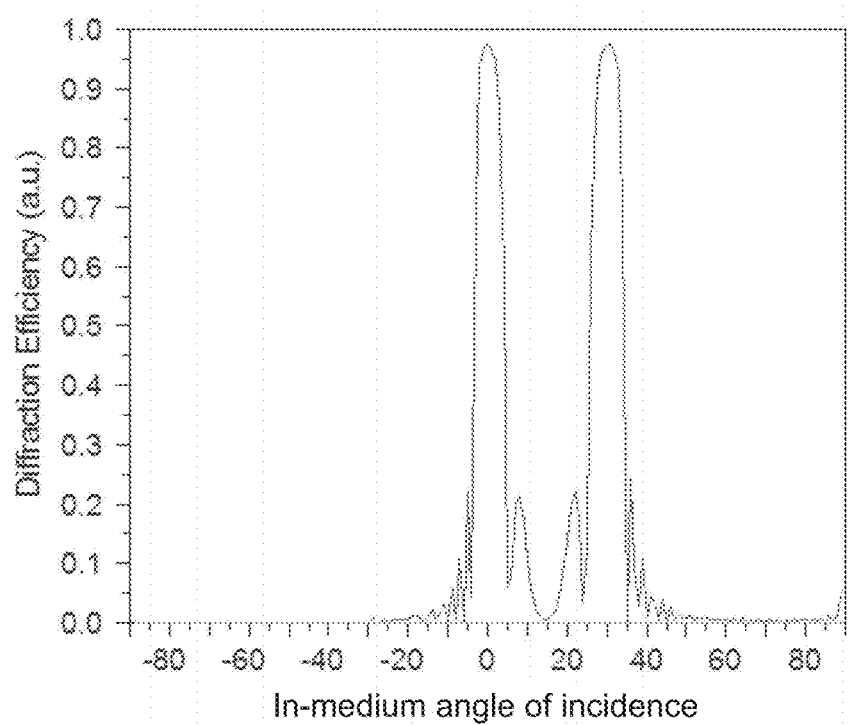
FIG. 13 is a graph illustrating diffraction properties of a first reflective hologram 71.
Figure 14:
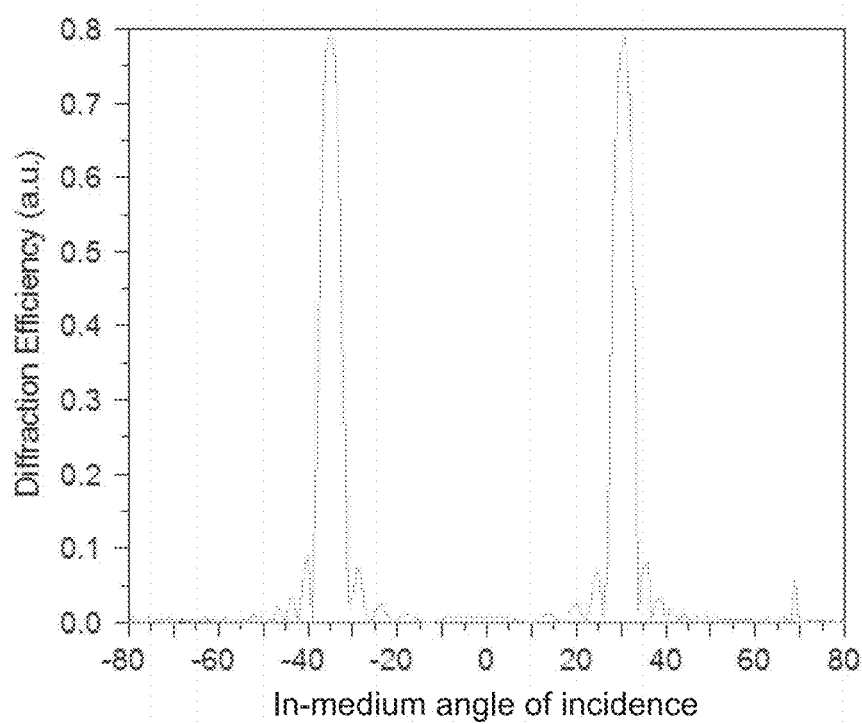
FIG. 14 is a graph illustrating diffraction properties of a second reflective hologram 72.

FIGS. 13 and 14 are graphs respectively illustrating diffraction properties of the first reflective hologram 71 and the second reflective hologram 72. In each graph, a vertical axis represents a diffraction efficiency, and a horizontal axis represents an in-medium angle of incidence. The in-medium angle of incidence is an angle of incidence when light enters the reflective hologram through the transparent base 70. For example, the first surface 81 of the first reflective hologram 71 and the third surface 83 of the second reflective hologram 72 are both bonded to the transparent base 70, as illustrated in FIG. 12. Thus, light enters the first surface 81 and the third surface 83 through the transparent base 70 (medium).

As illustrated in FIG. 13, the diffraction efficiency of the first reflective hologram 71 (the first surface 81) reaches a peak when the in-medium angle of incidence is about 0 degrees and about 35 degrees. Further, as illustrated in FIG. 14, the diffraction efficiency of the second reflective hologram 72 (the third surface 83) reaches a peak when the in-medium angle of incidence is about +/−30 degrees. As described above, the reflective holograms 71 and 72 each have reflective diffraction properties with respect to a specified in-medium angle of incidence.

As illustrated in FIG. 12, the screen 61 is arranged on the side of the second surface 82 of the first reflective hologram 71 in order to not block a virtual image from being displayed, and the image light 1 exits the screen 61 to be headed for the second surface 82. For example, the image light 1 exits the object-image surface 62 at an angle of incidence of 50 degrees on the second surface 82. The image light 1 entering the second surface 82 is refracted at an interface of the second surface 82 to enter the first reflective hologram 71. The image light 1 passing through the first surface 81 passes through the transparent base 70 to enter the third surface 83 of the second reflective hologram 72 at an angle of incidence of 30 degrees.

The image light 1 entering the third surface 83 at an angle of incidence of 30 degrees is diffractively reflected off the second reflective hologram 72, and exits the second reflective hologram 72 to be headed for the first surface 81 of the first reflective hologram 71. As described above, the image light 1 exiting the screen 61 and passing through the second surface 82 and the first surface 81 is diffracted by the second reflective hologram 72 to exit the second reflective hologram 72 to be headed for the first surface 81.

Here, the in-medium angle of incidence at which the diffractively reflected image light 1 enters the first surface 81 is 35 degrees, and is an angle at which diffractive reflection is performed by the first reflective hologram 71. The image light 1 entering the first surface 81 is diffractively reflected off the first reflective hologram 71, and exits the first surface 81 at a specified elevation angle (about 0 degrees). The image light 1 exiting the first surface 81 passes through the transparent base 70 and the second reflective hologram 72, and exits the second reflective hologram 72 to be headed for the pupil 5 situated outside of the apparatus.

Note that the image light 1 entering a medium (the transparent base) from the second reflective hologram 72 and propagating through the medium enters the first reflective hologram 71. Thus, the angle of incidence is not affected by the Fresnel reflection. Further, the same applies to the second reflective hologram 72. Thus, the angle of incidence at which light enters from the outside of a medium can also be changed to a larger angle of, for example, from 50 degrees to 60 degrees.

As described above, the first reflective hologram 71 performs diffraction at an elevation angle of 0 degrees when light enters the first reflective hologram 71 at an in-medium angle of incidence of 35 degrees. Further, light is reflected off the second reflective hologram 72 at 35 degrees, which is an angle of incidence that corresponds to the first reflective hologram 71, when the light enters the second reflective hologram 72 at an angle of incidence of 50 degrees at which the light enters the second reflective hologram 72 from the outside of a medium. In other words, the second reflective hologram 72 is an optical element that diffracts the image light 1 and causes the diffracted image light 1 to exit the second reflective hologram 72 at a specified angle (35 degrees) to be headed for the first surface 81. This makes it possible to arrange the screen 61 inside of the apparatus, and thus to, for example, make the apparatus smaller in size.

A specific configuration of the second reflective hologram 72 is not limited. An angle of incidence corresponding to the first reflective hologram 71 may be within an angular range in which the second reflective hologram 72 can perform diffraction with a specified value. In this case, the second reflective hologram 72 is an optical element in which a specified angle is within an angular range in which the efficiency in diffracting the image light 1 exhibits a value greater than or equal to a specified value. Here, the specified value is typically a value equal to half the peak value of the diffraction efficiency. In the present embodiment, the specified value corresponds to a second value.

Fourth Embodiment

Figure 15:
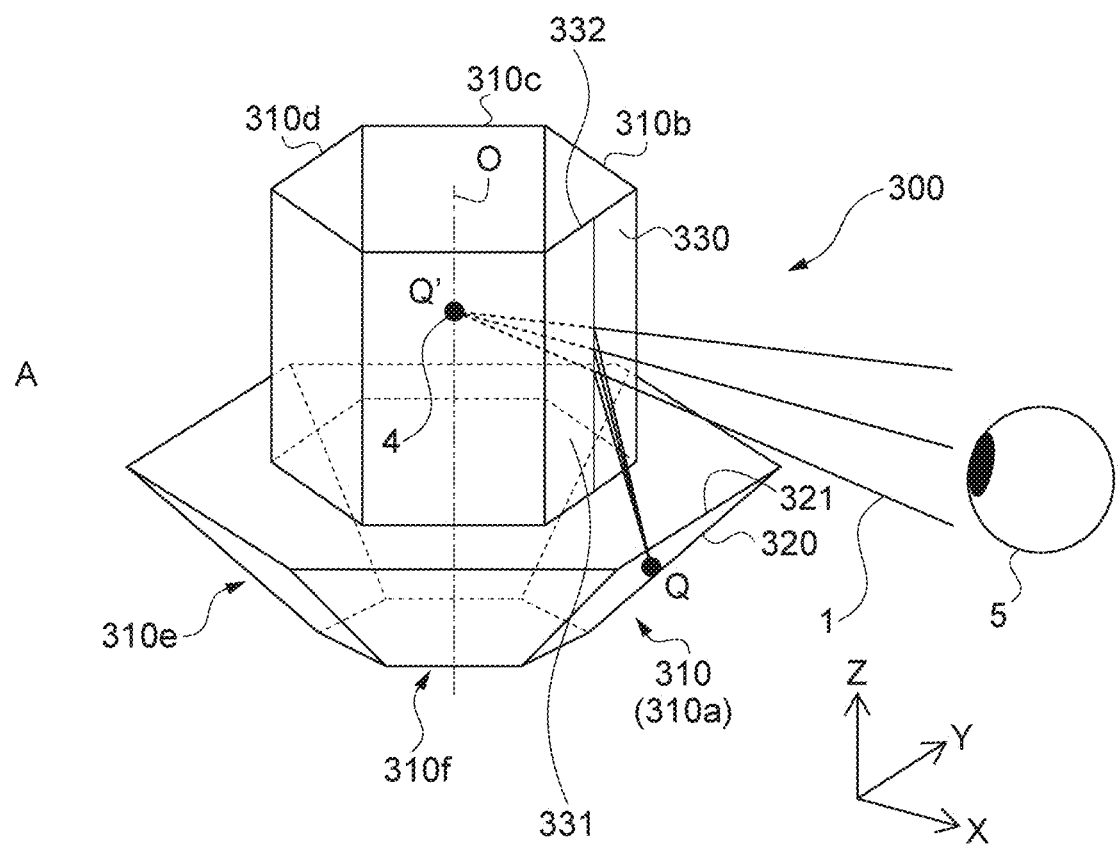
FIG. 15 schematically illustrates an example of a configuration of an image display apparatus according to the third embodiment.
Figure 15:
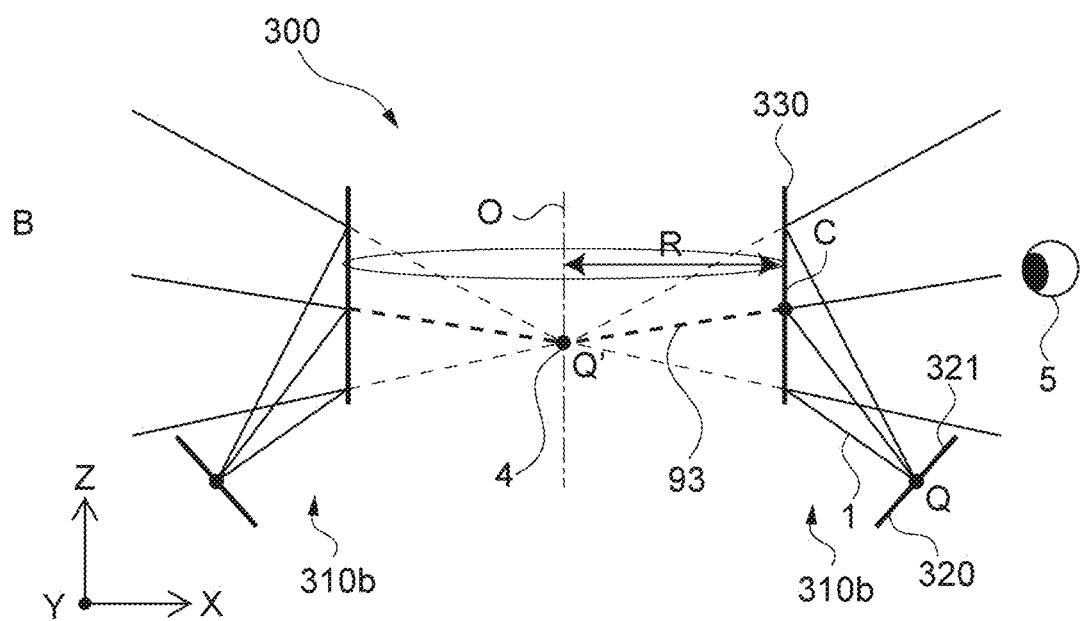

FIG. 15 schematically illustrates an example of a configuration of an image display apparatus 300 according to a fourth embodiment. A of FIG. 15 is a perspective view illustrating an appearance of the image display apparatus 300. As illustrated in A of FIG. 15, the image display apparatus 300 is formed by a plurality of display units 310 being arranged to surround the reference axis O.

In the present embodiment, a reflective hologram lens 330 is used as a diffractive optical element used for each display unit 310. In other words, the image display apparatus 300 includes a plurality of reflective hologram lenses 330.

The image display apparatus 300 illustrated in A of FIG. 15 includes six display units 310a to 310f. The display units 310a to 310f are each formed using a screen 320 and the reflective hologram lens 330.

The reflective hologram lens 330 is a reflective holographic optical element (HOE) that includes a lens function. The reflective hologram lens 330 is in the form of a flat plate, and includes a first surface 331 that faces the side opposite to the side of the reference axis O (outside of the apparatus), and a second surface 332 that faces the reference axis O (inside of the apparatus).

For example, the image light 1 of an object image displayed on the screen 320 exits the screen 320 to be headed for the first surface 331. The image light 1 entering the first surface 331 is diffracted by interference fringes generated by the reflective hologram lens 330 being exposed to light, and exits the first surface 331. In other words, the image light 1 of the object image 3 is reflected off the first surface 331. Here, a virtual image of the object image that is enlarged according to a magnification of the reflective hologram lens 330 is formed on the side of the second surface 332. Thus, the reflective hologram lens 330 serves as a reflective lens (a hologram mirror lens).

Further, the reflective hologram lens 330 is configured to selectively diffract light that enters the reflective hologram lens 330 at an angle in a specified angular range. Thus, light (such as background light) that enters the reflective hologram lens 330 at an angle outside of the specified angular range is transmitted through the reflective hologram lens 330 without being diffracted by the reflective hologram lens 330. This makes it possible to display a virtual image in a state of being superimposed on a background.

Figure 16:
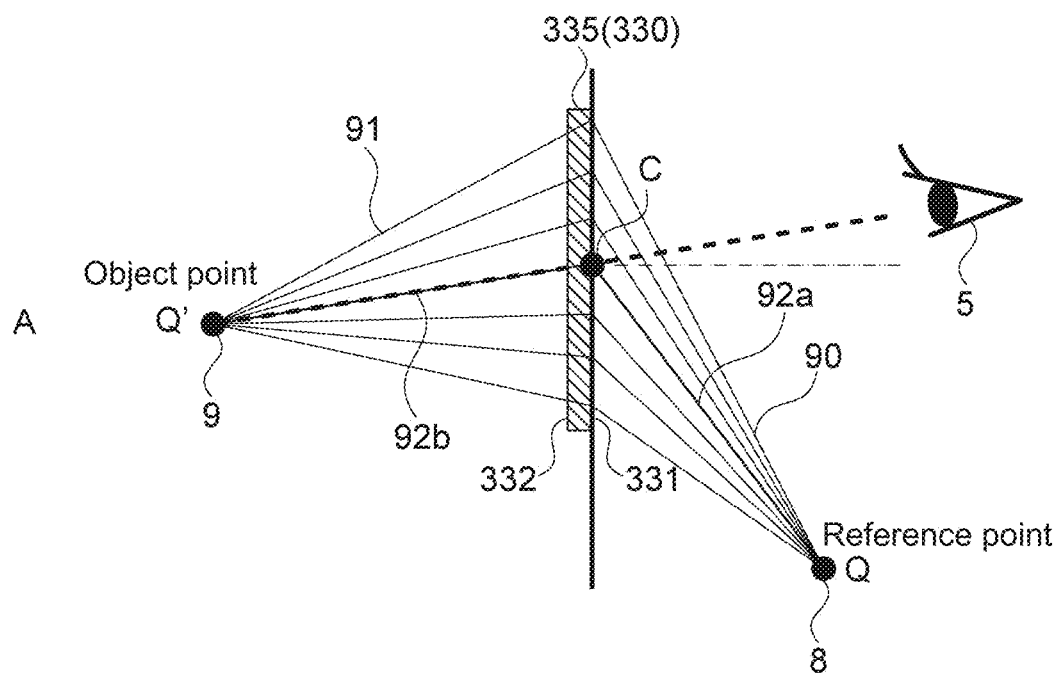
FIG. 16 is a schematic diagram used to describe a reflective hologram lens.
Figure 16:
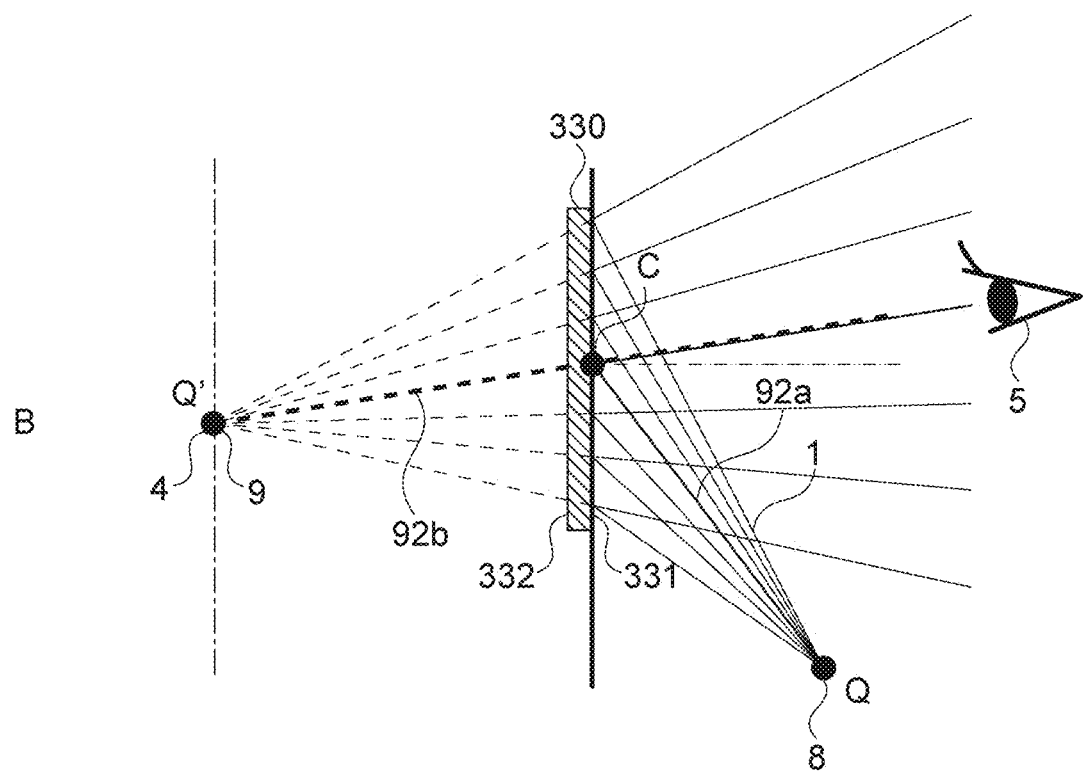

In the reflective hologram lens 330, exposure is performed by pieces of light that respectively exit from two points interfering with each other, and the interference fringes are generated (refer to A of FIG. 16). This will be described later. These points are arranged across a body of the reflective hologram lens 330 from each other. In the following description, a point that is arranged on the side of the first surface 331 is referred to as a first point Q, and a point that is arranged on the side of the second surface 332 is referred to as a second point Q'. A of FIG. 15 schematically illustrates the first point Q and the second point Q', which correspond to the reflective hologram lens 330 included in the display unit 310a.

As described above, the image display apparatus 300 uses a plurality of reflective hologram lenses 330 exposed to pieces of light to generate interference fringes, the pieces of light being light that exits from the first point Q arranged on the side of the first surface 331 and light that exits from the second point Q' arranged on the side of the second surface 332.

FIG. 16 is a schematic diagram used to describe the reflective hologram lens 330. A of FIG. 16 schematically illustrates a state in which the reflective hologram lens 330 is exposed to light to generate the interference fringes. B of FIG. 16 schematically illustrates diffraction of light that is performed by the interference fringes generated by performing exposure to light using the method illustrated in A of FIG. 16.

Here, a method for generating the reflective hologram lens 330 and properties of the reflective hologram lens 330 are described.

As illustrated in A of FIG. 16, a photopolymer 335 that is the reflective hologram lens 330 is irradiated with pieces of light from a reference point 8 and an object point 9 when the interference fringes are generated by performing exposure to light.

The photopolymer 335 is attached to a transparent member in the form of a flat plate, such as a glass plate or an acrylic plate.

The reference point 8 is a point that corresponds to a start point from which the reference light 90 exits. Here, the reference point 8 is arranged in a lower portion on a side on which an observer performs observation (on the side of the first surface 331), and is the first point Q described above.

The object point 9 is a point that corresponds to a start point from which object light 91 exits. Here, the object point 9 is arranged on a side opposite to the side on which the observer performs observation (on the side of the second surface 332), and is the second point Q' described above.

The reference light 90 and the object light 91 are radiation light that is radially irradiated from the reference point 8 and radiation light that is radially irradiated from the object point 9. In the following description, optical axes that respectively correspond to the reference light 90 and the object light 91 are respectively referred to as an optical axis 92a and an optical axis 92b. Here, the optical axis is, for example, a central axis of radiation light (the reference light 90 and the object light 91).

The optical axis 92a corresponding to the reference light 90 is set such that, for example, a range of observation performed by an observer does not overlap the reference point 8. The optical axis 92b corresponding to the object light 91 is set such that a direction of the optical axis 92b coincides with a direction indicated by an elevation angle (the assumption pupil elevation angle α0 obtained by assuming a position of the pupil 5 of the observer.

Further, the reference point 8 and the object point 9 are arranged such that the optical axis 92a and the optical axis 92b intersect on the photopolymer 335. The optical point of the optical axis 92a and the optical axis 92b is a lens center C of the reflective hologram lens 330.

Note that, in the present embodiment, the optical axis 92a and the optical axis 92b are set to not be parallel to each other. Thus, the reflective hologram lens 330 is an off-axis lens in which an optical axis corresponding to exit light and an optical axis corresponding to incident light are different from each other.

As illustrated in A of FIG. 16, an angle at which radiation light (the reference light 90) that exits from the reference point 8 enters the photopolymer 335, and an angle at which radiation light (the object light 91) that exits from the object point 9 enters the photopolymer 335 each differ depending on the position. Thus, the photopolymer 335 is exposed to light that enters from each of two surfaces of the photopolymer 335 at a different angle for each position, and the interference fringes are generated.

As described above, a grating vector of the interference fringes formed on the reflective hologram lens 330 is determined by positions of the reference point 8 and the object point 9 at the time of exposure, and by angles of the optical axes 92a and 92b corresponding to the respective points. Further, the grating vector of the interference fringes generated by exposure differs depending on a position of the reflective hologram lens 330.

B of FIG. 16 schematically illustrates a path of the image light 1 when the image light 1 radially exits from the reference point 8 along the optical axis 92a.

The image light 1, which radially exits from the reference point 8 along the optical axis 92a and enters the first surface 331, is diffracted by (reflected off) the reflective hologram lens 330, and exits the first surface 331. At this point, a direction in which the image light 1 is reflected is identical to a direction in which light (the object light 91 in A of FIG. 16) exits from the object point 9 along the optical axis 92b. This results in forming the virtual image 4 of the reference point 8 at the object point 9 situated on the side of the second surface 332.

Likewise, the pieces of image light 1 respectively exiting from points of an image plane that includes the reference point 8 are diffracted by the reflective hologram lens 330, and this results in a virtual-image plane that includes the object point 9 being formed on the side of the second surface 332.

In the present embodiment, the object point 9 is set at a point at which the optical axis 92b intersects the reference axis O, with an angle of intersection at which the optical axis 92b and the reflective hologram lens 330 intersect being a desired view angle (an assumption pupil elevation angle). In other words, a virtual-image point (the object point 9) at which a virtual image of the reference point 8 is displayed when the virtual image 4 is reproduced is set on the reference axis O. Further, the reference point 8 is set to be a point on the screen 320 (such as a center point of the screen 320). This enables a virtual-image plane to include the reference axis O.

Note that the example in which the reference point 8 is the first point Q arranged on the side of the first surface 331 and the object point 9 is the second point Q' arranged on the side of the second surface 332, has been described in the example illustrated in FIG. 16. Without being limited thereto, the reference point 8 and the object point 9 may be used by being swapped.

For example, light that enters from the object point 9 may be diffracted (reflected) to form a virtual image of the object point 9 at the reference point 8. In this case, the object point 9 is the first point Q, and a surface on the side of the object point 9 is the first surface 331. Further, the reference point 8 is the second point Q', and a surface on the side of the reference point 8 is the second surface 332.

As described above, one of the first point Q and the second point Q' is the reference point 8 from which the reference light 90 exits, and another of the first point Q and the second point Q' is the object point 9 from which the object light 91 exits.

An example in which the first point Q is the reference point 8 and the second point Q' is the object point 9, as illustrated in FIG. 16, is described below. Further, the first point Q and the second point Q' may be referred to as a reference point Q and an object point Q'.

As illustrated in A of FIG. 15, a plurality of reflective hologram lenses 330 is arranged to surround the reference axis O such that the first surface 331 (the second surface 332) is parallel to the reference axis O. For example, the respective reflective hologram lenses 330 are continuously circumferentially arranged to form a polygonal prism.

Further, a plurality of reflective hologram lenses 330 is arranged such that each object point Q' is on the reference axis O. Typically, each reflective hologram lens 330 is arranged such that each object point Q' is situated at a point on the reference axis O.

As described above, in the present embodiment, a plurality of reflective hologram lenses 330 is arranged such that the first surface 331 and the reference axis O are parallel to each other and the object point Q' is on the reference axis O. This makes it possible to form a virtual-image plane along the reference axis O using each reflective hologram lens 330.

B of FIG. 15 schematically illustrates a cross section obtained by cutting the image display apparatus 300 along the XZ plane including the reference axis O. This cross section includes cross sections of the display unit 310a and the display unit 310d illustrated in A of FIG. 15, the display unit 310d being arranged across the reference axis O from the display unit 310a.

In B of FIG. 15, a line 93 that connects the object point Q' and the lens center C of the reflective hologram lens 330 is indicated by a thick dotted line. The line 93 corresponds to the optical axis 92b corresponding to the object light 91 described above.

Spacing between each reflective hologram lens 330 and the reference axis O is determined by a length of the line 93 corresponding to the optical axis 92b and by an elevation angle (an assumption pupil elevation angle) that corresponds to the line 93 with respect to the reflective hologram lens 330. For example, the spacing between each reflective hologram lens 330 and the reference axis O is larger if the length of the line 93 is larger and the elevation angle corresponding to the line 93 is smaller.

In the present embodiment, with respect to the plurality of reflective hologram lenses 330, the respective lengths of the line 93 connecting the object point Q' and the lens center C are set equal, and the respective elevation angles corresponding to the line 93 are set equal. In other words, when the respective reflective hologram lenses 330 are exposed to light to generate the interference fringes, respective relative positions for arranging the object point Q' are set equal, and respective elevation angles that correspond to the optical axis 92b corresponding to the object light 91 are set equal.

This makes it possible to equally set the spacings between the respective reflective hologram lenses 330 and the reference axis O. Consequently, a plurality of reflective hologram lenses 330 forms a polygonal prism that is inscribed in an inner peripheral circle of the radius R, with the reference axis O passing through the center of the circle. This makes it possible to perform display that is visible from all directions, such as display in which virtual images are switched at regular intervals.

Note that the length of the line 93 and the elevation angle corresponding to the line 93 may be set for each reflective hologram lens 330. In this case, the spacing between each reflective hologram lens 330 and the reference axis O is set as appropriate such that, for example, a virtual-image plane includes the reference axis O. In this case, for example, the assumption pupil elevation angle can be set for each viewing direction, and this makes it possible to improve a degree of freedom in design.

The screen 320 includes a flat object-image surface 321, and an object image is formed on the object-image surface 321. Further, the screen 320 is arranged such that the object-image surface 321 faces the first surface 331, in order to avoid a path of light with which the virtual image 4 formed by the reflective hologram lens 330 is displayed.

A position and an orientation of the screen 320 when the screen 320 is arranged is set according to, for example, properties of a corresponding reflective hologram lens 330. Specifically, the screen 320 is arranged such that the reference point Q for the reflective hologram lens 330 coincides with a point (for example, a center point) on the screen 320 (the object-image surface 321). This makes it possible to clearly display, on the reference axis O, a virtual image of the object image 3 formed on the screen 320. Further, the orientation of the screen 320 is set such that, for example, the screen 320 is orthogonal to the optical axis 92 corresponding to the reference light 90. This makes it possible to prevent the virtual image from being inclined.

The position and the orientation of the screen 320 are not limited, and may be set as appropriate such that the virtual image 4 of an object image is properly displayed.

For example, a transmissive diffusion screen is used as the screen 320. In this case, the display unit 310 includes a projector (refer to FIG. 2) that projects an image (an object image) from a side opposite to the object-image surface 321 with respect to the screen 320.

Further, a projection direction in which the projector projects an object image (such as a direction in which a center pixel of the object image is projected) is set to coincide with a direction of the optical axis 92a corresponding to the reference light 90 described above. In other words, the projector projects an object image onto the screen 320 in parallel with a direction identical to the direction of the optical axis 92a corresponding to light that exits from the reference point Q. Consequently, the efficiency in diffracting an object image is improved, and this makes it possible to display a bright image.

Note that a specific configuration of the screen 320 is not limited, and, for example, a reflective diffusion screen may be used. Further, a self-luminous display or the like may also be used as the screen 320.

As described above, in the image display apparatus 300, a plurality of reflective hologram lenses 330 is arranged such that the object point Q' is on an axis (the reference axis O) that passes through the center of an inner peripheral circle that is inscribed in the respective reflective hologram lenses 330. Further, a plurality of screens 320 is arranged such that the reference point Q coincides with a point on the object-image surface 321 of a corresponding screen 320.

This makes it possible to display a clear virtual image along the reference axis O.

Figure 17:
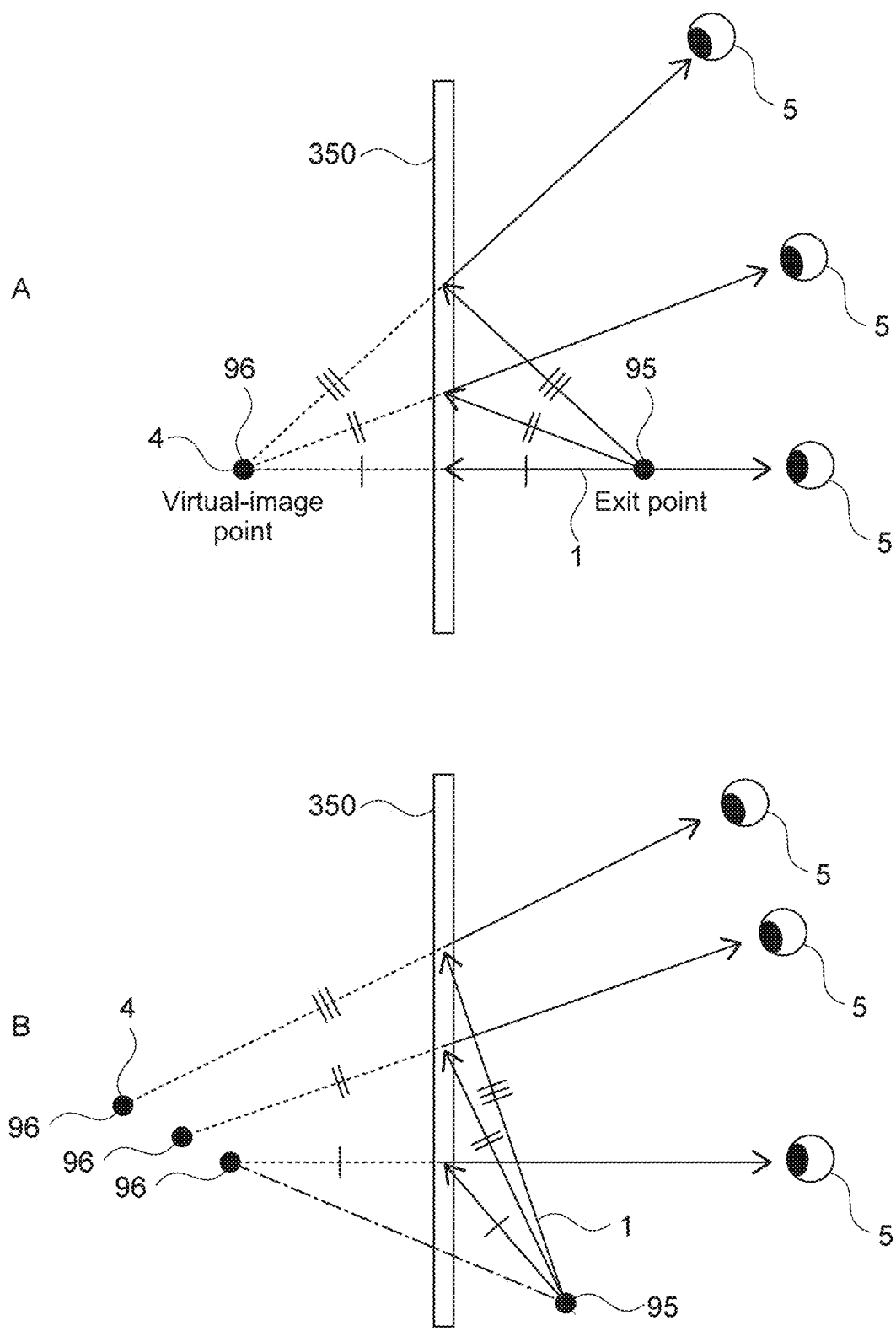
FIG. 17 schematically illustrates display of a virtual image that is performed by a linear hologram of a comparative example.

FIG. 17 schematically illustrates display of a virtual image that is performed by a linear hologram of a comparative example.

Here, a difference between a reflective hologram that is exposed to light to generate interference fringes having a period in a single direction (a linear hologram 350), and the reflective hologram lens 330 is described.

A and B of FIG. 17 schematically illustrate paths of pieces of light respectively diffracted by two types of linear holograms 350 having different boundary pitches Λ. Further, A and B of FIG. 17 each illustrate an exit point 95 from which light exits, and a virtual-image point 96 that corresponds to the exit point 95.

As illustrated in A of FIG. 17, an angle of incidence $\theta_{in}$ and an exit angle $\theta_{out}$ are equal when the exit point 95 and the virtual-image point 96 are planarly symmetric about the linear hologram 350. Thus, the boundary pitch Λ is infinite, as can be seen from the relationship represented using Formula (1) ($\sin \theta_{in} + m\lambda/\Lambda = \sin \theta_{out}$) described above.

As described above, when the boundary pitch Λ is infinite, change amounts of the angle of incidence $\theta_{in}$ and the exit angle $\theta_{out}$, which correspond to each position of the pupil 5, will be equal even if the pupil 5 of an observer is moved in an elevation direction. Thus, there is no change in the position of the virtual-image point 96, that is, the position of the virtual image 4.

On the other hand, as illustrated in B of FIG. 17, the angle of incidence $\theta_{in}$ and the exit angle $\theta_{out}$ are different angles when the exit point 95 and the virtual-image point 96 are not planarly symmetric about the linear hologram 350. In this case, the boundary pitch Λ exhibits a finite value.

When the boundary pitch Λ is made smaller, a change in the angle of incidence $\theta_{in}$ is smaller than a change in an angle of diffraction (the exit angle $\theta_{out}$) that is caused due to a movement of the pupil 5. This may result in, for example, a movement of a virtual image in which a position of the virtual-image point 96 is changed, or a distortion in image in which a virtual image itself is distorted.

A position of a virtual image may be moved with a movement of the pupil 5 (a movement of a point of view) when the linear hologram 350 is used as a hologram combiner, as described above. This may result in display of a virtual image being shifted when, for example, the point of view is moved in an azimuth direction and the virtual image 4 is viewed consecutively using the linear holograms 350 being adjacent to each other. Further, a position of a virtual image with respect to each linear hologram 350 is changed when, for example, the point of view is moved in an elevation direction. This may result in a center position being shifted. Such a movement of a virtual image due to a movement of a point of view may result in a sense of reality with respect to the virtual image 4 being reduced.

Conversely, when the reflective hologram lens 330 is used, the image light 1 can be diffracted such that it looks like the light exits from the same point, in spite of a movement of the pupil 5 of an observer.

As described above, a grating vector of interference fringes formed on the reflective hologram lens 330 differs depending on the position. The change in angle of diffraction described with reference to B of FIG. 17 is corrected as appropriate by the interference fringes, and this results in a reduction in, for example, a movement of a virtual image that is performed using the linear hologram 350.

For example, regardless of the position of the pupil 5, the image light 1 exiting from the reference point Q is diffracted such that it looks like the light exits from the object point Q' (a virtual-image point), as illustrated in B of FIG. 16. This makes it possible to reduce, for example, a movement of a virtual image and a distortion in image, and thus to perform display of a virtual image with a sense of reality.

Further, it is desirable that a distance between the reference point Q and the lens center C, and a distance between the object point Q' and the lens center C be set to have the same size. In other words, the distances to the reference point Q and the object point Q' from the lens center C are set to be equal. In this case, a magnification of the reflective hologram lens 330 is one.

As described above, the reflective hologram lenses 330 of a plurality of reflective hologram lenses 330 are configured as lenses with the same magnification. This makes it possible to reduce a change in a path of the image light 1 that is caused due to a movement of the pupil 5. This results in being able to, for example, sufficiently reduce a distortion in virtual-image plane (field curvature).

Further, it is desirable that the distance between the reference point Q and the lens center C, and the distance between the object point Q' and the lens center C be set as small as possible. In other words, it is desirable that the reference point Q and the object point Q' be situated close to each other. This results in a reduction in an amount of a change in a path of the image light 1, and thus in being able to sufficiently reduce, for example, a movement of a virtual image and a distortion in image.

Note that, for example, positions of the reference point Q and the object point Q', and angles of the optical axis 92a and the optical axis 92b are set such that the object-image surface 321 of the screen 320 does not overlap the field of view of the pupil 5 when the virtual image 4 is reproduced.

Further, when the distances to the reference point Q and the object point Q' from the lens center C of the reflective hologram lens 330 do not have the same size, proper display of a virtual image can be performed by arranging the reflective hologram lens 330 and the screen 320 (the object-image surface 321) as appropriate according to the magnification.

Figure 18:
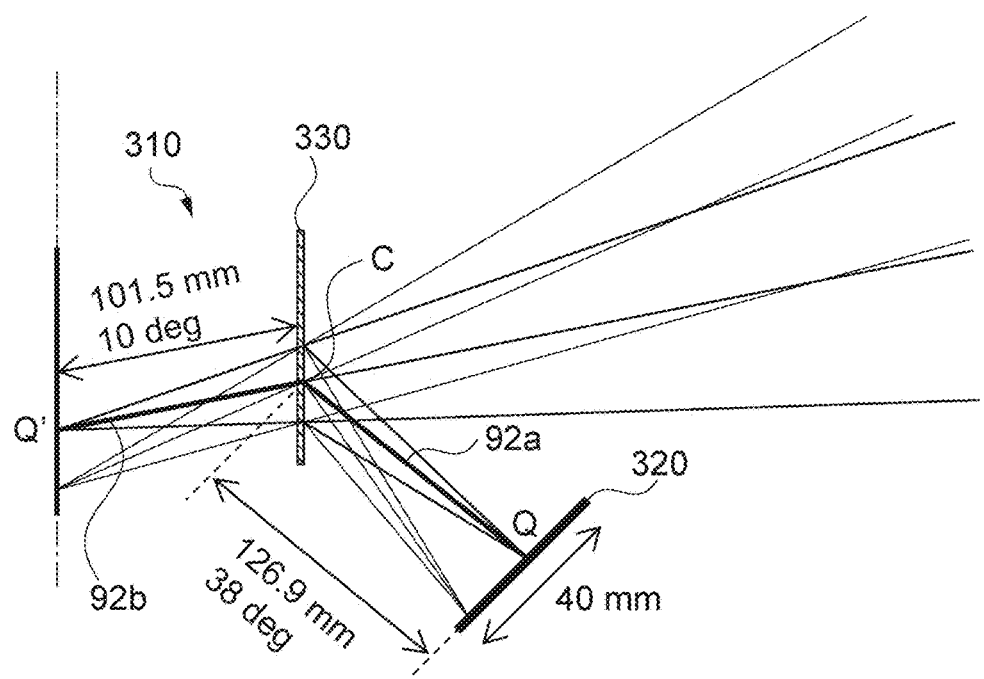
FIG. 18 schematically illustrates an example of a configuration of a display unit using the reflective hologram lens.

FIG. 18 schematically illustrates an example of a configuration of the display unit 310 using the reflective hologram lens 330. FIG. 18 illustrates the example of the configuration of the display unit 310 when a diameter of an inner peripheral circle that is inscribed in a polygonal prism formed of a plurality of reflective hologram lenses 330 in the image display apparatus 300, is set to 200 mm, and an image height of an object image is 40 mm.

In this case, a distance from the lens center C to the reference point Q (for example, a center point of the screen 320) is set to 126.9 mm. An elevation angle that corresponds to the optical axis 92a connecting the reference point Q to the lens center C is set to 38 degrees.

Further, a distance from the lens center C to the object point Q' on the reference axis O is set to 101.5 mm. An elevation angle (an assumption pupil elevation angle) that corresponds to the optical axis 92b connecting the object point Q' to the lens center C is set to 10 degrees.

Such a configuration of the display unit 310 makes it possible to properly display the virtual image 4 of the object image 3 along the reference axis O.

Note that FIG. 18 illustrates both a path of the image light 1 exiting from the reference point Q, and a path of the image light 1 exiting from a point situated below the reference point Q.

Figure 19:
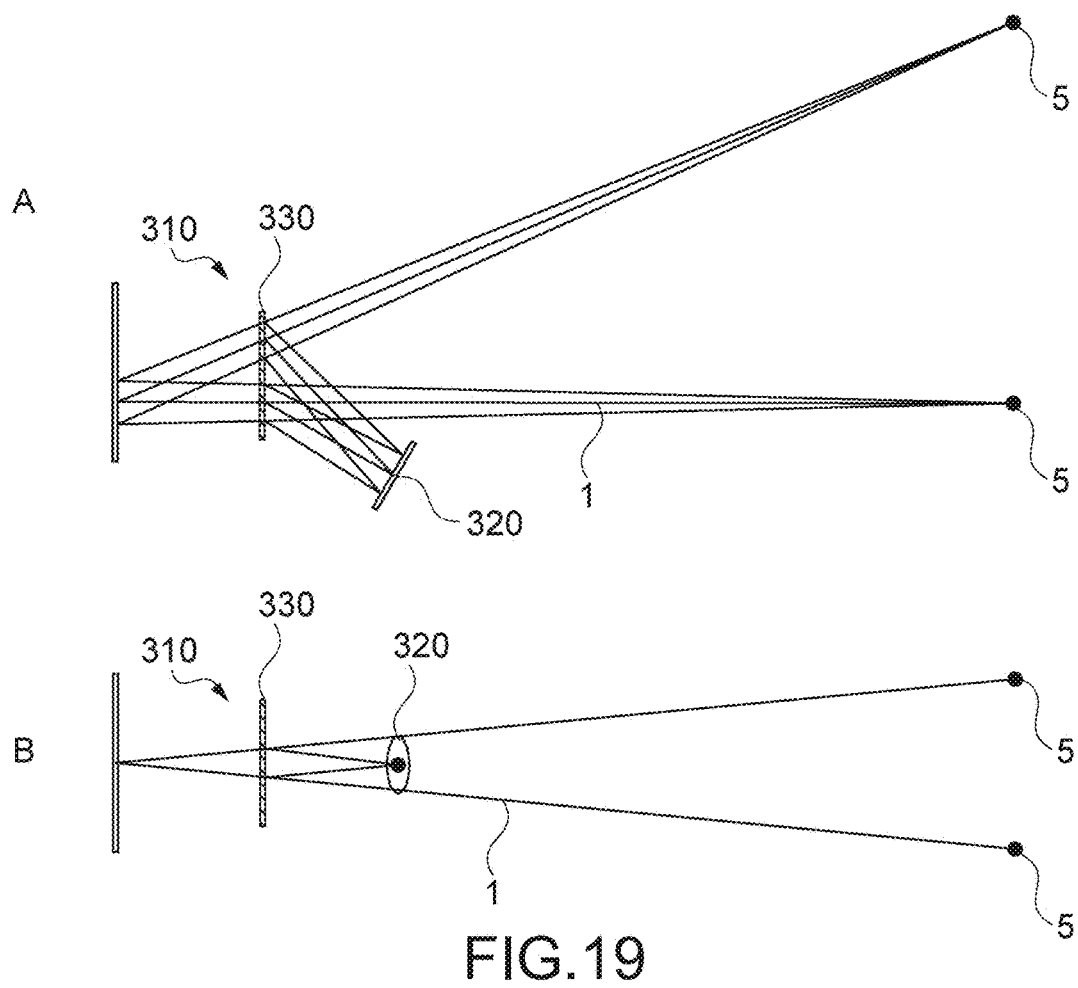
FIG. 19 schematically illustrates an example of a path of the image light diffracted by the reflective hologram lens.

FIG. 19 schematically illustrates an example of a path of the image light 1 diffracted by the reflective hologram lens 330. A and B of FIG. 19 respectively schematically illustrate a path of the image light 1 when the display unit 310 is viewed from a lateral side and from above.

As described above, the reflective hologram lens 330 has the object point Q' and the reference point Q. Thus, the grating vector differs depending on the position of the reflective hologram lens 330 (a lens surface). Thus, the efficiency of diffraction of the image light 1 that is performed by the reflective hologram lens 330 differs depending on the position of the lens surface.

For example, when there is a change in an elevation angle corresponding to the pupil 5 viewing the reflective hologram lens 330, there is a vertical change in a position, on a lens surface, at which a light ray that reaches the pupil 5 from the object-image surface 321 of the screen 320 is reflected off the lens surface, as illustrated in A of FIG. 19. In other words, there is a change in a diffraction position (a reflection position) at which the image light 1 causing each point of the object-image surface 321 to be displayed. Thus, the image light 1 reaching the pupil 5 is light that is diffracted by interference fringes of different grating vectors due to the movement of the pupil 5. In other words, when the pupil 5 is moved, there is a change in a grating vector of interference fringes that diffract the image light 1.

Further, when there is a change in the azimuth angle corresponding to the pupil 5 viewing the reflective hologram lens 330, there is also a change in the grating vector of the interference fringes diffracting the image light 1, as illustrated in B of FIG. 19.

Figure 20:
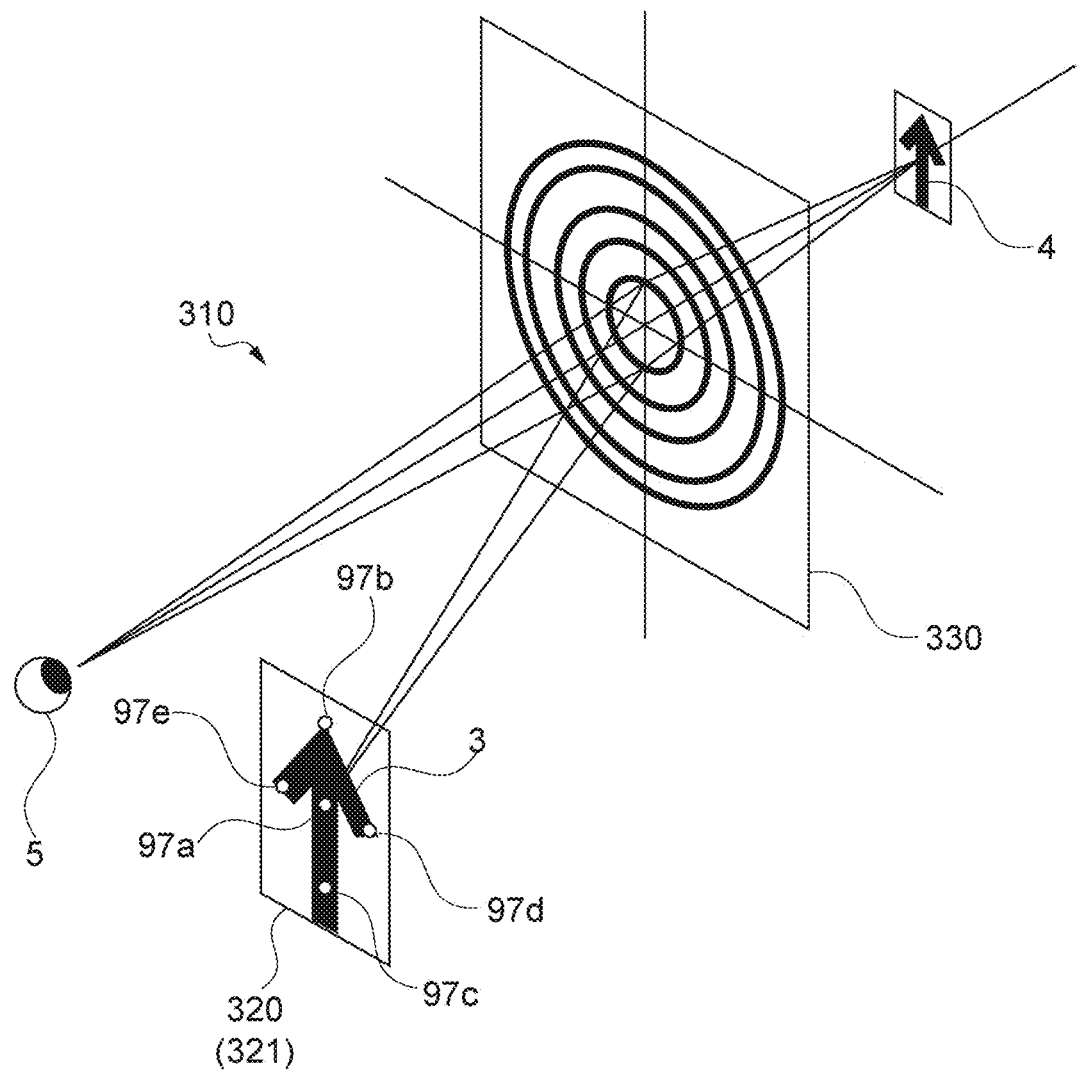
FIG. 20 schematically illustrates a relationship between a position of display on an object-image surface and a position of diffraction performed by the reflective hologram lens.
Figure 21:
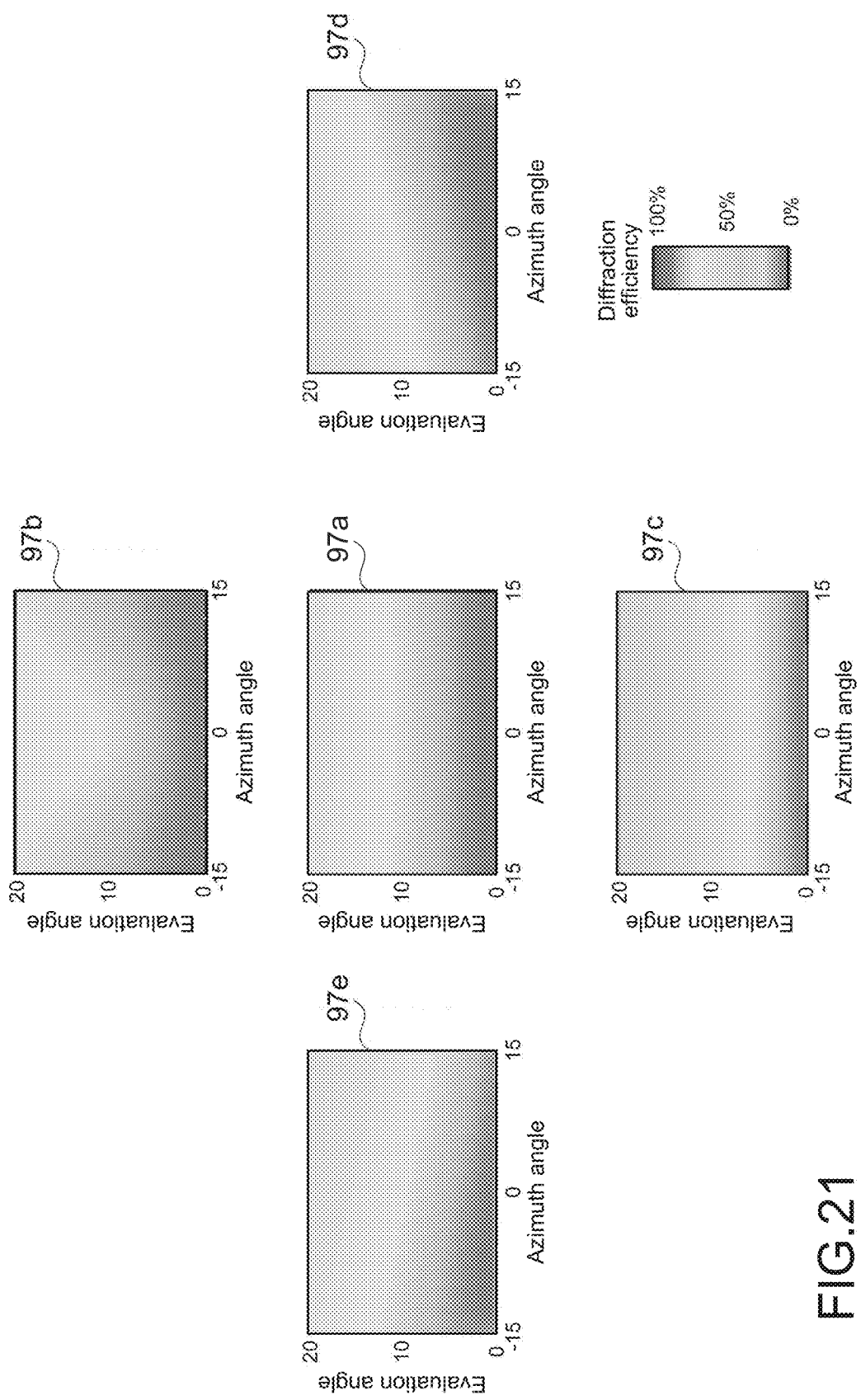
FIG. 21 is a set of maps of examples of distributions of diffraction efficiencies with respect to respective display positions illustrated in FIG. 20.

FIG. 20 schematically illustrates a relationship between a position of display on the object-image surface and a position of diffraction performed by the reflective hologram lens. FIG. 21 is a set of maps of examples of distributions of diffraction efficiencies with respect to respective display positions illustrated in FIG. 20.

FIG. 20 illustrates an image of a black arrow that is an example of the object image 3 displayed on the object-image surface 321. Further, a display position 97 on the object-image surface 321 is indicated using a white circle. For example, when an observer moves the pupil 5, there is a change in a diffraction position on the reflective hologram lens. Further, the diffraction position also differs depending on the display position 97.

Coordinates of the display position 97 on the object-image surface 321 are hereinafter referred to as (x [mm], y [mm]). A display position 97a is, for example, a position of the center (0, 0) of the object-image surface 321. Further, coordinates of display positions 97b, 97c, 97d, and 97e are (0, 15), (0, −15), (15, 0), and (−15, 0), respectively.

The maps illustrated in FIG. 21 are maps of angular distributions of diffraction efficiencies that correspond to the display positions 97a to 97e illustrated in FIG. 20. The distribution of the diffraction efficiency when an observer moves the pupil 5 and views each display position 97 on the object-image surface 321 (that is, an angular distribution of a diffraction efficiency when the observer moves the pupil 5 while looking at each display position 97) is given on each map.

Further, the maps illustrated in FIG. 21 are results of simulation performed using the arrangement of the display unit 310 illustrated in FIG. 18. In this simulation, the thickness of the reflective hologram lens 330 was set to 16 μm, and setting was performed such that a difference in refractive index $\Delta n = 0.035$. Further, a wavelength (a reproduction wavelength) of the image light 1 was set to 524 nm.

A vertical axis and a horizontal axis in each map respectively represent an elevation angle and an azimuth angle when a pupil is moved. Further, a range of elevation angle is from 0 degrees to 20 degrees, and a range of azimuth angle is from −15 degrees to +15 degrees. Shades in grayscale in each map represent a diffraction efficiency. In all of the maps, the diffraction efficiency exhibits a maximum value that is a value close to 100%. Further, in the map for the display position 97c (−15, 0), the diffraction efficiency exhibits a smallest value that is a value of about 50%.

For example, the efficiency in diffracting the image light 1 exiting from the display position 97a (0, 0) is hardly changed in spite of a change in an azimuth angle corresponding to the pupil 5. Further, there is a reduction in diffraction efficiency when there is an increase in an elevation angle corresponding to the pupil 5, but in a range of an elevation angle greater than or equal to 20 degrees, the diffraction efficiency is maintained at a high value that is a value greater than or equal to 50%.

Further, regardless of the movement of the pupil 5, the diffraction efficiencies for the other display positions 97b to 87e are also maintained at the high value that is a value greater than or equal to 50%. Thus, a virtual image of each point of the object-image surface 321 can be displayed with a sufficient brightness in spite of a change in observation direction.

Due to the pupil 5 being moved in the azimuth direction, the brightness of the virtual image 4 may be less likely to be reduced in the reflective hologram lens 330, as described above. In this case, for example, the virtual image 4 may be reflected depending on an angle at which the reflective hologram lens 330 is arranged (such as an angle formed by the perpendiculars to the first surfaces 331 being adjacent to each other). When the virtual image 4 is reflected, for example, the virtual image 4 generated by a reflective hologram lens 330 adjacent to an observation-target reflective hologram lens 330 is superimposed on the virtual image 4 generated by the observation-target reflective hologram lens 330.

Such a reflection of the virtual image 4 can be prevented by, for example, appropriately setting an angle of diffusion of the image light 1 exiting the screen 320.

Specifically, a full width at half maximum of diffusion in the azimuth direction with respect to the image light 1 exiting the screen 320 (the object-image surface 321) is set to a value that is similar to the angle at which the reflective hologram lens 330 is arranged. Here, the full width at half maximum of diffusion corresponds to an angular range in which the brightness of diffused light is reduced to 50%, which is a maximum value.

This makes it possible to prevent the object image 3 formed on the adjacent screen 320 (the virtual image 4) from being reflected.

In this case, the angle at which the reflective hologram lens 330 is arranged is set to be, for example, an angle determined by an assumed number of corners of a polygonal prism. Alternatively, the angle at which the reflective hologram lens 330 is arranged may be freely set, and the number of corners or the like of a polygonal prism may be set according to the arrangement angle.

Further, when an angular range (a full width at half maximum), in the azimuth direction, in which a diffraction efficiency in the azimuth direction exhibits a value less than or equal to 50%, is determined, the angle at which the reflective hologram lens 330 is arranged is set according to this full width at half maximum.

This makes it possible to prevent, for example, the virtual image 4 from being reflected. This also makes it possible to prevent the virtual image 4 from becoming invisible when the reflective hologram lens 330 is switched due to a change in observation direction. This results in being able to perform display of a virtual image with a sense of reality.

Further, it is conceivable that, with respect to the virtual image 4 formed by the reflective hologram lens 330, an astigmatism could occur with respect to the elevation direction and the azimuth direction. In this case, there may be a difference between the elevation direction and the azimuth direction in position at which the virtual image is formed. In such a case, a radius of an inscribed circle is set on the basis of a virtual-image focal point in the azimuth direction in which convergence is dominant. This makes it possible to properly display the virtual image 4 along the reference axis O even when an observer moves in a convergence direction (the azimuth direction) in which, for example, a difference in position is easily perceived by the observer.

Figure 22:
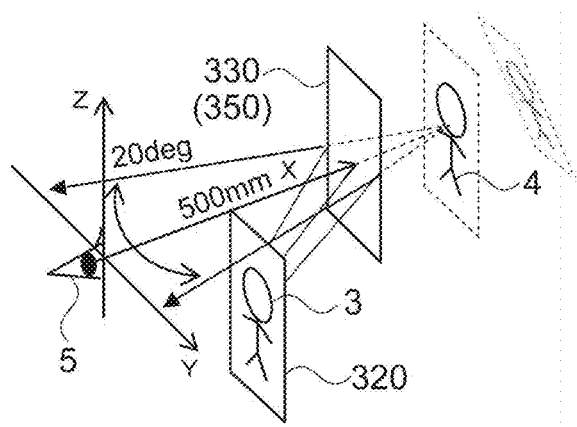
FIG. 22 is a diagram used to describe a position of a virtual image displayed by the reflective hologram lens and a position of a virtual image displayed by the linear hologram.
Figure 22:
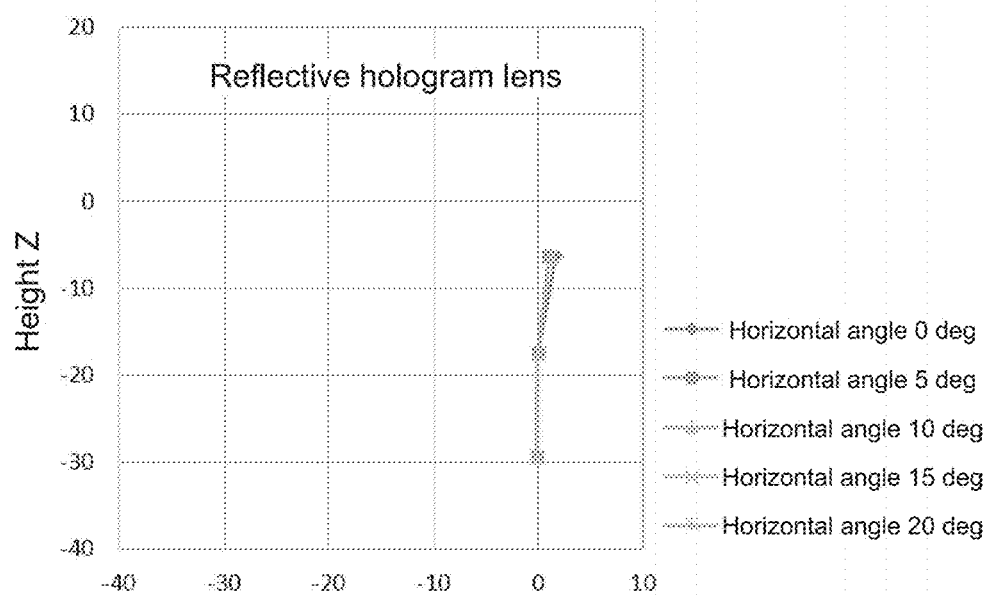
Figure 22:
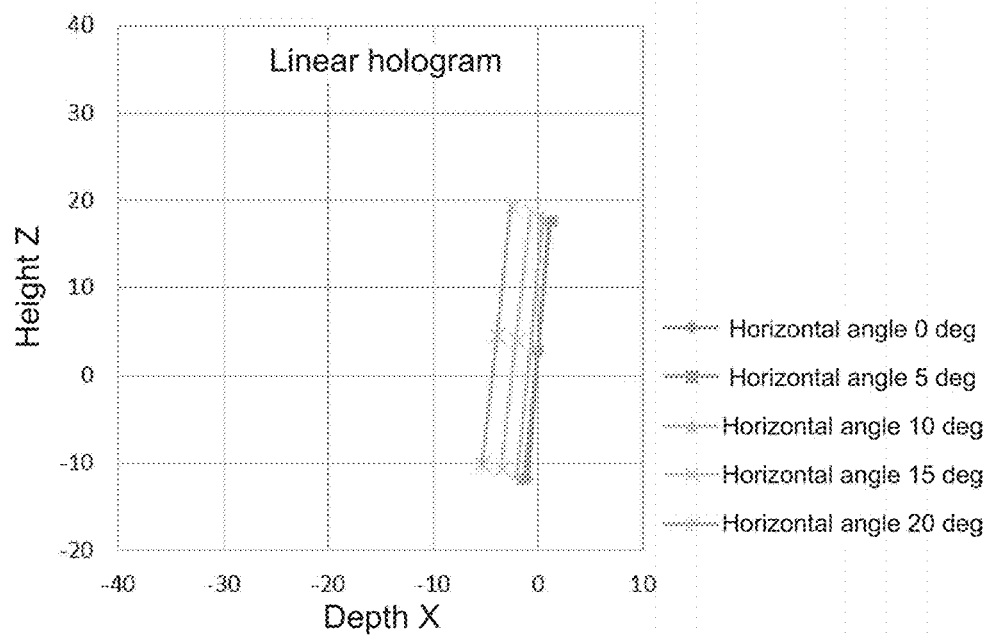

FIG. 22 is a diagram used to describe a position of a virtual image displayed by the reflective hologram lens 330 and a position of a virtual image displayed by the linear hologram 350.

A of FIG. 22 schematically illustrates a movement of a pupil in the azimuth direction. Here, it is assumed that the pupil 5 situated 500 mm away from an HOE (the reflective hologram lens 330 or the linear hologram) is moved in a range of +/−20 degrees in the azimuth direction. Further, it is assumed that an elevation angle corresponding to the pupil 5 relative to the HOE in an observation direction is 10 degrees.

B of FIG. 22 is a graph illustrating a change in the position of the virtual image displayed by the reflective hologram lens 330, due to the pupil being moved in the azimuth direction. Further, C of FIG. 22 is a graph illustrating a change in the position of the virtual image displayed by the linear hologram 350, due to the pupil being moved in the azimuth direction. In the following description, the depth of a position of a virtual image is referred to as X, and the height of the position of the virtual image is referred to as Z. Further, an angle in the azimuth direction is referred to as a horizontal angle.

Positions of a virtual image when the horizontal angles corresponding to the pupil 5 are 0 degrees, 5 degrees, 10 degrees, 15 degrees, and 20 degrees are given in each of B and C of FIG. 22. A horizontal axis and a vertical axis in each graph respectively represent the depth X and the height Z.

As illustrated in B of FIG. 22, the virtual image 4 displayed by the reflective hologram lens 330 is hardly moved in depth and in height when the horizontal angle corresponding to the pupil 5 is changed from 0 degrees to 20 degrees. Thus, the virtual image 4 is displayed in a state of being fixed at a certain display position (a position for intersecting the reference axis O) when, for example, an observer observes the virtual image 4 while moving around the image display apparatus 300.

On the other hand, as illustrated in C of FIG. 22, the virtual image 4 displayed by the linear hologram 350 is shifted rearward in depth X and is shifted upward in height Z when there is an increase in the horizontal angle corresponding to the pupil 5. Thus, when the linear hologram 350 is used, the position of the virtual image 4 is changed according to, for example, a position at which the image display apparatus 300 is observed. This may result in a sense of reality being reduced.

As described above, a change in virtual image due to a change in the pupil 5 in the azimuth direction (a change in point-of-view azimuth angle) is sufficiently suppressed and the position of the virtual image is fixed when the reflective hologram lens 330 is used, compared to when, for example, the linear hologram 350 is used. Likewise, a change in virtual image due to a change in the pupil 5 in the elevation direction (a change in point-of-view elevation angle) is also suppressed when the reflective hologram lens 330 is used.

Thus, the virtual image 4 can be fixed at the same position even when, for example, the virtual image is observed consecutively using the reflective hologram lenses 330 being adjacent to each other due to the pupil 5 being moved in the azimuth direction.

Further, the position of a virtual image as viewed from each plane is hardly changed regardless of an elevation angle corresponding to the pupil 5. The above-described fixation of a position of a virtual image results in preventing a change in virtual image that is caused due to a point of view being moved, and thus in being able to perform display of a virtual image with a sense of reality to a satisfactory extent.

Other Embodiments

The present technology is not limited to the embodiments described above, and can achieve various other embodiments.

The example in which the reflective holograms are adjacent to each other has mainly been described in the embodiments above. Without being limited thereto, the reflective holograms may be spaced from each other. For example, some of faces of a regular polygon may be formed using, for example, a structural member. Alternatively, a gap may be provided between the reflective holograms. As described above, the reflective holograms of a plurality of reflective holograms included in the image display apparatus may be spaced from each other. In such a case, display of a virtual image can also be performed with a sense of reality by properly setting a relative angle of each reflective hologram, as described above.

The example in which the surface of the reflective hologram is flat has been described above. For example, the surface of the reflective hologram may be curved. Specifically, the reflective hologram includes a surface having a shape of a cylinder, with the reference axis being a central axis of the cylinder. In this case, a plurality of reflective holograms forms, for example, a cylindrical structure that surrounds the reference axis. This makes it possible to perform display of a virtual image that can be observed from various directions through the cylindrical surface.

For example, when image light exits to be headed for the cylindrical surface (the first surface) in a certain direction, an azimuth component in a direction of incidence on the cylindrical surface becomes smaller as a radius corresponding to the cylindrical surface is increased. Conversely, the azimuth component in the incident direction becomes larger as the radius corresponding to the cylindrical surface is reduced. Thus, the azimuth component of light diffractively reflected off the cylindrical surface is smaller if the radius is larger, and is larger if the radius is smaller.

Thus, there is a need to appropriately set the radius corresponding to the cylindrical surface in order to properly display a virtual image of an object image displayed on the screen. In the present disclosure, the radius corresponding to the cylindrical surface is set such that an azimuth angle corresponding to an exit direction of image light exiting the first surface is half the angle represented by a range of the azimuth angle corresponding to the exit direction, the range of the azimuth angle corresponding to the exit direction being a range in which the diffraction efficiency exhibits a value greater than or equal to a specified value. Here, the specified value is, for example, a value equal to half the peak value. Note that an azimuth angle upon diffractive reflection is positive or negative. Thus, an angle equal to half the angle represented by the azimuth angle is used as a reference. Consequently, the efficiency in diffracting image light (light that forms a virtual image) reflected off the cylindrical surface at least exhibits a value greater than or equal to the specified value. Accordingly, a radius corresponding to a cylindrical surface is set according to the diffraction efficiency of the reflective hologram.

Figure 23:
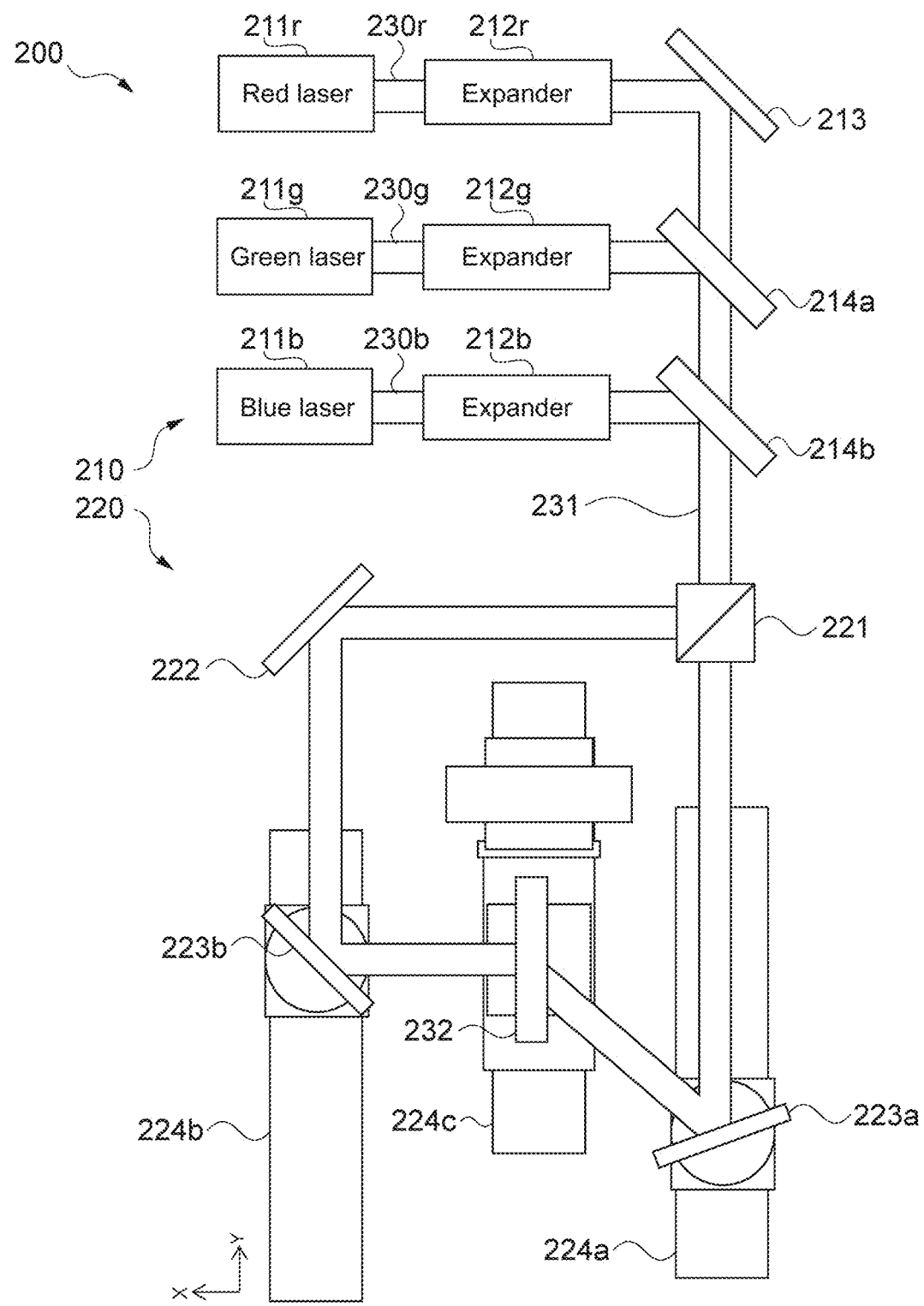
FIG. 23 is an exposure apparatus that exposes a hologram to light to generate interference fringes.

FIG. 23 is an exposure apparatus that exposes a hologram to light to generate interference fringes. An exposure apparatus 200 is an apparatus that generates a reflective hologram (a linear hologram) that includes interference fringes having a period in a single direction. The exposure apparatus 200 includes a light source section 210 and an exposure section 220. The light source section 210 includes laser sources of R, G, and B 211*r*, 211*g*, and 211*b*, beam expanders 212*r*, 212*g*, and 212*b*, a mirror 213, and half-mirrors 214*a* and 214*b*.

The laser sources of R, G, and B 211*r*, 211*g*, and 211*b* respectively emit pieces of laser light of red, green, and blue 230*r*, 230*g*, and 230*b*. The beam expanders 212*r*, 212*g*, and 212*b* respectively expand the pieces of laser light 230*r*, 230*g*, and 230*b* emitted by the respective laser sources. The expanded red laser light 230*r* is reflected off the mirror 213 to travel along a specified light path. The half mirror 214*a* is arranged in the specified light path, and the expanded green laser light 230*g* is reflected off the half mirror 214*a* to travel along the specified light path. The half mirror 214*b* is arranged in the specified light path, and the expanded blue laser light 230*b* is reflected off the half mirror 214*b* to travel along the specified light path. Thus, the beam light 231 obtained by combining the respective pieces of laser light 230 exits the specified light path.

The exposure section 220 includes a beam splitter 221, a fixed mirror 222, movable mirrors 223*a* and 223*b*, and first to third stages 224*a* to 224*c*. The beam splitter 221 splits the beam light 231 traveling along the specified light path and entering from the light source section 210, and the beam light 231 exits the beam splitter 221 to be headed for the fixed mirror 222 and the movable mirror 223*a*. The entering beam light exits the fixed mirror 222 to be headed for the movable mirror 223*b*. The movable mirror 223*a* is rotatable, and the beam light 231 is reflected off the movable mirror 223*a* to be headed for one of surfaces of a sample 232. The movable mirror 223*b* is rotatable, and the beam light 231 is reflected off the movable mirror 223*b* to be headed for another of the surfaces of the sample 232.

The first to third stages 224*a* to 224*c* are respectively movable in directions parallel to each other (Y direction). The first stage 224*a* supports the movable mirror 223*a*, and the second stage 224*b* supports the movable mirror 223*b*. Further, the third stage 224*c* supports the sample 232, and can move the sample 232 in a Z-axis direction. Here, for example, a photosensitive photopolymer attached to a transparent base such as glass is used as the sample 232.

Each of the pieces of laser light 230 of R, G, and B is expanded by the beam expander, and its beam wavefront is made uniform. The pieces of laser light 230 of the respective colors are combined by the mirror 213 and the half mirrors 214*a* and 214*b*, and light obtained by the combining exits as beam light. The beam light 231 is split into two beams using the beam splitter, and the two beams are respectively irradiated onto the surfaces of the sample 232 as reference light and object light using the movable mirrors 223*a* and 223*b*. At this point, angles of the reference light and the object light are deflected, and exposure is performed at desired exposure angles to generate interference fringes. The exposed sample 232 may be used in a state of the photopolymer being attached to glass, or the photopolymer may be removed and newly attached to another base such as an acrylic plate. Note that the surface of the base is not limited to being flat, and may be curved.

The movement of the third stage 224c in the Y direction and the Z direction makes it possible to increase the area of the interference fringes generated by performing exposure. Further, when an angle of the mirror is changed according to an exposure position, this makes it possible to perform exposure while changing a slant angle in a hologram surface. In this case, a slant angle for the interference fringes in the reflective hologram differs depending on an exposure position. This approach is used when, for example, exposure is performed by changing a slant angle for each elevation angle corresponding to a position of a pupil. Accordingly, a direction in which light is diffractively reflected can be controlled for each position.

Figure 24:
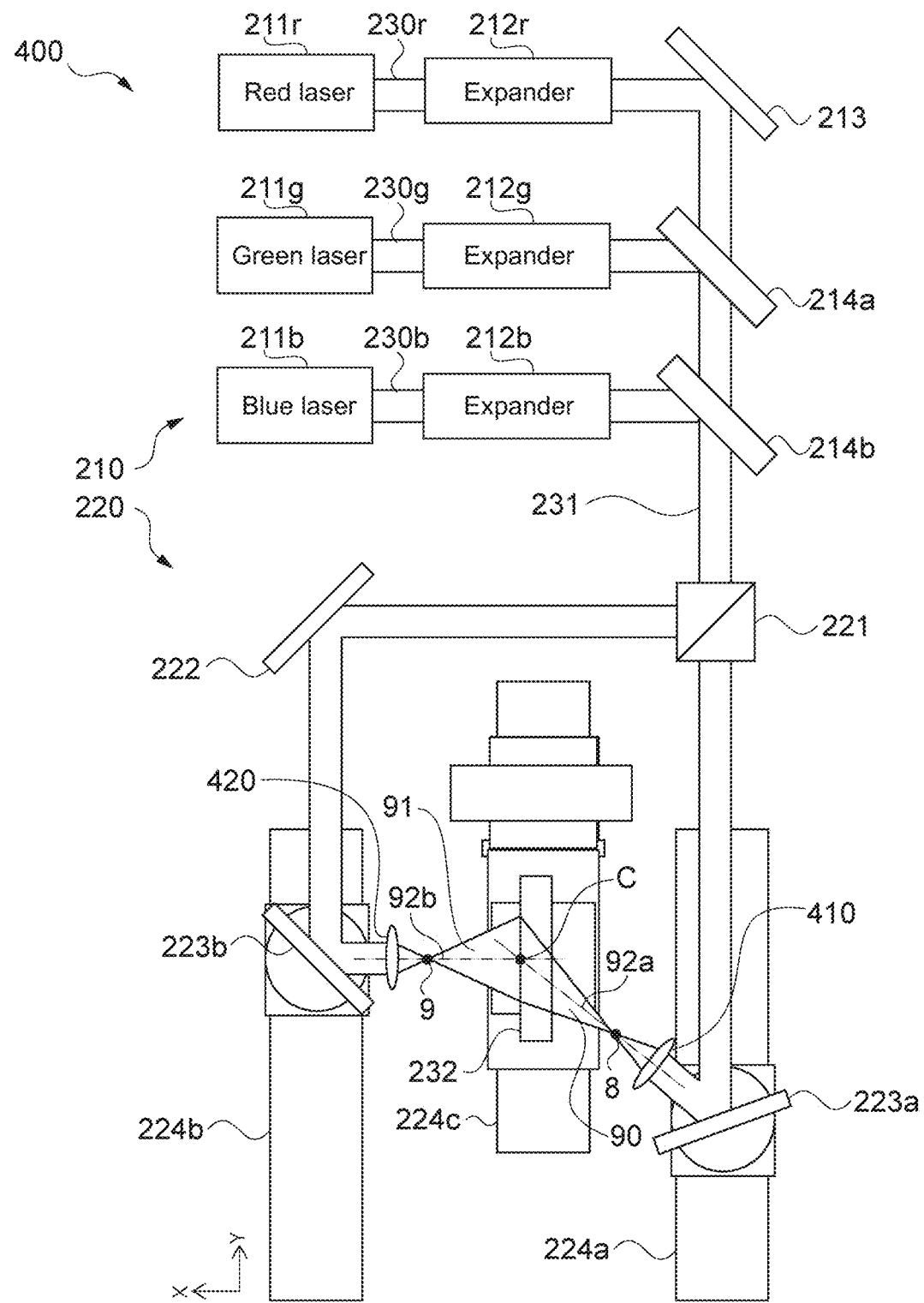
FIG. 24 is an exposure apparatus that exposes a hologram lens to light.

FIG. 24 illustrates an exposure apparatus that exposes a hologram lens to light. An exposure apparatus 400 is an apparatus that generates a reflective hologram lens that includes interference fringes and serves as a reflective lens.

The exposure apparatus 400 includes, for example, a reference-light lens 410 and an object-light lens 420 in addition to the exposure apparatus 200 illustrated in FIG. 23. Structural elements similar to those of the exposure apparatus 200 of FIG. 23 are described below using similar reference symbols.

The reference-light lens 410 is a lens that generates the reference light 90. For example, the beam light 231 entering the reference-light lens 410 is collected into a focal point of the reference-light lens 410, and then radially exits from the focal point. The focal point of the reference-light lens 410 corresponds to the reference point 8 described with reference to, for example, FIG. 16. Further, an optical axis of the reference-light lens 410 is the optical axis 92a corresponding to the reference light 90, and is set parallel to a direction in which the beam light 231 reflected off the movable mirror 223a travels.

The object-light lens 420 is a lens that generates the object light 91. For example, the beam light 231 entering the object-light lens 420 is collected into a focal point of the object-light lens 420, and then radially exits from the focal point. The focal point of the object-light lens 420 corresponds to the object point 9 described with reference to, for example, FIG. 16. Further, an optical axis of the object-light lens 420 is the optical axis 92b corresponding to the object light 91, and is set parallel to a direction in which the beam light 231 reflected off the movable mirror 223b travels.

The reference-light lens 410 and the object-light lens 420 are fixed independently of the first to third stages 224a to 224c using, for example, a holding section (not illustrated).

The exposure apparatus 400 includes a two-beam-exposure optical system used to perform exposure on the reflective hologram lens 330 using the pieces of laser light of red, green, and blue 230r, 230g, and 230b to simultaneously generate, in a photopolymer, interference fringes that correspond to the pieces of light of the respective colors.

The pieces of laser light of red, green, and blue 230r, 230g, and 230b being emitted by the laser sources of R, G, and B 211r, 211g, and 211b are expanded by the respective beam expanders 212r, 212g, and 212b, and beam wavefront of each of the pieces of laser light is made uniform. The pieces of laser light 230r, 230g, and 230b after the beam wavefronts are made uniform are respectively reflected off the mirror 213, the half mirror 214a, and the half mirror 214b to travel along a specified light path. In this process, the pieces of laser light of the respective colors are combined. Laser light obtained by the combining (the beam light 231) is split into two beams using the beam splitter.

One of the pieces of beam light 231 obtained by the split is deflected by the movable mirror 223a, and travels along the optical axis 92a to enter the reference-light lens 410. Further, another of the pieces of beam light 231 obtained by the split is reflected off the mirror 222, is deflected by the movable mirror 223b, and travels along the optical axis 92b to enter the object-light lens 420. The beam light 231 collected into the reference point 8 by the reference-light lens 410, and the beam light 231 collected into the object point 9 by the object-light lens 420 are respectively irradiated onto the sample 232 as pieces of radiation light (the reference light 90 and the object light 91).

For example, the sample is formed by attaching a photopolymer to glass. After exposure, the sample may be used in a state of the photopolymer being attached to glass, or the photopolymer may be removed and newly attached to, for example, an acrylic plate. Note that the surface of a base to which a photopolymer is attached may be curved.

The optical axis 92a of the reference-light lens 410 and the optical axis 92b of the object-light lens 420 are each set to have a desired exposure angle. Further, it is desirable that the respective optical axes 92a and 92b be set to create an intersection on the photopolymer attached to the sample 232. This intersection is a lens center. For example, the movement of the third stage holding the sample 232 makes it possible to adjust an exposure position in the photopolymer.

Note that it is conceivable that an exposure wavelength for performing exposure to generate interference fringes and a reproduction wavelength for reproducing a virtual image could be different from each other. In such a case, the respective lenses may be shifted such that the object point and the reference point are desired points. Further, for example, a shift of the exposure wavelength from the reproduction wavelength may be corrected by controlling wavefront using, for example, a spatial light modulating (SLM) element.

A reflective hologram or a reflective hologram lens that is a reflective HOE is used in the example described above. Without being limited thereto, any diffractive optical element that can diffract image light to display a virtual image, may be used. Here, the diffractive optical element (DOE) is an optical element that diffracts light. For example, the HOE described above is an example of the diffractive optical element.

A specific configuration of the diffractive optical element is not limited. For example, a volume HOE in which interference fringes are recorded, as described with reference to, for example, FIG. 4, is used. Further, for example, a relief (embossing) HOE in which interference fringes are recorded using, for example, unevenness of a surface of the element, may be used. For example, a material such as a photopolymer (for example, a photosensitive material) or a UV curable resin can be used as the HOEs. Furthermore, a diffractive optical element or the like that diffracts light using, for example, a diffraction grating of a specified pattern may be used, in addition to the use of the diffraction performed by interference fringes.

At least two of the features of the present technology described above can also be combined. In other words, the various features described in the respective embodiments may be combined discretionarily regardless of the embodiments. Further, the various effects described above are not limitative but are merely illustrative, and other effects may be provided.

In the present disclosure, expressions such as "same", "equal", and "orthogonal" include, in concept, expressions such as "substantially the same", "substantially equal", and "substantially orthogonal". For example, the expressions such as "same", "equal", and "orthogonal" also include states within specified ranges (such as a range of +/10%), with expressions such as "exactly the same", "exactly equal", and "completely orthogonal" being used as references.

Note that the present technology may also take the following configurations.

(1) An image display apparatus, including
   a plurality of display units each including
      a screen on which an object image is formed, and
      a diffractive optical element that includes a first surface and a second surface that is situated opposite to the first surface, the diffractive optical element diffracting image light of the object image that enters the first surface, and causing the image light to exit the first surface, the diffractive optical element displaying a virtual image of the object image on a side of the second surface such that the virtual image is superimposed on a background, in which
   the diffractive optical elements of a plurality of the diffractive optical elements included in the plurality of display units are each arranged to at least partially surround a specified axis in a state in which the second surface faces the specified axis.

(2) The image display apparatus according to (1), in which
   the diffractive optical element includes a one-dimensional diffraction grating, and
   the diffractive optical element is arranged such that the one-dimensional diffraction grating is orthogonal to a plane that includes the specified axis.

(3) The image display apparatus according to (1) or (2), in which
   the plurality of the diffractive optical elements includes three or more of the diffractive optical elements being adjacently arranged to surround the specified axis.

(4) The image display apparatus according to (3), in which
   each of the three or more of the diffractive optical elements is in the form of a flat plate, and is arranged such that the first surface and the specified axis are parallel to each other to form a prismatic structure that surrounds the specified axis.

(5) The image display apparatus according to any one of (1) to (4), in which
   when an angle that is formed by a path of the image light and an orthogonal plane orthogonal to the specified axis is defined as an elevation angle, and when an angle that indicates a direction of the path of the image light projected onto the orthogonal plane is defined as an azimuth angle,
   the plurality of the diffractive optical elements is arranged such that an efficiency in diffracting the image light exiting the first surface at a specified elevation angle along a plane that includes the specified axis, exhibits a value greater than or equal to a first value.

(6) The image display apparatus according to (5), in which
   the diffractive optical element is in the form of a flat plate, and
   an angle formed by perpendiculars to the first surfaces being included in the diffractive optical elements of the plurality of the diffractive optical elements and being adjacent to each other, is set to an angle less than or equal to an angle that is represented by a second angular range that is a range of the azimuth angle corresponding to an exit direction of the image light exiting the first surface, the range of the azimuth angle corresponding to the exit direction being a range in which the diffraction efficiency exhibits a value greater than or equal to the first value in a first angular range that is a range of the elevation angle corresponding to the exit direction, the range of the elevation angle corresponding to the exit direction being a range in which the diffraction efficiency exhibits a value greater than or equal to the first value, with an azimuth component in the exit direction being orthogonal to the first surface.

(7) The image display apparatus according to (5) or (6), in which
   the first value is a value equal to half a peak value of the diffraction efficiency.

(8) The image display apparatus according to any one of (5) to (7), in which
   the plurality of the diffractive optical elements is arranged such that the first surfaces are inscribed in an inner peripheral circle having a radius equal to a distance from the first surface to a virtual-image focal point in a direction orthogonal to the specified axis, with the specified axis passing through a center of the inner peripheral circle.

(9) The image display apparatus according to any one of (5) to (8), in which
   the image light of the object image diffusely exits the screen,
   an angle of diffusion performed on the screen in an elevation direction is an angle represented by a third angular range that is a range of the elevation angle corresponding to a direction of incidence of the image light on the first surface, the range of the elevation angle corresponding to the incident direction being a range in which the diffraction efficiency exhibits a value greater than or equal to the first value, with an azimuth component in the incident direction being orthogonal to the first surface, and
   an angle of diffusion performed on the screen in an azimuth direction is an angle represented by a fourth angular range that is a range of the azimuth angle corresponding to the incident direction, the range of the azimuth angle corresponding to the incident direction being a range in which the diffraction efficiency exhibits a value greater than or equal to the first value in the third angular range.

(10) The image display apparatus according to (9), in which
   the display unit includes a projection section that projects the object image onto the screen, and
   the image light of the object image diffusely exits the screen at an angle in an angular range obtained by adding an angle of radiation performed by the projection section to the third and fourth angular ranges.

(11) The image display apparatus according to any one of (5) to (10), in which
   the diffractive optical element includes a surface having a shape of a cylinder, with the specified axis being a central axis of the cylinder, and
   a radius corresponding to the surface having the shape of the cylinder is set such that the azimuth angle corresponding to an exit direction of the image light exiting the first surface is less than or equal to half an angle represented by a range of the azimuth angle corresponding to the exit direction, the range of the azimuth angle corresponding to the exit direction being a range in which the diffraction efficiency exhibits a value greater than or equal to the first value.

(11) The image display apparatus according to any one of (1) to (11), in which
the diffractive optical elements of the plurality of the diffractive optical elements are spaced from each other.

(13) The image display apparatus according to any one of (1) to (12), in which
the screen is arranged on a side of the first surface in order to not block the virtual image from being displayed, and
the image light exits the screen to be headed for the first surface.

(14) The image display apparatus according to any one of (1) to (12), in which
the screen is arranged on the side of the second surface in order to not block the virtual image from being displayed,
the image light exits the screen to be headed for the second surface, and
the display unit includes another diffractive optical element that is arranged to face the first surface, the other diffractive optical element diffracting the image light exiting the screen and passing through the second surface and the first surface, and causing the image light to exit the other diffractive optical element to be headed for the first surface.

(15) The image display apparatus according to (14), in which
the other diffractive optical element diffracts light that enters the first surface at a specified angle, and
the other diffractive optical element is one of an optical element that diffracts the image light and causes the image light to exit the other diffractive optical element at the specified angle to be headed for the first surface, and an optical element in which the specified angle is within an angular range in which an efficiency in diffracting the image light exhibits a value greater than or equal to a second value.

(16) The image display apparatus according to any one of (1) to (15), in which
the diffractive optical element includes a holographic optical element on which exposure is performed to generate interference fringes having a period in a single direction.

(17) The image display apparatus according to (16), in which
a slant angle for the interference fringes in the holographic optical element differs depending on an exposure position.

(18) The image display apparatus according to (16) or (17), in which
the holographic optical element includes the interference fringes generated by performing exposure to pieces of light of different wavelengths.

(19) The image display apparatus according to any one of (1) to (18), in which
the diffractive optical element has a layered-formation-arrangement structure in which a plurality of holographic optical elements having different slant angles for the interference fringes is arranged in a layered formation.

(20) The image display apparatus according to (1), in which
the plurality of the diffractive optical elements includes a plurality of reflective hologram lenses exposed to pieces of light to generate interference fringes, the pieces of light being light that exits from a first point arranged on a side of the first surface and light that exits from a second point arranged on the side of the second surface.

(21) The image display apparatus according to (20), in which
one of the first point and the second point is a reference point from which reference light exits, and another of the first point and the second point is an object point from which object light exits.

(22) The image display apparatus according to (20) or (21), in which
each of the plurality of reflective hologram lenses is in the form of a flat plate, and is arranged such that the first surface and the specified axis are parallel to each other and the second point is on the specified axis.

(23) The image display apparatus according to (22), in which
when an angle that is formed by a path of the image light and an orthogonal plane orthogonal to the specified axis is defined as an elevation angle,
with respect to the plurality of reflective hologram lenses, respective lengths of a line that connects the second point and a lens center are set equal, and respective elevation angles corresponding to the line are set equal.

(24) The image display apparatus according to any one of (20) to (23), in which
the display unit includes a projection section that projects the object image onto the screen in parallel with a direction identical to a direction of an optical axis that corresponds to the light exiting from the first point.

(25) The image display apparatus according to any one of (20) to (24), in which
the reflective hologram lenses of the plurality of reflective hologram lens are configured as lenses with the same magnification.

REFERENCE SIGNS LIST

O reference axis
C center of lens
1 image light
2 interference fringe
3 object image
4 virtual image
6, 6b, 6c perpendicular
8, Q reference point
9, Q' object point
10, 10a to 10f, 60, 310 display unit
11a, 11b inscribed circle
15 projector
20, 61, 320 screen
21, 62, 321 object-image surface
30, 30a to 30c, 50 reflective hologram
31, 81, 331 first surface
32, 82, 332 second surface
71 first reflective hologram 72 second reflective hologram
100, 300 image display apparatus
330 reflective hologram lens

What is claimed is:

1. An image display apparatus, comprising
a plurality of display units each including
   a screen on which an object image is formed, and
   a diffractive optical element that includes a first surface and a second surface that is situated opposite to the first surface, the diffractive optical element diffracting image light of the object image that enters the first surface, and causing the image light to exit the first surface, the diffractive optical element displaying a virtual image of the object image on a side of the second surface such that the virtual image is superimposed on a background, wherein
the diffractive optical elements of a plurality of the diffractive optical elements included in the plurality of display units are each arranged to at least partially surround a specified axis in a state in which the second surface faces the specified axis.

2. The image display apparatus according to claim 1, wherein
the diffractive optical element includes a one-dimensional diffraction grating, and
the diffractive optical element is arranged such that the one-dimensional diffraction grating is orthogonal to a plane that includes the specified axis.

3. The image display apparatus according to claim 1, wherein
the plurality of the diffractive optical elements includes three or more of the diffractive optical elements being adjacently arranged to surround the specified axis.

4. The image display apparatus according to claim 3, wherein
each of the three or more of the diffractive optical elements is in the form of a flat plate, and is arranged such that the first surface and the specified axis are parallel to each other to form a prismatic structure that surrounds the specified axis.

5. The image display apparatus according to claim 1, wherein
when an angle that is formed by a path of the image light and an orthogonal plane orthogonal to the specified axis is defined as an elevation angle, and when an angle that indicates a direction of the path of the image light projected onto the orthogonal plane is defined as an azimuth angle,
the plurality of the diffractive optical elements is arranged such that an efficiency in diffracting the image light exiting the first surface at a specified elevation angle along a plane that includes the specified axis, exhibits a value greater than or equal to a first value.

6. The image display apparatus according to claim 5, wherein
the diffractive optical element is in the form of a flat plate, and
an angle formed by perpendiculars to the first surfaces being included in the diffractive optical elements of the plurality of the diffractive optical elements and being adjacent to each other, is set to an angle less than or equal to an angle that is represented by a second angular range that is a range of the azimuth angle corresponding to an exit direction of the image light exiting the first surface, the range of the azimuth angle corresponding to the exit direction being a range in which the diffraction efficiency exhibits a value greater than or equal to the first value in a first angular range that is a range of the elevation angle corresponding to the exit direction, the range of the elevation angle corresponding to the exit direction being a range in which the diffraction efficiency exhibits a value greater than or equal to the first value, with an azimuth component in the exit direction being orthogonal to the first surface.

7. The image display apparatus according to claim 5, wherein
the first value is a value equal to half a peak value of the diffraction efficiency.

8. The image display apparatus according to claim 5, wherein
the plurality of the diffractive optical elements is arranged such that the first surfaces are inscribed in an inner peripheral circle having a radius equal to a distance from the first surface to a virtual-image focal point in a direction orthogonal to the specified axis, with the specified axis passing through a center of the inner peripheral circle.

9. The image display apparatus according to claim 5, wherein
the image light of the object image diffusely exits the screen,
an angle of diffusion performed on the screen in an elevation direction is an angle represented by a third angular range that is a range of the elevation angle corresponding to a direction of incidence of the image light on the first surface, the range of the elevation angle corresponding to the incident direction being a range in which the diffraction efficiency exhibits a value greater than or equal to the first value, with an azimuth component in the incident direction being orthogonal to the first surface, and
an angle of diffusion performed on the screen in an azimuth direction is an angle represented by a fourth angular range that is a range of the azimuth angle corresponding to the incident direction, the range of the azimuth angle corresponding to the incident direction being a range in which the diffraction efficiency exhibits a value greater than or equal to the first value in the third angular range.

10. The image display apparatus according to claim 9, wherein
the display unit includes a projection section that projects the object image onto the screen, and
the image light of the object image diffusely exits the screen at an angle in an angular range obtained by adding an angle of radiation performed by the projection section to the third and fourth angular ranges.

11. The image display apparatus according to claim 5, wherein
the diffractive optical element includes a surface having a shape of a cylinder, with the specified axis being a central axis of the cylinder, and
a radius corresponding to the surface having the shape of the cylinder is set such that the azimuth angle corresponding to an exit direction of the image light exiting the first surface is less than or equal to half an angle represented by a range of the azimuth angle corresponding to the exit direction, the range of the azimuth angle corresponding to the exit direction being a range in which the diffraction efficiency exhibits a value greater than or equal to the first value.

12. The image display apparatus according to claim 1, wherein
the diffractive optical elements of the plurality of the diffractive optical elements are spaced from each other.

13. The image display apparatus according to claim 1, wherein
the screen is arranged on a side of the first surface in order to not block the virtual image from being displayed, and
the image light exits the screen to be headed for the first surface.

14. The image display apparatus according to claim 1, wherein
the screen is arranged on the side of the second surface in order to not block the virtual image from being displayed,
the image light exits the screen to be headed for the second surface, and
the display unit includes another diffractive optical element that is arranged to face the first surface, the other diffractive optical element diffracting the image light exiting the screen and passing through the second surface and the first surface, and causing the image light to exit the other diffractive optical element to be headed for the first surface.

15. The image display apparatus according to claim 14, wherein
the other diffractive optical element diffracts light that enters the first surface at a specified angle, and
the other diffractive optical element is one of an optical element that diffracts the image light and causes the image light to exit the other diffractive optical element at the specified angle to be headed for the first surface, and an optical element in which the specified angle is within an angular range in which an efficiency in diffracting the image light exhibits a value greater than or equal to a second value.

16. The image display apparatus according to claim 1, wherein
the diffractive optical element includes a holographic optical element on which exposure is performed to generate interference fringes having a period in a single direction.

17. The image display apparatus according to claim 16, wherein
a slant angle for the interference fringes in the holographic optical element differs depending on an exposure position.

18. The image display apparatus according to claim 16, wherein
the holographic optical element includes the interference fringes generated by performing exposure to pieces of light of different wavelengths.

19. The image display apparatus according to claim 16, wherein
the diffractive optical element has a layered-formation-arrangement structure in which a plurality of holographic optical elements having different slant angles for the interference fringes is arranged in a layered formation.

20. The image display apparatus according to claim 1, wherein
the plurality of the diffractive optical elements includes a plurality of reflective hologram lenses exposed to pieces of light to generate interference fringes, the pieces of light being light that exits from a first point arranged on a side of the first surface and light that exits from a second point arranged on the side of the second surface.

21. The image display apparatus according to claim 20, wherein
one of the first point and the second point is a reference point from which reference light exits, and another of the first point and the second point is an object point from which object light exits.

22. The image display apparatus according to claim 20, wherein
each of the plurality of reflective hologram lenses is in the form of a flat plate, and is arranged such that the first surface and the specified axis are parallel to each other and the second point is on the specified axis.

23. The image display apparatus according to claim 22, wherein
when an angle that is formed by a path of the image light and an orthogonal plane orthogonal to the specified axis is defined as an elevation angle,
with respect to the plurality of reflective hologram lenses, respective lengths of a line that connects the second point and a lens center are set equal, and respective elevation angles corresponding to the line are set equal.

24. The image display apparatus according to claim 20, wherein
the display unit includes a projection section that projects the object image onto the screen in parallel with a direction identical to a direction of an optical axis that corresponds to the light exiting from the first point.

25. The image display apparatus according to claim 20, wherein
the reflective hologram lenses of the plurality of the diffractive optical elements are configured as lenses with the same magnification.

* * * * *